(12) United States Patent
Lee et al.

(10) Patent No.: US 10,212,110 B2
(45) Date of Patent: Feb. 19, 2019

(54) CLOUD SYSTEM AND METHOD OF DISPLAYING, BY CLOUD SYSTEM, CONTENT

(71) Applicant: S-PRINTING SOLUTION CO., LTD., Suwon-si, Gyeonggi-do (KR)

(72) Inventors: Sung-woo Lee, Seoul (KR); Mu-hy Yoon, Suwon-si (KR); Hwan-joon Choi, Yongin-si (KR); Ki-young Hwang, Suwon-si (KR); Adam Just, Newport Beach, CA (US); Dario Traverso, Santa Margarita, CA (US); Nehal Dantwala, Newport Beach, CA (US); Vishal Parihar, Aliso Viejo, CA (US)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 14/803,182

(22) Filed: Jul. 20, 2015

(65) Prior Publication Data
US 2016/0050326 A1 Feb. 18, 2016

Related U.S. Application Data

(60) Provisional application No. 62/037,046, filed on Aug. 13, 2014.

(30) Foreign Application Priority Data

Feb. 17, 2015 (KR) ........................ 10-2015-0024309

(51) Int. Cl.
*H04L 12/58* (2006.01)
*H04N 21/258* (2011.01)
(Continued)

(52) U.S. Cl.
CPC ........ *H04L 51/066* (2013.01); *H04L 12/1813* (2013.01); *H04L 12/1822* (2013.01);
(Continued)

(58) Field of Classification Search
CPC ..... H04L 51/06; H04L 51/066; H04L 51/032; H04L 12/1813; H04L 65/605;
(Continued)

(56) References Cited

U.S. PATENT DOCUMENTS 5,781,901 A * 7/1998 Kuzma ................ G06Q 10/107
8,116,288 B2 2/2012 Frid-Nielsen et al.
(Continued)

FOREIGN PATENT DOCUMENTS

KR 10-2008-0056723 6/2008
KR 10-2014-0029581 3/2014
KR 10-2014-0076668 6/2014

OTHER PUBLICATIONS

Matt Aslett, "Basho previews distributed database update following major deal with UK's NHS", Nov. 11, 2013, The 451 Group.*
(Continued)

*Primary Examiner* — Aaron N Strange
(74) *Attorney, Agent, or Firm* — Staas & Halsey LLP

(57) ABSTRACT

Provided is a system for providing a cloud service for display, the system including: an image forming apparatus configured to generate scan data including scanning a document and assign a display device to which the scan data is to be transmitted through a chat room; a cloud configured to receive the scan data from the image forming apparatus and transmit the scan data to the display device; and the display device, wherein the display device is configured to display the scan data received from the cloud.

20 Claims, 56 Drawing Sheets

(51) Int. Cl.

| | |
|---|---|
| *H04L 12/18* | (2006.01) |
| *H04N 21/2343* | (2011.01) |
| *H04N 21/2662* | (2011.01) |
| *H04N 21/4788* | (2011.01) |
| *H04N 21/643* | (2011.01) |
| *H04N 21/81* | (2011.01) |
| *H04N 1/00* | (2006.01) |
| *H04N 7/15* | (2006.01) |
| *H04N 21/222* | (2011.01) |
| *H04N 21/414* | (2011.01) |
| *H04L 29/06* | (2006.01) |
| *H04N 21/443* | (2011.01) |
| *H04N 21/63* | (2011.01) |
| *H04N 21/858* | (2011.01) |

(52) U.S. Cl.
CPC .......... *H04L 12/1827* (2013.01); *H04L 51/06* (2013.01); *H04L 65/1089* (2013.01); *H04L 65/403* (2013.01); *H04L 65/4015* (2013.01); *H04L 65/4084* (2013.01); *H04L 65/605* (2013.01); *H04N 1/00214* (2013.01); *H04N 1/00244* (2013.01); *H04N 7/152* (2013.01); *H04N 21/2223* (2013.01); *H04N 21/234363* (2013.01); *H04N 21/25825* (2013.01); *H04N 21/2662* (2013.01); *H04N 21/41415* (2013.01); *H04N 21/4788* (2013.01); *H04N 21/64322* (2013.01); *H04N 21/8153* (2013.01); *H04N 21/4431* (2013.01); *H04N 21/632* (2013.01); *H04N 21/8586* (2013.01); *H04N 2201/0081* (2013.01); *H04N 2201/0093* (2013.01)

(58) Field of Classification Search
CPC ................ H04L 65/403; H04N 21/258; H04N 21/25825; H04N 21/25858
See application file for complete search history.

(56) References Cited

U.S. PATENT DOCUMENTS

| | | | | |
|---|---|---|---|---|
| 8,843,825 | B1* | 9/2014 | Whitman | G06F 17/30056 715/730 |
| 2003/0174826 | A1 | 9/2003 | Hesse | |
| 2005/0062768 | A1* | 3/2005 | Silverbrook | B41J 2/01 347/2 |
| 2005/0162685 | A1 | 7/2005 | Heiles et al. | |
| 2006/0282760 | A1* | 12/2006 | Tanaka | G06K 9/00469 715/205 |
| 2007/0058596 | A1 | 3/2007 | Frid-Nielsen et al. | |
| 2008/0079985 | A1* | 4/2008 | Ferlitsch | H04N 1/00222 358/1.15 |
| 2008/0273077 | A1* | 11/2008 | Cowherd | H04M 3/5315 348/14.06 |
| 2009/0157627 | A1 | 6/2009 | Arthursson | |
| 2009/0265762 | A1* | 10/2009 | Evanitsky | G06F 17/30876 726/3 |
| 2009/0324134 | A1 | 12/2009 | Howell et al. | |
| 2010/0036967 | A1* | 2/2010 | Caine | H04N 7/17318 709/236 |
| 2011/0209064 | A1* | 8/2011 | Jorgensen | G06F 9/4445 715/733 |
| 2011/0271129 | A1 | 11/2011 | Flannagan et al. | |
| 2012/0170572 | A1 | 7/2012 | Bareli et al. | |
| 2012/0190388 | A1* | 7/2012 | Castleman | H04L 12/581 455/466 |
| 2012/0300127 | A1 | 11/2012 | Morard | |
| 2013/0021640 | A1 | 1/2013 | Tamura | |
| 2013/0080905 | A1 | 3/2013 | Park | |
| 2013/0114107 | A1 | 5/2013 | Park | |
| 2013/0151974 | A1* | 6/2013 | Cho | G06F 17/212 715/733 |
| 2013/0276015 | A1* | 10/2013 | Rothschild | H04N 21/2387 725/25 |
| 2013/0328932 | A1 | 12/2013 | Kim et al. | |
| 2013/0342866 | A1 | 12/2013 | Hansen et al. | |
| 2014/0002857 | A1* | 1/2014 | Huang | H04N 1/00222 358/1.15 |
| 2014/0063562 | A1 | 3/2014 | Lee et al. | |
| 2014/0214984 | A1 | 7/2014 | Lee | |
| 2014/0237379 | A1 | 8/2014 | Chuch et al. | |
| 2014/0253957 | A1* | 9/2014 | Tye | G06F 3/122 358/1.15 |
| 2014/0282778 | A1* | 9/2014 | Kasatani | H04N 21/2343 725/109 |
| 2014/0304225 | A1* | 10/2014 | Suresh | G06F 17/30197 707/610 |
| 2015/0074232 | A1 | 3/2015 | Phillips et al. | |
| 2015/0082386 | A1* | 3/2015 | Safa | H04L 51/32 726/4 |
| 2015/0200884 | A1* | 7/2015 | Fioravanti | H04L 51/08 709/206 |
| 2015/0319197 | A1 | 11/2015 | Capt | |

OTHER PUBLICATIONS

OMA Cloud Computing White Paper ; OMA-WP-Cloud Computing V2 0-20120308-D. OMA-WP-Cloud-Computing-V2-0-20120308-D. Open Mobile Alliance (OMAJ. 4330 La Jolla Village Dr., Suite 110 San Diego. CA 92122; USA; Mar. 8, 2012 (Mar. 8, 2012). pp. 1-45. XP064136155. Retrieved from the Internet: URL:ftp/Public documents/BOD-CLOUD/Permanent documents/ [retrieved on Mar. 8, 2012].
European Patent Application No. 15179180.3, Extended European Search Report, dated Oct. 12, 2015.
European Patent Application No. 15179120.9, Extended European Search Report, dated Oct. 12, 2015.
PCT Patent Application No. PCT/KR2015/007932, International Search Report, dated Nov. 10, 2015.
PCT Patent Application No. PCT/KR2015/007920, International Search Report, dated Dec. 8, 2015.
Korean Office Action for Appln. No. 10-2015-0024309 dated Jul. 20, 2016.
Korean Office Action for Appln. No. 10-2015-0024308 dated Jul. 20, 2016.
U.S. Office Action dated Aug. 8, 2017 from U.S. Appl. No. 14/802,694.
U.S. Office Action dated Mar. 1, 2017 from U.S. Appl. No. 14/802,694.
U.S. Office Action dated Dec. 22, 2016 from U.S. Appl. No. 14/802,694.
U.S. Office Action dated Sep. 21, 2016 from U.S. Appl. No. 14/802,694.
U.S. Office Action dated Jul. 20, 2016 from U.S. Appl. No. 14/802,694.

* cited by examiner

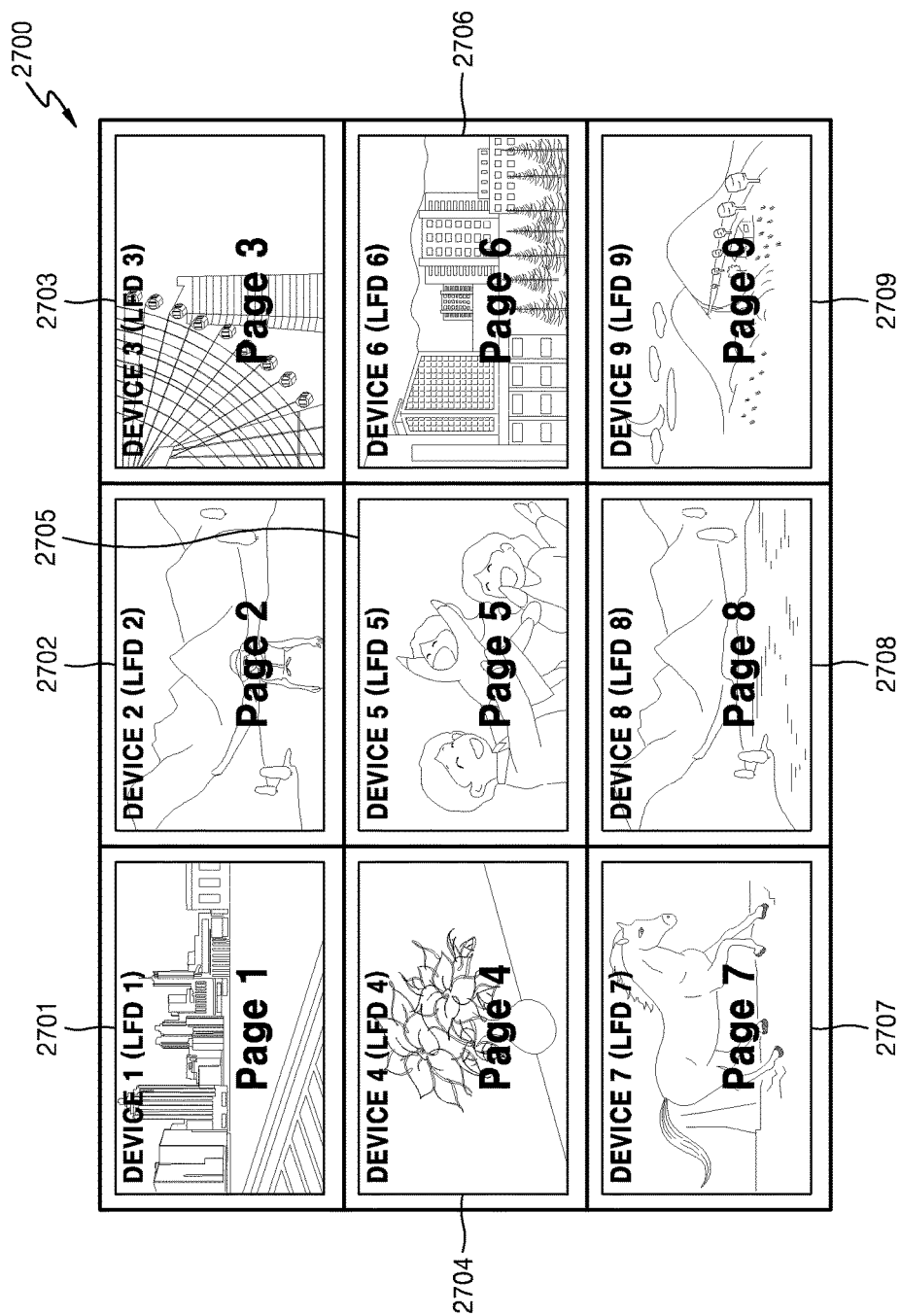

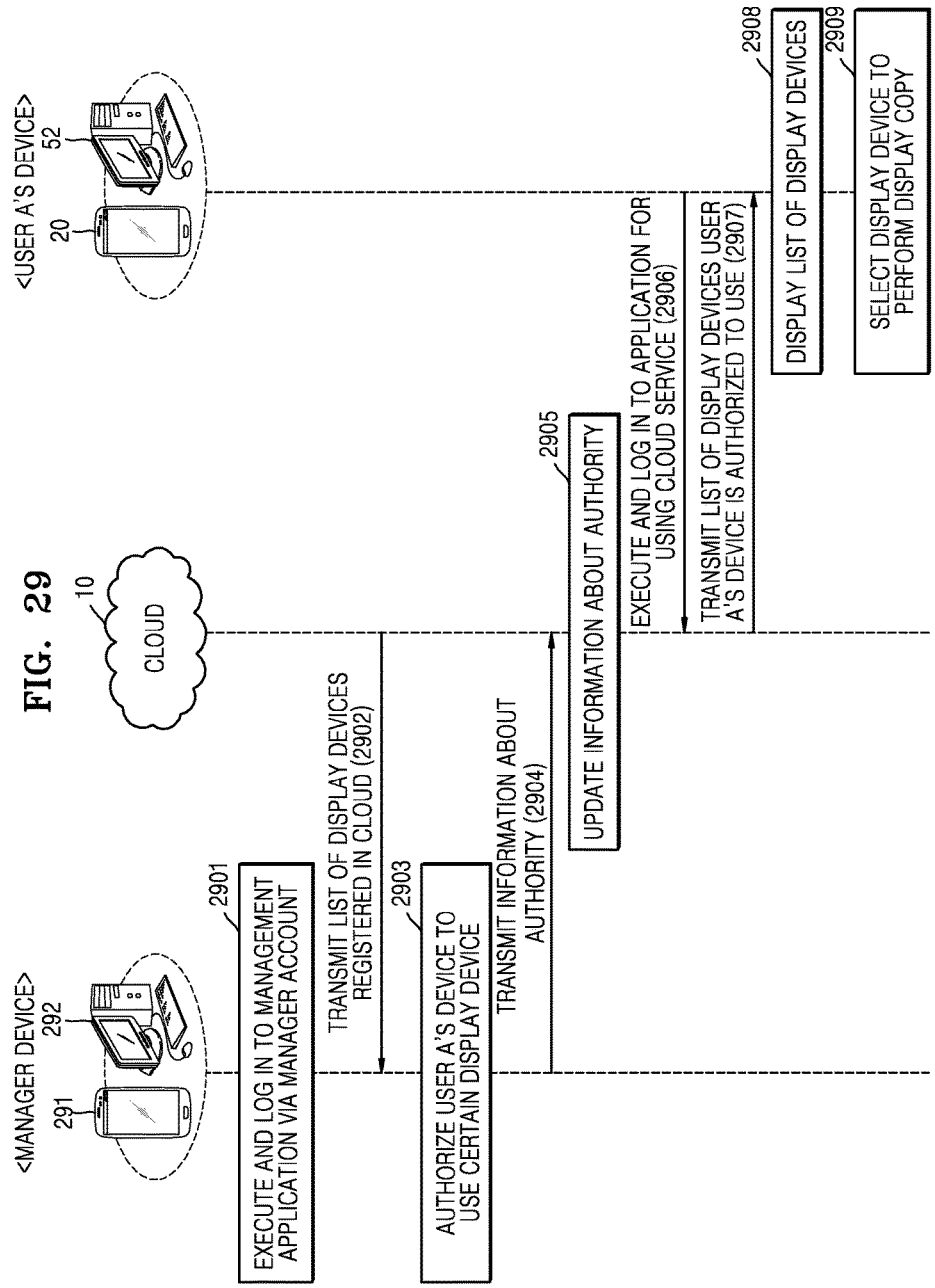

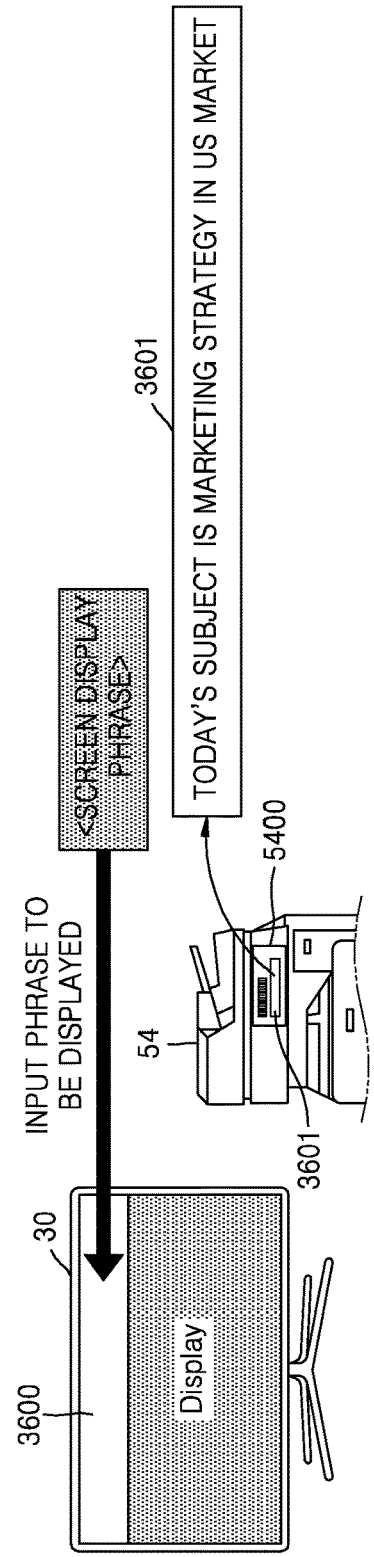

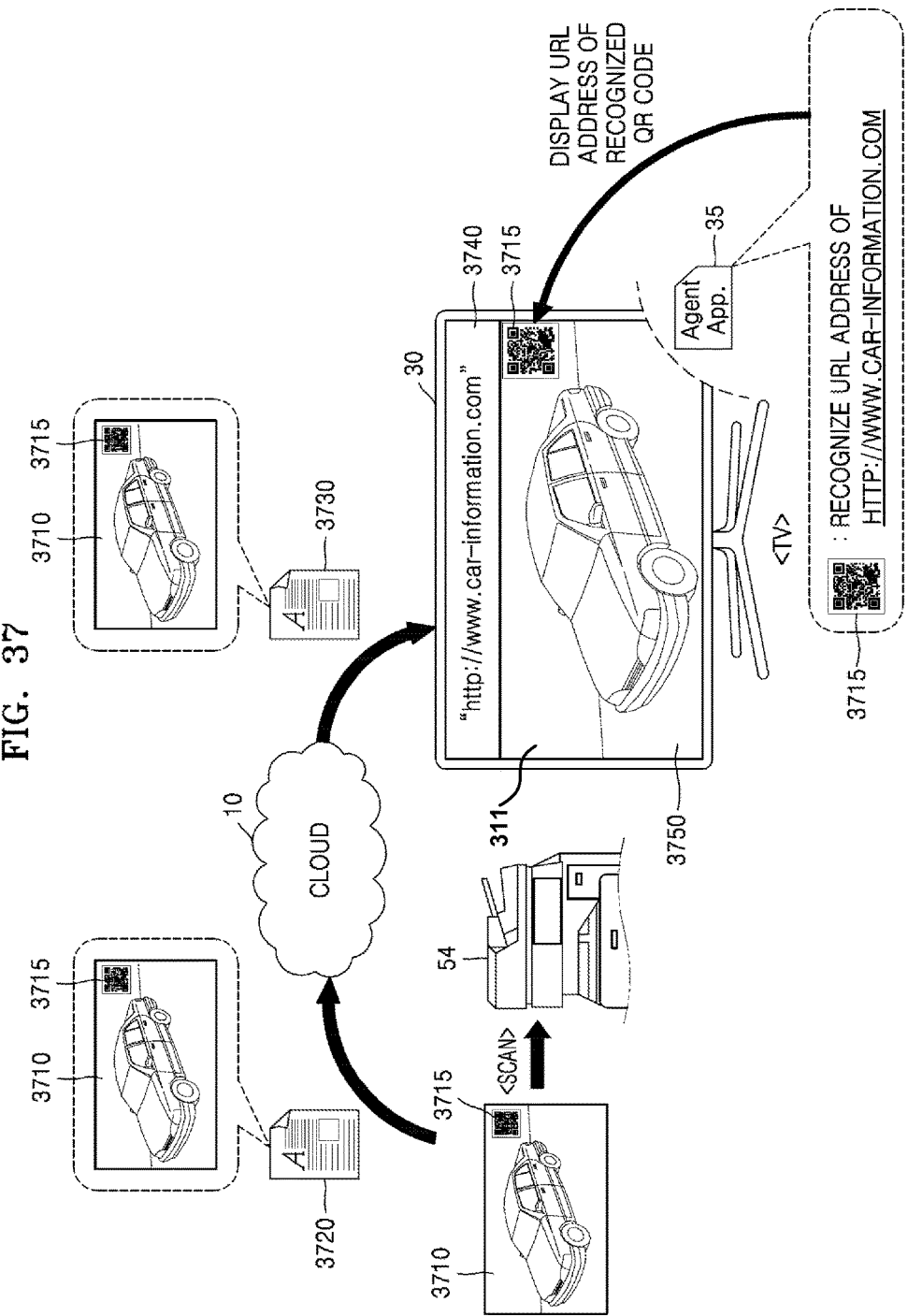

=== PAGE 1 ===

CLOUD SYSTEM AND METHOD OF DISPLAYING, BY CLOUD SYSTEM, CONTENT

CROSS-REFERENCE TO RELATED APPLICATION(S)

This application claims the benefit of U.S. Provisional Application No. 62/037,046, filed on Aug. 13, 2014, in the U.S. Patent and Trademark Office, and Korean Patent Application No. 10-2015-0024309, filed on Feb. 17, 2015, in the Korean Intellectual Property Office, the disclosure of which is incorporated herein in its entirety by reference.

TECHNICAL FIELD

One or more exemplary embodiments relate to a cloud system, and a method of displaying, by a cloud system, content.

BACKGROUND

Generally, devices, such as printers and multifunction printers (MFP), perform printing or copying using paper media. However, in order to develop a paperless environment, various means for replacing newspapers, books, and conference materials, which are made of paper, are being studied. Currently, many people tend to own at least one display device. In detail, most homes and companies are furnished with a display device, such as a TV. Further, electronic devices having a display panel, such as smart phones and tablet devices, are widely supplied for various purposes such as personal use or educational use. Accordingly, many studies on printouts that may replace paper are being conducted.

SUMMARY

One or more exemplary embodiments include a cloud system and a method of displaying, by a cloud system, content. Also, one or more exemplary embodiments include a non-transitory computer-readable recording medium having recorded thereon a program, which when executed by a computer, performs the method.

Additional aspects will be set forth in part in the description which follows and, in part, will be apparent from the description, or may be learned by practice of the presented exemplary embodiments.

According to one or more exemplary embodiments, a system for providing a cloud service for display, the system includes: an image forming apparatus configured to generate scan data by scanning a document and assign a display device to which the scan data is to be transmitted through a chat room; a cloud configured to receive the scan data from the image forming apparatus and transmit the scan data to the display device; and the display device, wherein the display device is configured to display the scan data received from the cloud.

The cloud may be configured to receive, from the image forming apparatus, information for assigning at least one target device for displaying the scan data, wherein the at least one target device may include the display device.

The image forming apparatus may be configured to display the chat room in which the image forming apparatus and at least one device are participating, wherein the at least one device participating in the chat room may include the display device.

The image forming apparatus may be configured to share the scan data with the at least one device participating in the chat room through the chat room.

The cloud may include a storage server that stores the scan data when the scan data is received.

The storage server may be configured to provide a uniform resource locator (URL) address corresponding to an address of a directory in which the scan data is stored, to the display device.

The storage server may include Riak cloud storage (CS) and a database.

The cloud may include a control server that, when the scan data is received, controls the storage of the scan data in the storage server.

The display device may include at least one of a television (TV), a large format display (LFD), a tablet device, and a smart phone.

The cloud may include a message server realized as an extensible messaging and presence protocol (XMPP) server configured to map network address information of the image forming apparatus and network address information of the display device.

The cloud may include a print service server realized as a representational state transfer application programming interface (REST API) module for an agent application installed in the display device and capable of communicating with the cloud, wherein the print service server may be configured to receive network address information and nickname information of the display device from the display device and register the network address information and nickname information.

According to one or more exemplary embodiments, a method of providing a cloud service for display, the method includes: generating, by an image forming apparatus, scan data by scanning a document; assigning, by the image forming apparatus, a display device to which the scan data is to be transmitted through a chat room; receiving, by a cloud, the scan data and information about the display device from the image forming apparatus; transmitting, by the cloud, the scan data to the display device; and displaying, by the display device, the scan data received from the cloud.

The method may further include sharing, by the image forming apparatus, the scan data with the at least one device participating in the chat room through the chat room.

The method may further include storing, by the cloud, the scan data in a storage server when the scan data is received, wherein the transmitting comprises transmitting a uniform resource locator (URL) address corresponding to an address of a directory of the storage server in which the scan data is stored, to the display device.

The storage server may include Riak cloud storage (CS) and a database.

According to one or more exemplary embodiments, a non-transitory computer-readable recording medium has recorded thereon a program, which when executed by a computer, performs the method above.

BRIEF DESCRIPTION OF THE DRAWINGS

These and/or other aspects will become apparent and more readily appreciated from the following description of the exemplary embodiments, taken in conjunction with the accompanying drawings in which:

FIG. 27 is a diagram for describing displaying several pages of content respectively on multiple display devices that are grouped, according to an exemplary embodiment;

FIG. 29 is a diagram for describing a process of selecting, by a device requesting for a display copy, a display device by logging in to a cloud, according to an exemplary embodiment;

FIGS. 36A through 36D are diagrams for describing setting, by an image forming apparatus, a screen display phrase of a display device, according to exemplary embodiments;

FIG. 37 is a diagram for describing requesting, by an image forming apparatus, for Scan-to-DisplayCopy by scanning a photo including a QR code, according to an exemplary embodiment;

DETAILED DESCRIPTION

Figure 1:
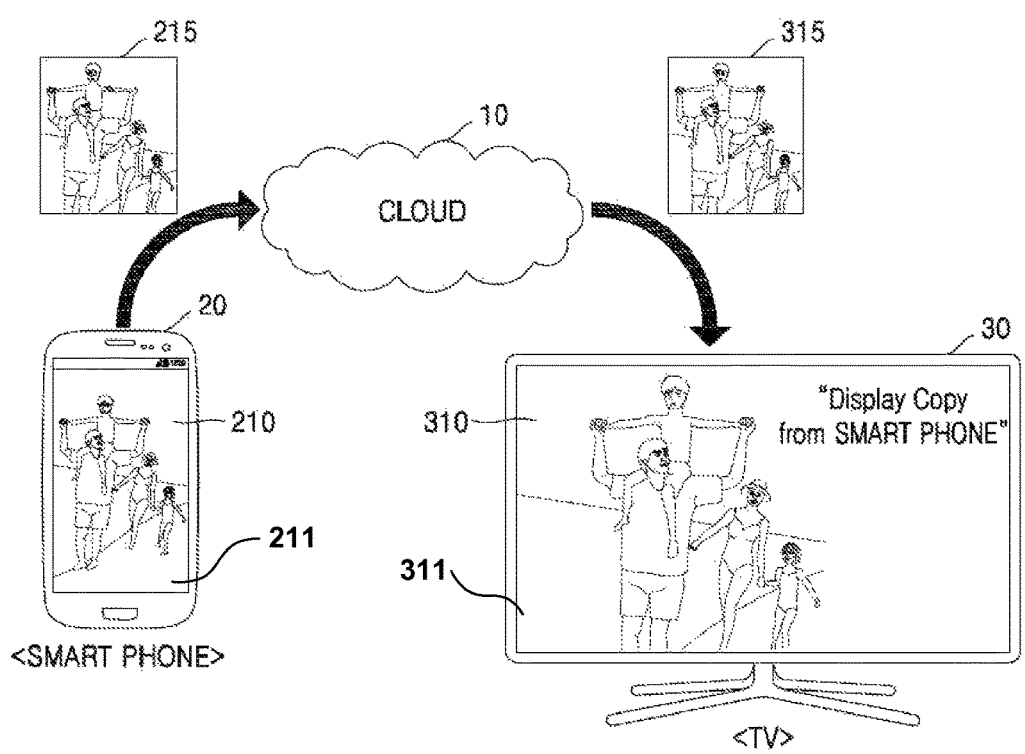
FIG. 1 is a diagram for describing a cloud system that prints or copies content stored in a smart phone to a display screen of a television (TV), according to an exemplary embodiment.

Hereinafter, one or more exemplary embodiments will be described more fully with reference to the accompanying drawings to be easily executed by one of ordinary skill in the art. The exemplary embodiments may, however, be embodied in many different forms and should not be construed as limited to those set forth herein. In the drawings, elements irrelevant to the description will not be shown for the sake of clarity, and like elements denote like reference numerals throughout the specification.

In the specification, when a region is "connected" to another region, the regions may not only be "directly connected", but may also be "electrically connected" via another device therebetween.

Also, when a part "includes" or "comprises" an element, unless there is a particular description contrary thereto, the part can further include other elements, not excluding the other elements.

In the following description, terms such as "unit" and "module" indicate a unit for processing at least one function or operation, wherein the unit and the block may be embodied as hardware or software or embodied by combining hardware and software.

While such terms as "first", "second", etc., may be used to describe various components, such components must not be limited to the above terms. The above terms are used only to distinguish one component from another.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more exemplary embodiments will be described in detail with reference to accompanying drawings.

FIG. 1 is a diagram for describing a cloud system 1 that prints or copies content stored in a smart phone to a display screen of a television (TV), according to an exemplary embodiment.

Referring to FIG. 1, the cloud system 1 includes a cloud 10, an electronic device 20, and a display device 30. In the cloud system 1, the electronic device 20 and the display device 30 may be connected to each other through the cloud 10. The cloud system 1 may further include other general-purpose components as well as the components shown in FIG. 1.

The cloud 10 of the cloud system 1 may be a server that processes various types of contents, such as storing, rendering, and transmitting content. The cloud 10 may be realized as one server device or a server device group in which several server devices are logically connected to each other.

The electronic device 20 of the cloud system 1 may be a smart phone having a mobile communication function. In other words, the electronic device 20 may be a portable device that performs various functions, such as viewing content, storing content, and transmitting or receiving content to and from another device. In FIG. 1, the electronic device 20 is a smart phone, but alternatively, the electronic device 20 may be another type of device, such as a tablet device, a wearable watch device, or a wearable glasses device. Also, the electronic device 20 of the cloud system 1 is a device for viewing content, storing content, and transmitting or receiving content to or from another device, and may be a personal computer (PC) or a laptop.

The display device 30 of the cloud system 1 may be a TV. When the display device 30 is a TV, the display device 30 may operate as a device for watching a broadcast program received from a broadcasting company. Also, the display device 30 may have a function of displaying content on the Internet and a function of surfing the web by being connected to the Internet, as well as displaying a broadcast program, like a smart TV that has been recently released. In FIG. 1, the display device 30 is a TV, but alternatively, the display device 30 may be any one of various devices having a display screen, such as a smart phone, a tablet device, a PC, a laptop, and a large format display (LFD).

In other words, as shown in FIG. 1, the electronic device 20 does not have to be a smart phone, and the display device 30 does not have to be a TV. In other words, functions of the electronic device 20 and the display device 30 may be performed by other types of devices other than those shown in FIG. 1.

The electronic device 20 may store a photo 210 that is captured by a camera module (not shown) included in the electronic device 20, collected through the Internet, or received from another user. The electronic device 20 may display the photo 210 through a display screen 211. According to the cloud system 1 of the current embodiment, a user may print or copy the photo 210 stored in the electronic device 20 to a display screen 311 of the display device 30. In other words, the electronic device 20 may output the photo 210 to the display screen 311 of the display device 30.

In detail, the electronic device 20 transmits a photo file 215 of the photo 210 stored in the electronic device 20 to the cloud 10. The cloud 10 converts a file format of the photo file 215 to be displayable on the display device 30. In other words, the cloud 10 converts the photo file 215 to a photo file 315 displayable by the display device 30. At this time, if the photo file 215 is already displayable by the display device 30, the cloud 10 may transmit the photo file 215 to the display device 30 without converting the photo file 215. Here, examples of a file format displayable by the display device 30 include graphic file formats, such as Joint Photographic Experts Group (JPG), Portable Network Graphics (PNG), Graphics Interchange Format (GIF), and bitmap (BMP), but are not limited thereto.

The cloud 10 transmits the photo file 315 to the display device 30. The display device 30 displays the photo file 315 on the display screen 311, thereby completing an operation of a display copy requested by the electronic device 20.

In one or more exemplary embodiments, the term "display copy" may be widely defined to be a function of outputting content stored in a source device, such as the electronic device 20, to a display screen of at least one target device, such as the display screen 311 of the display device 30. In detail, a "display copy" may include a series of cloud service processes in which a source device, such as the electronic device 20, transmits content to the cloud 10, the cloud 10 renders or converts the content to be displayable by a target device, such as the display device 30, and then the target device displays the content through a display screen upon receiving the content rendered or converted by the cloud 10. Furthermore, the "display copy" may include various functions and operations of a cloud service processed in the cloud system 1, as will be described below.

In other words, the display copy is different from simply displaying content on a target device by transmitting the content directly from a source device to the target device in that the display copy includes a process of rendering or converting the content via the cloud 10 such that a file format of the content is suitable to the target device. However, the process of rendering or converting the content may be optional based on a type of the file format of the content.

Also, the display copy is different from display mirroring. Generally, the display mirroring is a technique of controlling different display devices to display the same screen like a mirror, and thus is different from the display copy of one or more exemplary embodiments.

Figure 2:
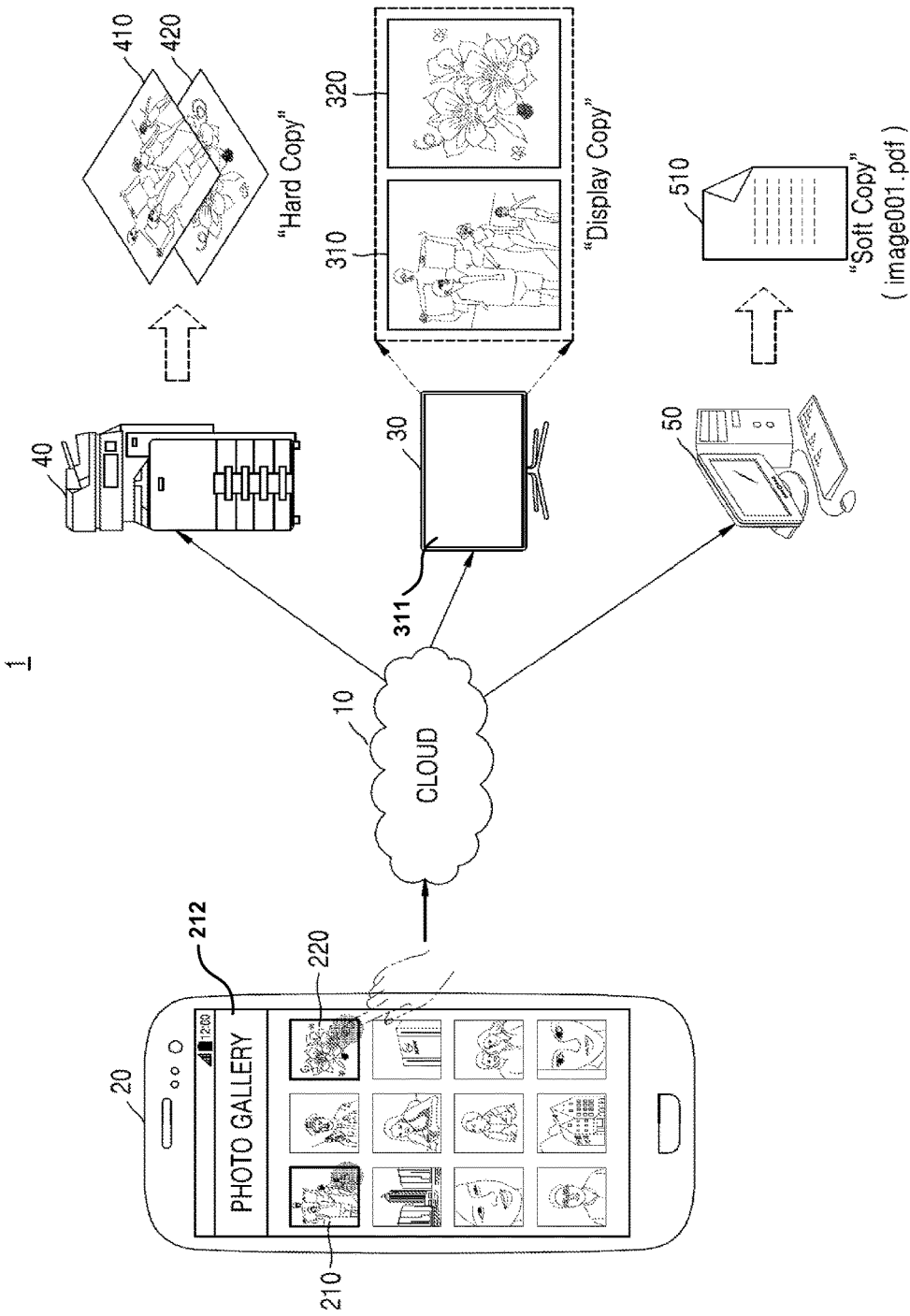
FIG. 2 is a diagram for describing a display copy according to an exemplary embodiment in comparison with a general hard copy and a general soft copy.

FIG. 2 is a diagram for describing a display copy according to an exemplary embodiment in comparison with a general hard copy and a general soft copy.

Referring to FIG. 2, the electronic device 20 (a smart phone) may exist on the cloud system 1, as a source device, and the display device 30 (a TV), a multifunction printer (MFP) 40, and PC 50 may exist on the cloud system 1, as target devices. The source device and the target devices may be connected to each other through the cloud 10.

First, a hard copy is performed as photos 210 and 220 selected by a user through a photo gallery application 212 of the electronic device 20 are transmitted to the MFP 40 through the cloud 10, and the MFP 40 prints the photos 210 and 220 on print papers 410 and 420 (print media). In other words, in the hard copy, the photo 210 is printed on the print paper 410 by the MFP 40 and the photo 220 is printed on the print paper 420 by the MFP 40. As such, the hard copy may be defined to be printing the photos 210 and 220 on papers having an actual physical shape, by using the MFP 40. In the current embodiment, the hard copy is described to be performed as the photos 210 and 220 are transmitted to the MFP 40 through the cloud 10, but generally, the hard copy may alternatively be performed as the electronic device 20 and the MFP 40 are directly connected to each other.

A soft copy is performed as the photos 210 and 220 selected by the user through the photo gallery application 212 of the electronic device 20 are transmitted to the PC 50 through the cloud 10, and the PC 50 generates a file 510 ("image001.pdf") in a certain file format, for example, in a portable document format (PDF). In other words, in the soft copy, the photos 210 and 220 may be generated in at least one file 510 by the PC 50. In the current embodiment, the soft copy is described to be performed as the photos 210 and 220 are transmitted to the PC 50 through the cloud 10, but generally, the soft copy may alternatively be performed as the electronic device 20 and the PC 50 are directly connected to each other.

As described above, the display copy may be defined to be a function of outputting the photos 210 and 220 stored in the electronic device 20 to the display screen 311 of the display device 30 in pieces of image content 310 and 320 (image files). Thus, the display copy has a different paradigm from the hard copy and the soft copy.

The display copy may be similar to the hard copy and the soft copy in that original content is the photos 210 and 220, but is different from those in that final outputs are the pieces of image content 310 and 320 on the display screen 311 whereas final outputs of the hard copy are the print papers 410 and 420 and final outputs of the soft copy are the file 510. In other words, a type of an output in the display copy is different from those of the hard copy and the soft copy.

Figure 3:
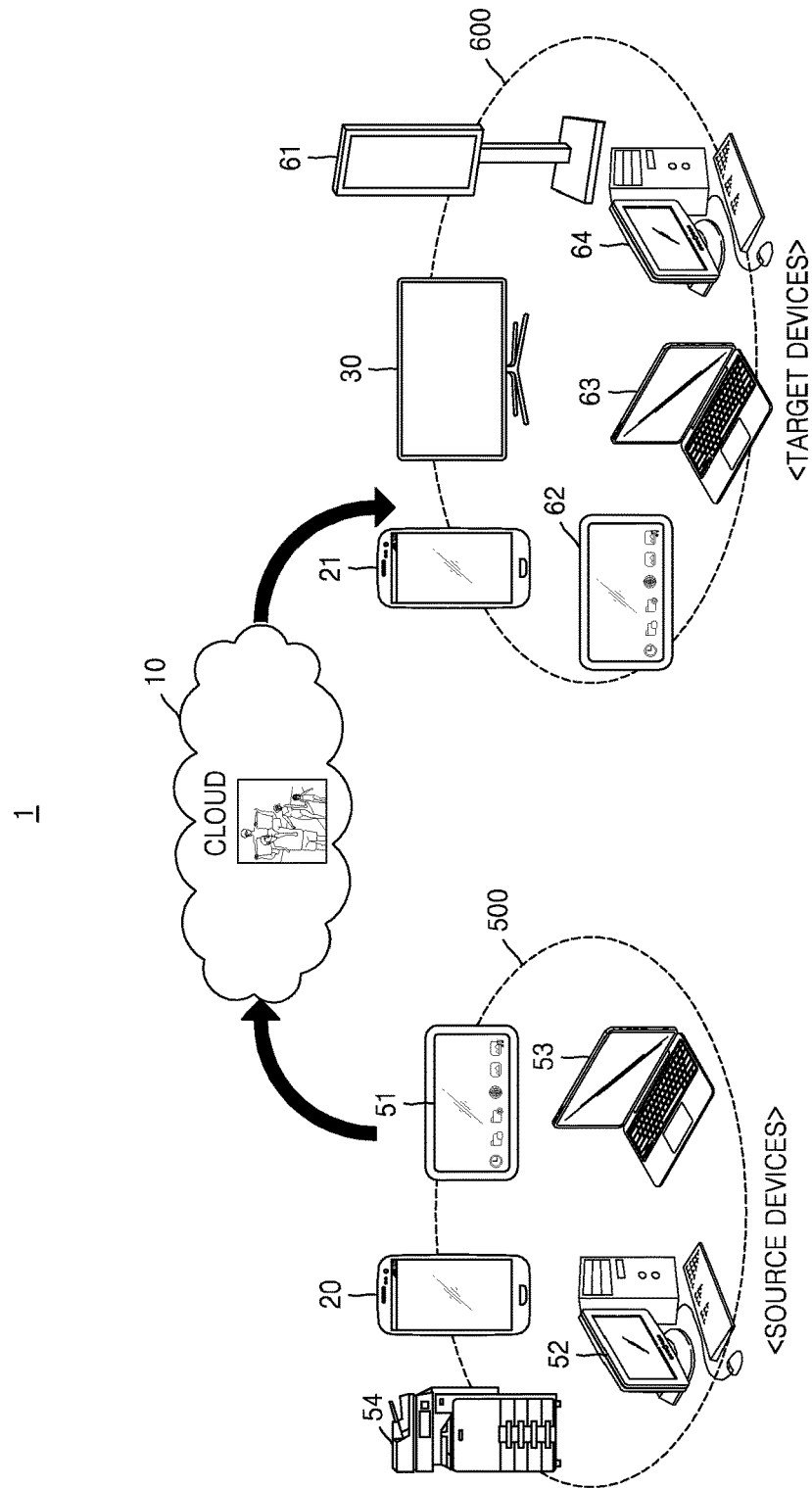
FIG. 3 is a diagram for describing types of source devices and types of target devices, which may exist on a cloud system, according to an exemplary embodiment.

FIG. 3 is a diagram for describing types of source devices 500 and types of target devices 600, which may exist on the cloud system 1, according to an exemplary embodiment.

Referring to FIG. 3, the source devices 500 and the target devices 600 may be connected to each other through the cloud 10.

The source devices 500 may include the electronic device 20 (a smart phone), an electronic device 51 (a tablet device), a PC 52, a laptop 53, and an image forming apparatus 54. The source devices 500 are all devices having various functions of controlling content, such as storing content, such as a photo, a moving image, or a document file, editing content, and transmitting content to another device, and may include various devices other than those shown in FIG. 3. A case in which the source device 500 is the image forming apparatus 54 will described in detail later with reference to FIG. 32.

The target devices 600 may include an electronic device 21 (a smart phone), the display device 30 (a TV), a display device 61 (an LFD), an electronic device 62 (a tablet device), a laptop 63, and a PC 64. The target devices 600 are all devices having a display screen, and have a function of displaying content, such as a photo, a moving image, or a document file. The target device 600 may include various devices other than those shown in FIG. 3.

Figure 4:
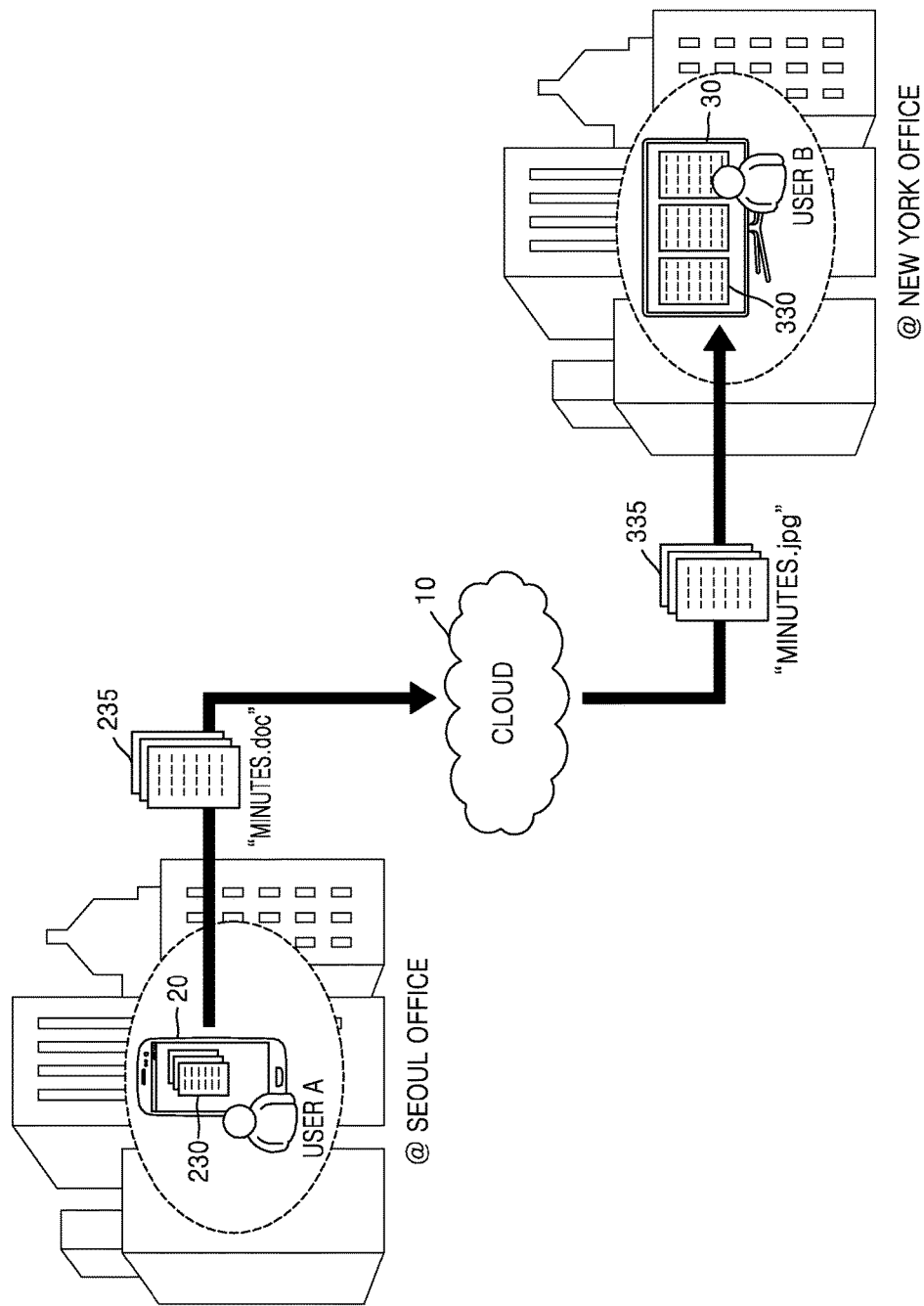
FIG. 4 is a diagram for describing an example of using, by remote offices, a function of a display copy, according to an exemplary embodiment.

FIG. 4 is a diagram for describing an example of using, by remote offices, a function of a display copy, according to an exemplary embodiment.

Referring to FIG. 4, it is assumed that a user A using the electronic device 20 is working at a Seoul office and a user B using the display device 30 is working at a New York office.

The user A at the Seoul office may store a Word file 230 about minutes in the electronic device 20. The user A may want to show the Word file 230 to the user B working at the New York office. At this time, the user A may want to display the Word file 230 on the display device 30 of the user B, instead of simply transmitting the Word file 230 to the user B. In other words, the user A may want the Word file 230 stored in the electronic device 20 to be display-copied on the display device 30 of the user B when, for example, the user A and the user B are having a video conference in real-time.

The electronic device 20 transmits a document file 235 ("minutes.doc") corresponding to the Word file 230 to the cloud 10.

The cloud 10 renders or converts the document file 235 to be displayable by the display device 30, for example, to a graphic file format, such as JPG, PNG, GIF, or BMP. Generally, since the display device 30, such as a TV, cannot display content of each page of a document file, such as Microsoft Word file or Microsoft PowerPoint file, the document file may be rendered or converted by the cloud 10.

The cloud 10 transmits an image file 335 ("minutes.jpg") generated by rendering or converting the document file 235 to the display device 30. In FIG. 4, the image file 335 is transmitted in a JPG file format, but alternatively, may be transmitted in a compressed file format, such as a ZIP file.

The display device 30 displays each page 330 of the image file 335 through the display screen 311. Accordingly, the user B may view the Word file 230 stored in the electronic device 20 on the display screen via a display copy requested by the user A.

In FIG. 4, the function of the display copy is performed between the remote offices, but the function of the display copy is unlimitedly performed under a network environment in which a source device (the electronic device 20) and a target device (the display device 30) are connected to each other through the cloud 10.

Figure 5:
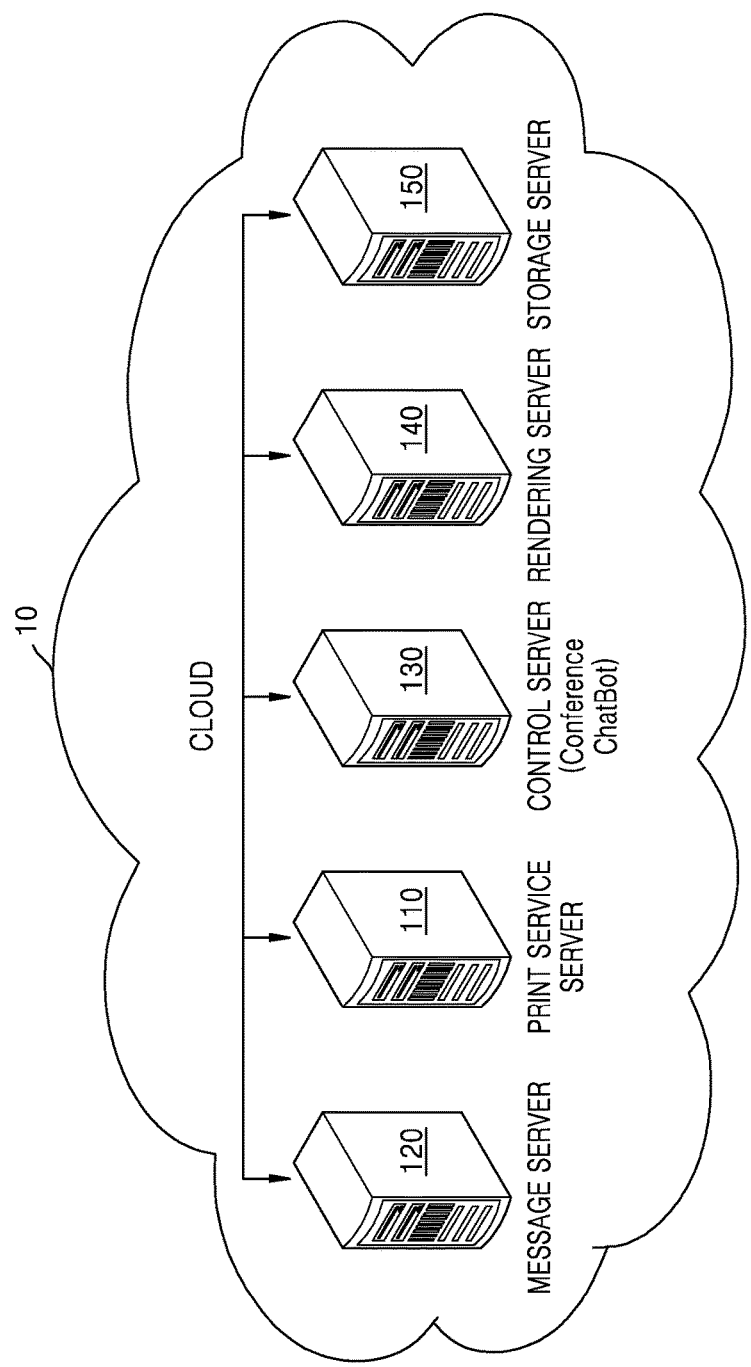
FIG. 5 is a diagram of hardware components of a cloud according to an exemplary embodiment.

FIG. 5 is a diagram of hardware components of the cloud 10 (e.g., of FIG. 1) according to an exemplary embodiment.

Referring to FIG. 5, the cloud 10 may include a print service server 110 (a second server), a message server 120 (a first server), a control server 130 (a conference ChatBot, a fourth server), a rendering server 140 (a third server), and a storage server 150 (a fifth server). The cloud 10 may further include components other than those shown in FIG. 5. In the current embodiment, names of servers included in the cloud 10 are not limited and may be variously changed. For example, hereinafter, the print service server 110 may also be referred to as the second server, the message server 120 may also be referred to as the first server, the control server 130 may also be referred to as the fourth server, the rendering server 140 may also be referred to as the third server, and the storage server 150 may also be referred to as the fifth server.

A structure of the cloud 10 may vary. For example, when at least one of the print service server 110, the message server 120, the control server 130, the rendering server 140, and the storage server 150 corresponds to a physically individual server device, the cloud 10 may be realized by building a framework of virtualizing independent server devices to one server device and logically connecting the independent server devices. Alternatively, the cloud 10 may be realized as one server device, and the print service server 110, the message server 120, the control server 130, the rendering server 140, and the storage server 150 may be realized in the one server device in forms of software modules or hardware modules. In other words, the cloud 10 may include a print service software or hardware server module, a message software or hardware server module, a control software or hardware server module, a rendering software or hardware server module, and a storage software or hardware server module. Furthermore, the above two structures may be combined. In other words, the structure of the cloud 10 is not limited.

The print service server 110 is a server that operates as a gateway for a device outside the cloud 10 to connect to the cloud 10, and may be realized by, for example, an open application programming interface (API) module, such as a representational state transfer application programming interface (REST API) module or a RESTful API module, but is not limited thereto. For example, the print service server 110 may not only operate as a gateway, but may also execute an algorithm for determining a type of a file format of content or another determining algorithm.

The message server 120 is a standardized protocol server for transferring a message between different devices (e.g., the electronic device 20 and the display device 30) through the cloud 10. For example, the message server 120 may be realized as an open protocol-based server, such as an extensible messaging and presence protocol (XMPP) server, but is not limited thereto, and may be realized as a server using any other type of protocol.

The control server 130 generates commands for controlling functions and operations of other servers in the cloud 10, such as the print service server 110, the message server 120, the rendering server 140, and the storage server 150, and controls the print service server 110, the message server 120, the rendering server 140, and the storage server 150 by transmitting the commands. Meanwhile, when a chat room application is executed in the electronic device 20 and the display device 30 of FIG. 1, the control server 130 may process information processed in the chat room, for example, information about transmitting and receiving of a chat message and requesting of a display copy. Accordingly, the control server 130 may also be referred to as Conference ChatBot. The term 'chat room' is replaceable by another term, such as a conversation room, a conference room, or the like.

The rendering server 140 renders content transmitted from a source device, such as the electronic device 20 (e.g., of FIG. 1), to be suitable to a display format of a target device, such as the display device 30 (e.g., of FIG. 1). In other words, the rendering server 140 may be a rendering engine that renders or converts content. As described above, the rendering server 140 may render or convert a Word file ("minutes.doc") transmitted from the electronic device 20 to an image file ("minutes.jpg"). In addition, generally, a printer driver renders or converts a document file (e.g., a doc file or a ppt file) or an image file (e.g., a jpg file or a gif file) to a language interpretable by a printer (e.g., a page description language (PDL)), while the rendering server 140 renders or converts content to be displayable by the display device 30.

The storage server 150 stores various types of information processed in the cloud 10, stores content transmitted from the source device (the electronic device 20), or stores rendered content.

Meanwhile, the cloud 10 may be realized by Infrastructure as a Service (Iaas), such as Amazon Elastic Compute Cloud (EC2) or Amazon Simple Storage Service (S3) provided by Amazon Web Services (AWS). Alternatively, the cloud 10 may not depend upon an Iaas business operator or a platform as a services (Paas) business operator, but may be realized in a cloud architecture that is independently built for business to business (B2B). In other words, architecture of the cloud 10 is not limited.

In summary, the message server 120 receives a sharing request for content (e.g., metadata of the content) from the electronic device 20 (e.g., of FIG. 1). The control server 130 identifies the display device 30 (e.g., of FIG. 1) to display the content and controls rendering of the content based on specifications of the display device 30. The rendering server 140 renders the content to generate an image file having a graphic file format displayable according to the specifications of the display device 30. The storage server 150 stores the image file. Then, the control server 130 controls the image file to be displayed on the display device 30.

Figure 6:
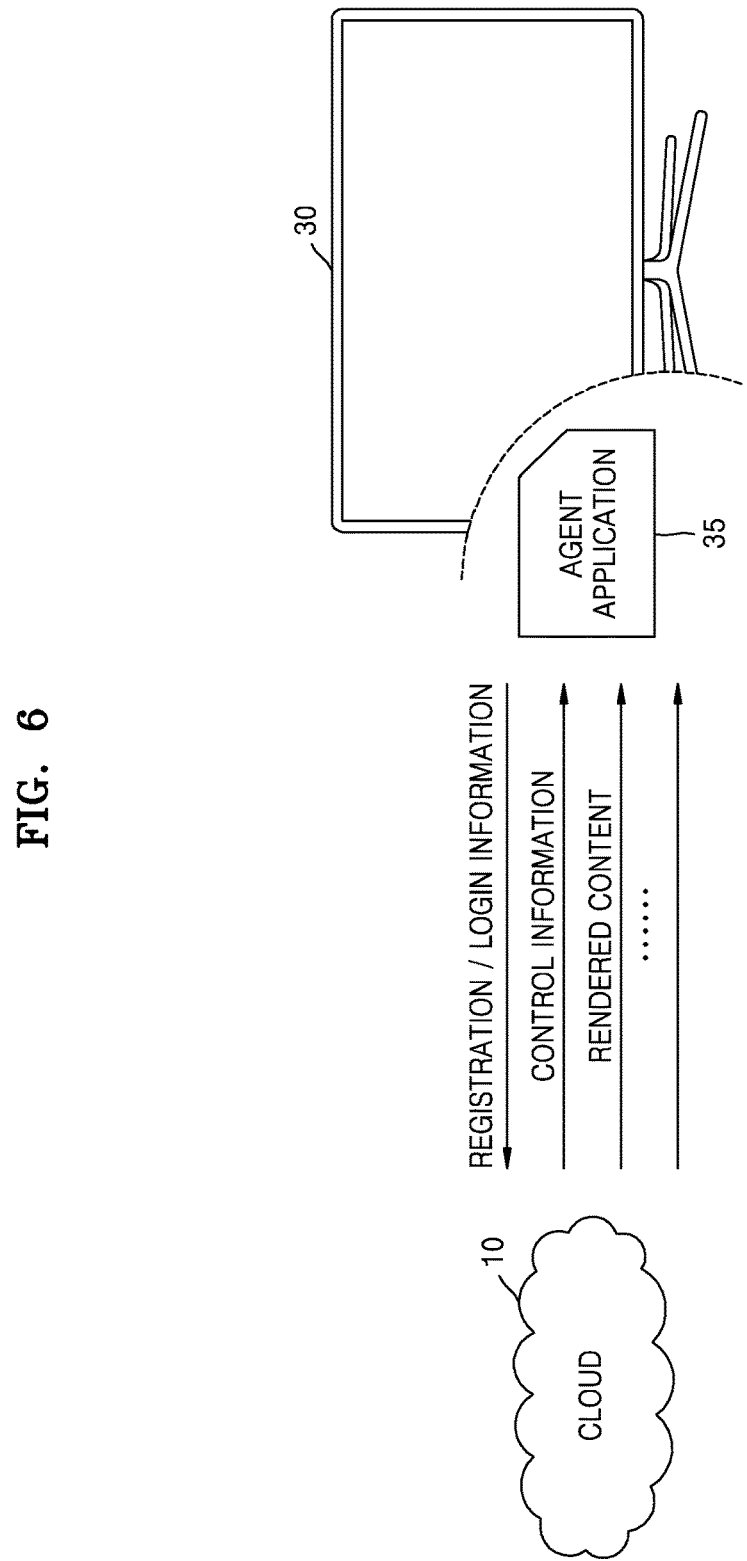
FIG. 6 is a diagram for describing an agent application installed in a display device, according to an exemplary embodiment.

FIG. 6 is a diagram for describing an agent application 35 installed in the display device 30, according to an exemplary embodiment.

Referring to FIG. 6, the agent application 35 for performing a function of a display copy is installed in the display device 30 of the cloud system 1 of FIG. 1. The agent application 35 may be pre-installed or pre-embedded in the display device 30, or may be downloaded and installed in the display device 30 in a form of an application package from an external server. Alternatively, the agent application 35 may be stored only in a storage medium, such as a universal serial bus (USB) storage device, instead of being installed in the display device 30, and provided in a form of an expansion module supporting a function of the agent application 35 to the display device 30 through a USB port. In other words, a method of installing the agent application 35 for the display device 30 is not limited.

The agent application 35 may be connected to and communicate with the cloud 10.

In detail, the agent application 35 registers the display device 30 in the cloud 10 by transmitting various types of identification (ID) information of the display device 30 and a unique name of the display device 30 to the cloud 10 (e.g., a web address or uniform resource locator (URL) address of the print service server 110 and a web address or URL of the message server 120). Here, the ID information of the display device 30 may include a media access control (MAC) address, a serial number, and an internet protocol (IP) address of the display device 30, and the unique name of the display device 30 may be a nickname of the display device 30 arbitrarily set by a user. Also, the agent application 35 may also transmit login information of the user of the display device 30 to the cloud 10 (e.g., the web address or URL of the print service server 110 and the web address or URL of the message server 120). Then, the agent application 35 may log in to the cloud 10 by using the login information of the user.

The agent application 35 may receive various types of control information for displaying content from the cloud 10 (e.g., the control server 130 of FIG. 5). For example, the control information may include information about display styles (e.g., a display time or a screen changing interval) of the content, and a page number of the content to be displayed.

The agent application 35 may receive rendered content to be displayed through the display device 30 from the cloud 10 (e.g., the storage server 150 of FIG. 5). Here, the cloud 10 may provide information about a web address or URL of the storage server 150 storing the rendered content to the agent application 35, and the agent application 35 may receive the rendered content by accessing the web address or URL of the storage server 150.

In addition, the agent application 35 may communicate with the cloud 10 to transmit and receive various types of information, may perform various controls to perform the function of the display copy on the display device 30.

Figure 7:
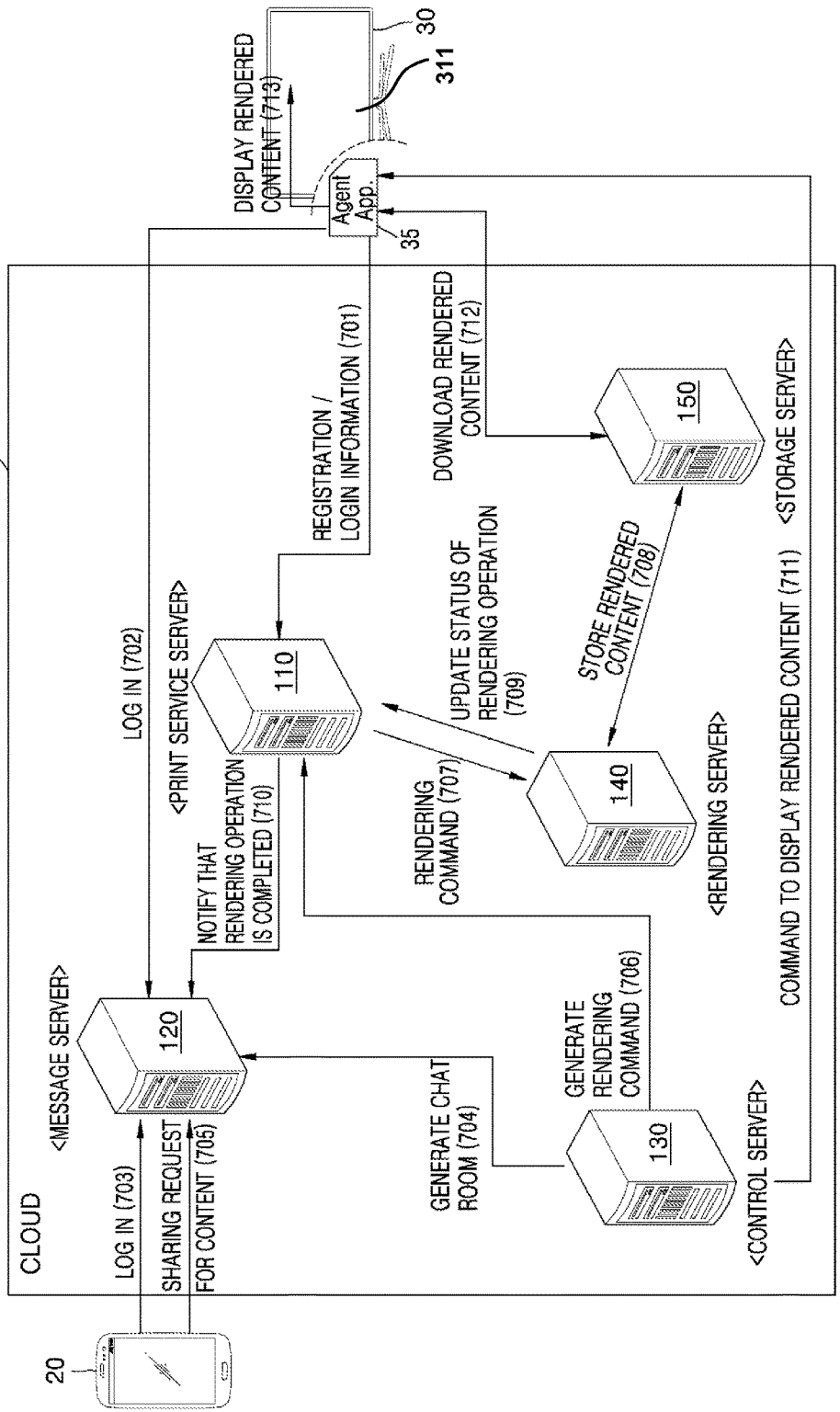
FIG. 7 is a diagram for describing operations of a cloud for performing a function of a display copy in a cloud system, according to an exemplary embodiment.

FIG. 7 is a diagram for describing operations of the cloud 10 for performing a function of a display copy in the cloud system 1, according to an exemplary embodiment.

Referring to FIG. 7, content stored in the electronic device 20 may be display-copied on the display screen 311 of the display device 30 through the cloud 10.

In operation 701, the agent application 35 installed in the display device 30 registers the display device 30 in the print service server 110. As described above with reference to FIG. 6, when the agent application 35 transmits the ID information (the MAC address, the serial number, and the IP address) of the display device 30 and the unique name of the display device 30 to the print service server 110, the print service server 110 stores the ID information and the unique name in the storage server 150, and registers the agent application 35 and the display device 30 in which the agent application 35 is installed. Also, the agent application 35 may transmit the login information, for example, an ID and a password, of the user. Here, the print service server 110 may map and manage the login information and the ID information of the display device 30.

In operation 702, the agent application 35 logs in to the message server 120 via a login (not shown). The agent application 35 transmits the login information of the user of the display device 30, which is input by manipulating a user interface (UI) included in the display device 30 or a remote controller, to the message server 120. The message server 120 transmits the login information to the control server 130, and the control server 130 compares the login information with pre-stored login information of the storage server 150 to determine whether the login is successful. Meanwhile, the storage server 150 may perform a function of a lightweight directory access protocol (LDAP) server for managing employee information of a company, and the control server 130 may determine whether the login is successful based on whether matching login information exists in the LDAP server of the storage server 150.

In operation 703, the electronic device 20 logs in to the message server 120 a login (not shown). A print application that performs a function of a display copy may be pre-installed in the electronic device 20. After the electronic device 20 executes the print application, login information of a user of the electronic device 20 is input, received, or entered. Then, the print application transmits the login information to the message server 120, and the control server 130 determines whether the login is successful by comparing the login information with pre-stored login information of the storage server 150. Meanwhile, in the current embodiment, as described above with reference to FIG. 3, the electronic device 51, i.e., a tablet device, or the PC 52 may be used instead of the electronic device 20, i.e., a smart phone.

In operation 704, when the electronic device 20 is logged in, the control server 130 generates or initiates a chat room. An account of the user of the electronic device 20, an account of the user of the display device 30, or an account of a third person may be invited to the chat room. Alternatively, an account assigned to the display device 30 may be invited to the chat room.

At this time, the control server 130 may assign, to the chat room, a public attribute for the chat room to be classified into a public chat room, or a private attribute for the chat room to be classified into a private chat room. A public chat room may be a chat room in which anyone or any device participates, whereas a private chat room may be a chat room in which only a pre-determined person or a pre-determined device limitedly participates. Attributes of such a chat room may be set by the user of the electronic device 20 or a manager of the cloud 10.

In operation 705, the electronic device 20 transmits a sharing request for content to be display-copied to the message server 120. At this time, the message server 120 may receive the sharing request by receiving metadata about the content, such as file format information, file size information, and file name information, from the electronic device 20. Meanwhile, the electronic device 20 may directly transmit data about the content, such as image data or document data, to the storage server 150. The content may be in a file format (e.g., "*.doc" file or "*.ppt" file) that is not directly displayable on the display device 30, or in a file format (e.g., "*.jpg" file or "*.bmp" file) that is directly displayable on the display device 30.

In operation 706, the control server 130 generates a rendering command for performing a rendering operation on the content, and transmits the rendering command to the print service server 110. When the sharing request is received, the control server 130 controls the print service server 110 by transmitting a command to the print service server 110 to determine a type of a file format of the content.

In operation 707, the print service server 110 transmits the rendering command to the rendering server 140. The rendering server 140 renders or converts the content received from the electronic device 20 and stored in the storage server 150 to content in an image file type having a graphic file format, based on the rendering command. Also, in addition, the rendering server 140 may generate a compressed file (e.g., a ZIP file) by compressing the rendered or converted content.

Before transmitting the rendering command to the rendering server 140, the print service server 110 may determine the type of the file format of the content by using the metadata of the content received from the message server 120. In other words, the print service server 110 may determine whether the content is displayable by the display device 30. When the print service server 110 determines that the content is not displayable by the display device 30 assigned by the electronic device 20, the rendering server 140 renders or converts the content to an image file. When the print service server 110 determines that the content is displayable by the display device 30, the rendering server 140 may skip the rendering operation.

In operation 708, the rendering server 140 stores the rendered or converted content (an image file) in the storage server 150. Here, as described above, the rendering operation may be skipped based on the type of the file format of the content.

In operation 709, the rendering server 140 notifies that the rendering operation is completed to the print service server 110. In other words, the rendering server 140 updates a status of the rendering operation to indicate that the rendering operation is completed. For example, the rendering server 140 may receive rendering commands for a display copy not only from the electronic device 20, but also from many other devices. Thus, the rendering server 140 may generate a queue of rendering operations according to an order in which the rendering operations are requested, and then update a status of a rendering operation included in the queue according to an order in which the rendering operations are completed.

In operation 710, the print service server 110 notifies the message server 120 that the rendering operation is completed.

In operation 711, the control server 130 commands the agent application 35 to display the content (the content itself or the rendered or converted content) requested by the electronic device 20 for the display copy. Here, the control server 130 may command the agent application 35 to display a certain page, for example, a first page, of the content. When it is determined that the content is displayable in operation 707, the control server 130 controls the content to be displayed on the display device 30, and when it is determined that the content is not displayable in operation 707, the control server 130 controls the rendered or converted content to be displayed on the display device 30. In other words, the control server 130 may control any one of the content and the rendered or converted content to be displayed on the display device 30.

In operation 712, the agent application 35 downloads image files corresponding to the content (or the rendered or converted content) or a compressed file of the image files from the storage server 150. Here, the storage server 150 may provide information about a web address or URL of the content in the storage server 150 to the agent application 35, and the agent application 35 may receive the rendered or converted content by accessing the web address or URL of the storage server 150.

In operation 713, the agent application 35 controls the display device 30 to display the content on the display screen 311 of the display device 30.

Figure 8:
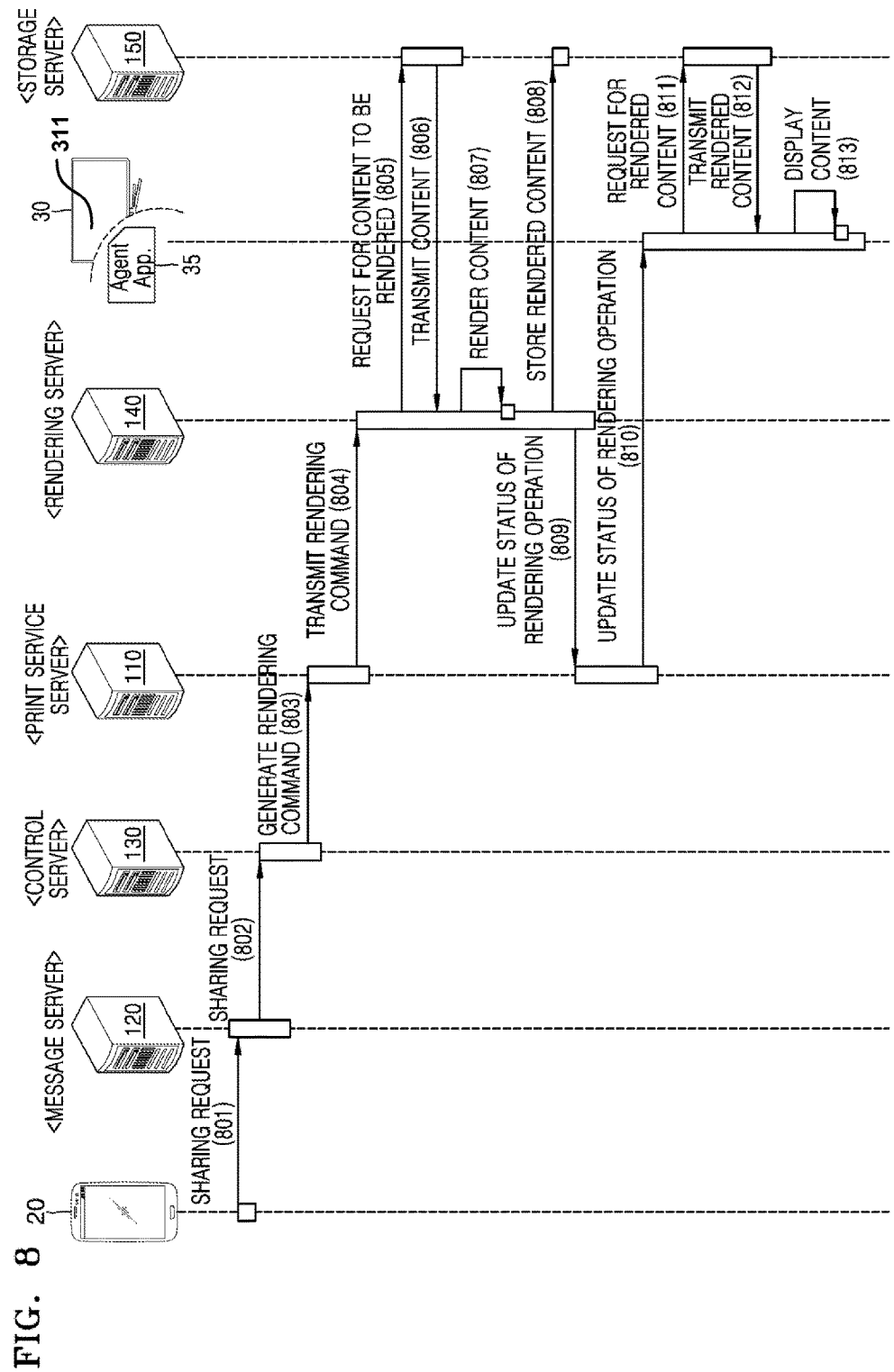
FIG. 8 is a diagram for describing processes of servers included in a cloud for performing a function of a display copy in a cloud system, according to an exemplary embodiment.

FIG. 8 is a diagram for describing processes of servers included in the cloud 10 for performing a function of a display copy in the cloud system 1, according to an exemplary embodiment. Since the processes of FIG. 8 are those processed in time-series by the cloud system 1 described above with reference to FIG. 7, details described above with reference to FIG. 7 may be applied to FIG. 8 even if not explicitly discussed.

In operation 801, the electronic device 20 transmits a sharing request for content to be display-copied to the message server 120. Here, the sharing request may include metadata of the content. Meanwhile, content data (e.g., image data or document data) may be transmitted to and stored in the storage server 150. In other words, the electronic device 20 shares the content with the cloud 10.

In operation 802, the message server 120 transmits the sharing request received from the electronic device 20 to the control server 130. In other words, the message server 120 shares the content with the control server 130. The control server 130 may control the storage server 150 such that the content (content data) received from the electronic device 20 is stored in the storage server 150.

In operation 803, the control server 130 generates the rendering command with respect to the content requested to be display-copied, and transmits the rendering command to the print service server 110. Here, the rendering operation is performed such that the content is rendered or converted to be displayable by the display device 30.

In operation 804, the print service server 110 transmits the rendering command to the rendering server 140. The rendering server 140 stores the rendering operation in the queue. Before transmitting the rendering command to the rendering server 140, the print service server 110 may determine the type of the file format of the content. In other words, the print service server 110 may determine whether the content is displayable on the display device 30. Hereinafter, it is assumed that the content is not displayable on the display device 30.

In operation 805, when it is time to process the rendering operation stored in the queue, the rendering server 140 requests the storage server 150 to transmit the content to be rendered.

In operation 806, the storage server 150 transmits the content to the rendering server 140.

In operation 807, the rendering server 140 renders or converts the content transmitted from the electronic device 20 to be displayable on the display device 30.

In operation 808, when the rendering operation is completed, the rendering server 140 stores the rendered content (the image files or the compressed file of the image files) in the storage server 150.

In operation 809, the rendering server 140 notifies the print service server 110 that the rendering operation stored in the queue is completed. In other words, the rendering server 140 updates the queue to indicate that the status of the rendering operation is completed.

In operation 810, the print service server 110 notifies the agent application 35 that the rendering operation is completed.

In operation 811, the agent application 35 requests the storage server 150 to transmit the rendered or converted content.

In operation 812, the storage server 150 transmits the rendered or converted content to the agent application 35. Here, the storage server 150 may provide a storage directory, such as a web address or URL, in the storage server 150 to the agent application 35 for an access of the agent application 35. Then, the agent application 35 may download the rendered or converted content by accessing the web address or URL.

In operation 813, the agent application 35 controls the display device 30 such that the content requested to be display-copied is displayed on the display screen 311 of the display device 30.

Figure 9A:
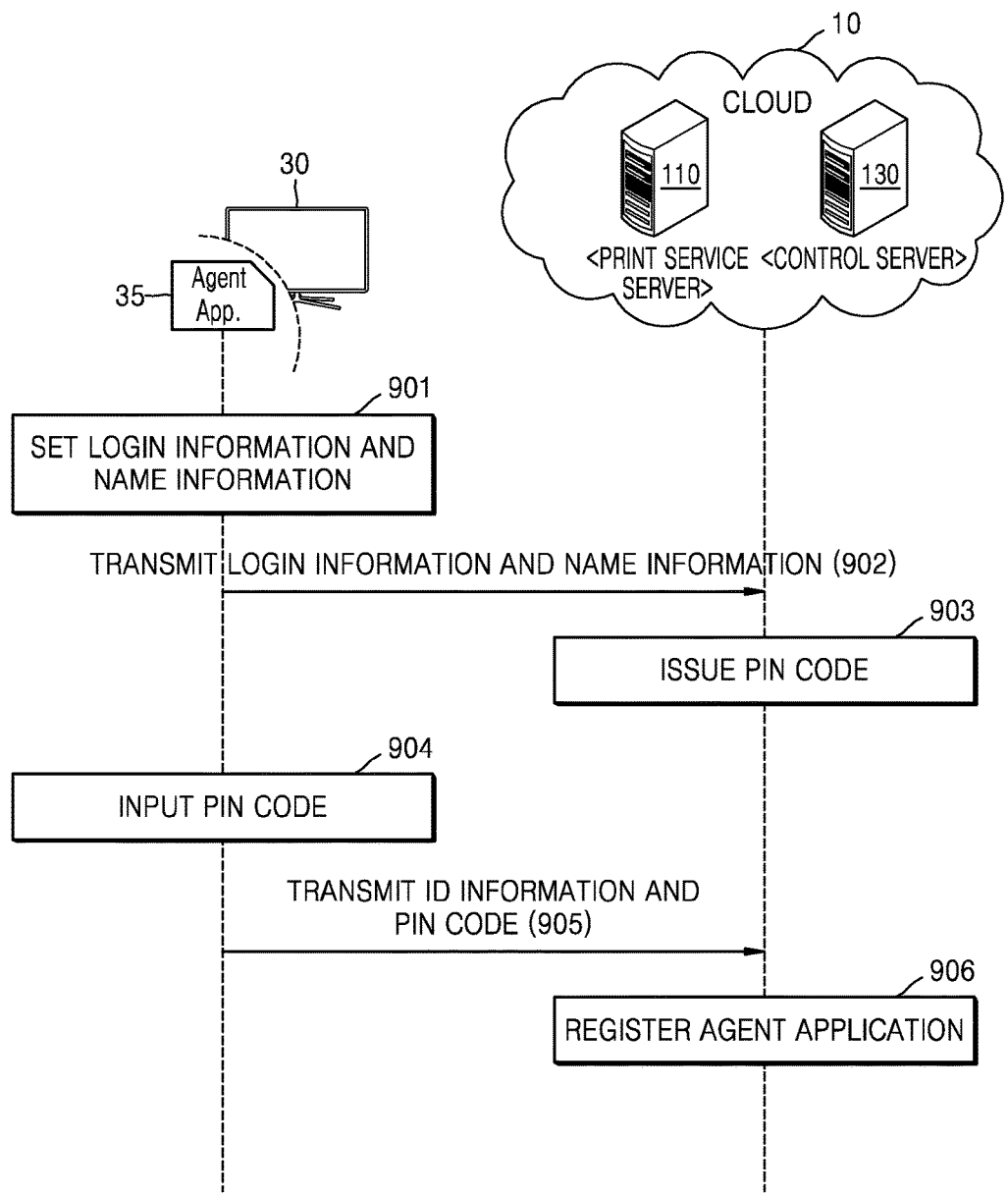
FIG. 9A is a diagram for describing a process of registering, by an agent application installed in a display device, the display device in a cloud, according to an exemplary embodiment.

FIG. 9A is a diagram for describing a process of registering, by the agent application 35 installed in the display device 30, the display device 30 in the cloud 10, according to an exemplary embodiment.

While describing FIG. 9A, details about some processes of transferring data and information between the servers 110 through 150 of the cloud 10, which have been described with reference to other drawings, may not be explicitly discussed, but such some processes may also be applied to FIG. 9A.

In operation 901, the agent application 35 installed in the display device 30 sets login information and name information to be assigned to the display device 30, which are input from the user of the display device 30. Here, the login information may be intrinsic login information assigned to the display device 30 or assigned to the user of the display device 30.

In operation 902, the agent application 35 transmits the login information and the name information to the print service server 110 of the cloud 10. The print service server 110 of the cloud 10 transmits the login information and the name information to the control server 130.

In operation 903, the control server 130 issues a personal identification number (PIN) code for identifying the agent application 35. Here, the PIN code issued by the control server 130 may be displayed on the display screen of the display device 30 to be provided to the user, or may be displayed on another device owned by the user of the display device 30 to be provided to the user.

In operation 904, the user of the display device 30 inputs the PIN code issued by the control server 130 by using a UI (not shown) of the display device 30 or a remote controller.

In operation 905, the agent application 35 transmits ID information of the display device 30, the ID information including a MAC address, an IP address, or a serial number of the display device, to the print service server 110, together with the PIN code. The print service server 110 transmits the ID information and the PIN code to the control server 130.

In operation 906, the control server 130 compares the received PIN code and the issued PIN code, and when they match, registers the agent application 35. Here, by registering the agent application 35, the display device 30 in which the agent application 35 is installed may also be registered.

Figure 9B:
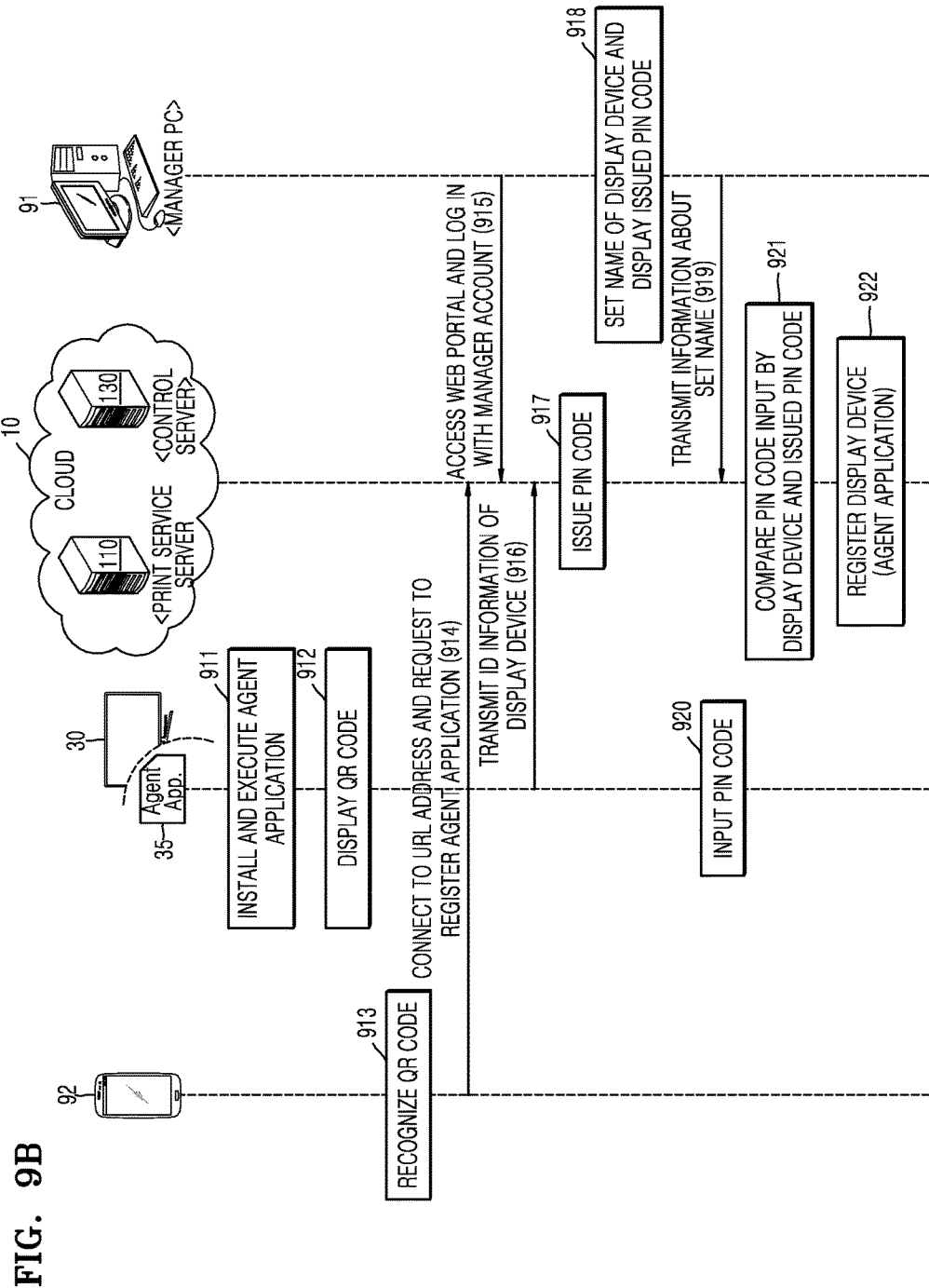
FIG. 9B is a diagram for describing a process of registering, by an agent application installed in a display device, the display device in a cloud, according to another exemplary embodiment.

FIG. 9B is a diagram for describing a process of registering, by the agent application 35 installed in the display device 30, the display device 30 in the cloud 10, according to another exemplary embodiment.

While describing FIG. 9B, details about some processes of transferring data and information between the servers 110 through 150 of the cloud 10, which have been described with reference to other drawings, may not be explicitly discussed, but such some processes may also be applied to FIG. 9B.

In operation 911, the display device 30 installs the agent application 35. The agent application 35 may be installed in the display device 30 by receiving an installation file of the agent application 35 from an external device (not shown) connected to the display device 30 wirelessly or wiredly. Alternatively, the agent application 35 may be installed in the display device 30 as a USB device (not shown) in which the installation file of the agent application 35 is installed is inserted into a USB port (not shown) of the display device 30 and the display device 30 receives the installation file from the USB device. Alternatively, when the display device 30 is a smart TV, the agent application 35 may be installed in the display device 30 by downloading the installation file of the agent application 35 through an application store for a smart TV. After the agent application 35 is installed, the display device 30 executes the agent application 35.

In operation 912, the display device 30 in which the agent application 35 is executed displays a QR code for registering the display device 30 (the agent application 35). Here, the QR code may include information about a URL address for accessing the cloud 10.

In operation 913, an electronic device 92 recognizes the QR code displayed on the display device 30. Here, the electronic device 92 may be the same as the electronic device 20 (e.g., of FIG. 1) described in other drawings or may be another device.

In operation 914, the electronic device 92 accesses the cloud 10 having the URL address obtained by recognizing the QR code. Then, the electronic device 92 requests the cloud 10 to register the display device 30 (or, specifically, the agent application 35).

In operation 915, manager PC 91 accesses a web portal (not shown) provided by the cloud 10 (e.g., via the print service server 110) and logs onto the web portal by using a manager account.

In operation 916, the display device 30 transmits ID information of the display device 30 to the cloud 10. Here, the ID information may include a MAC address, a serial number, and an IP address of the display device 30.

In operation 917, the cloud 10 issues a PIN code for authentication.

In operation 918, the manager PC 91 sets a name or a nickname of the display device 30 by using the web portal. Then, the manager PC 91 displays the PIN code issued by the cloud 10. A manager of the manager PC 91 notifies the displayed PIN code to the user of the display device 30.

In operation 919, the manager PC 91 transmits information about the name or the nickname of the display device 30 to the cloud 10.

In operation 920, the user of the display device 30 inputs the PIN code notified by the manager through a PIN code input window (not shown) displayed on the display device 30. Here, the user of the display device 30 may input the PIN code by using a remote controller or the like.

In operation 921, the cloud 10 receives the PIN code input from the display device 30. The cloud 10 (the control server 130) compares the PIN code input from the display device 30 and the PIN code issued by the cloud 10.

In operation 922, when the PIN codes match, the cloud 10 (the control server 130) registers the display device 30 (or, e.g., specifically, the agent application 35).

Unless there is contradiction in registration processes, an order of performing the processes of FIG. 9B may be slightly altered.

Figure 10:
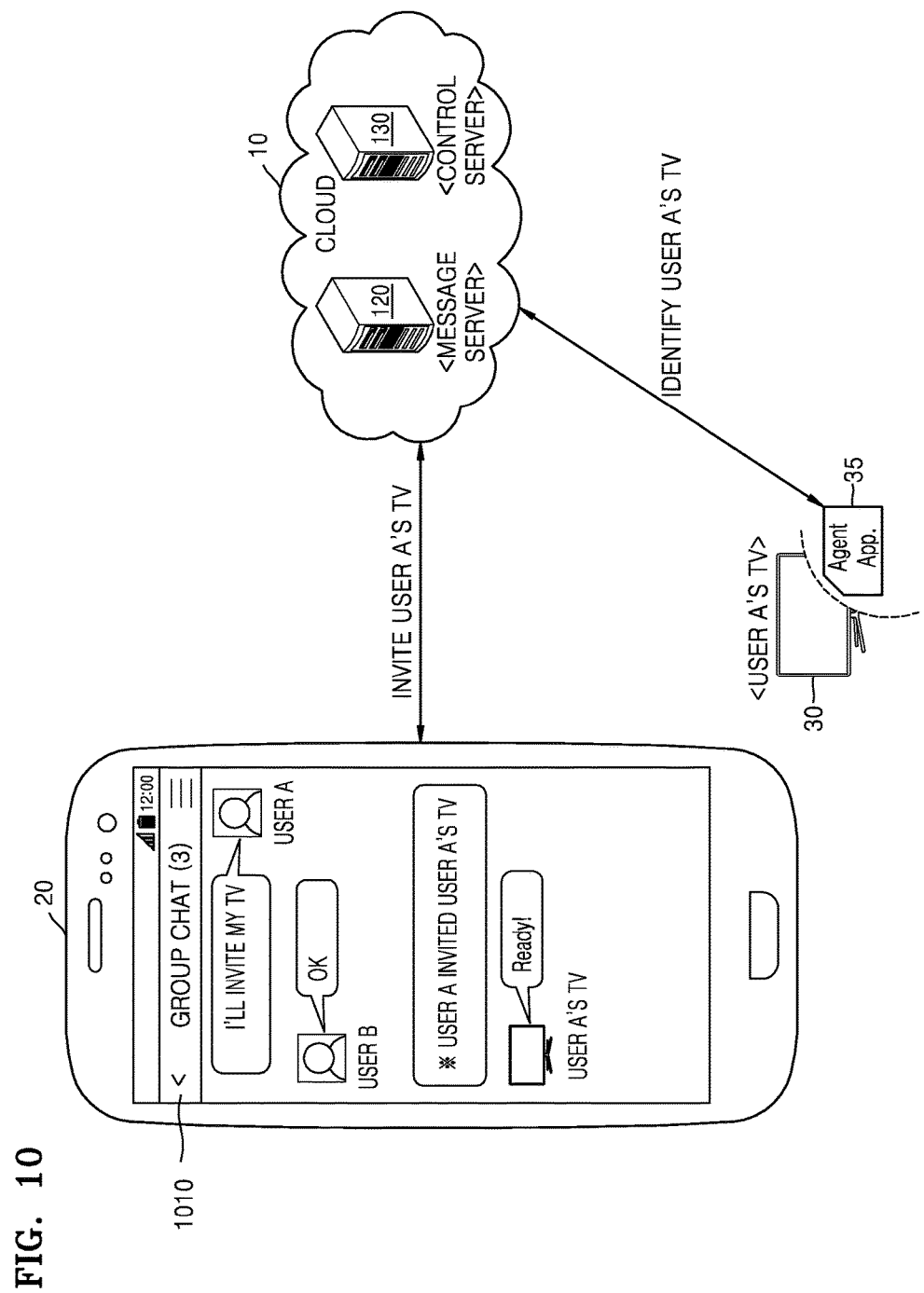
FIG. 10 is a diagram for describing inviting, by a chat room application being executed in an electronic device, a display device, according to an exemplary embodiment.

FIG. 10 is a diagram for describing inviting, by a chat room application being executed in the electronic device 20, the display device 30, according to an exemplary embodiment.

Referring to FIG. 10, it is assumed that the chat room application is being executed in the electronic device 20 of the user A, and the electronic device 20 and an electronic device (not shown) of a user B are first invited to a chat room 1010 of the chat room application. As described above, the chat room 1010 may be generated and managed by the control server 130 (Conference ChatBot) of the cloud 10.

The user A may invite the display device 30 (a TV) of the user A to the chat room 1010. When invitation of the display device 30 is requested from the user A in the chat room 1010, the electronic device 20 transmits an invitation request with respect to the display device 30 to the message server 120 of the cloud 10. The message server 120 transmits the invitation request to the control server 130 in the cloud 10.

The control server 130 identifies the display device 30 requested to be invited, and determines whether the display device 30 is currently registered in the cloud 10. When the display device 30 is registered in the cloud 10, the control server 130 invites the display device 30 to the chat room 1010. When the display device 30 is not registered in the cloud 10, the control server 130 may notify the user A to register the display device 30 by using the agent application 35.

After the display device 30 is invited to the chat room 1010 by the control server 130, a phrase indicating that the invitation is completed may be displayed on the chat room 1010.

Figure 11:
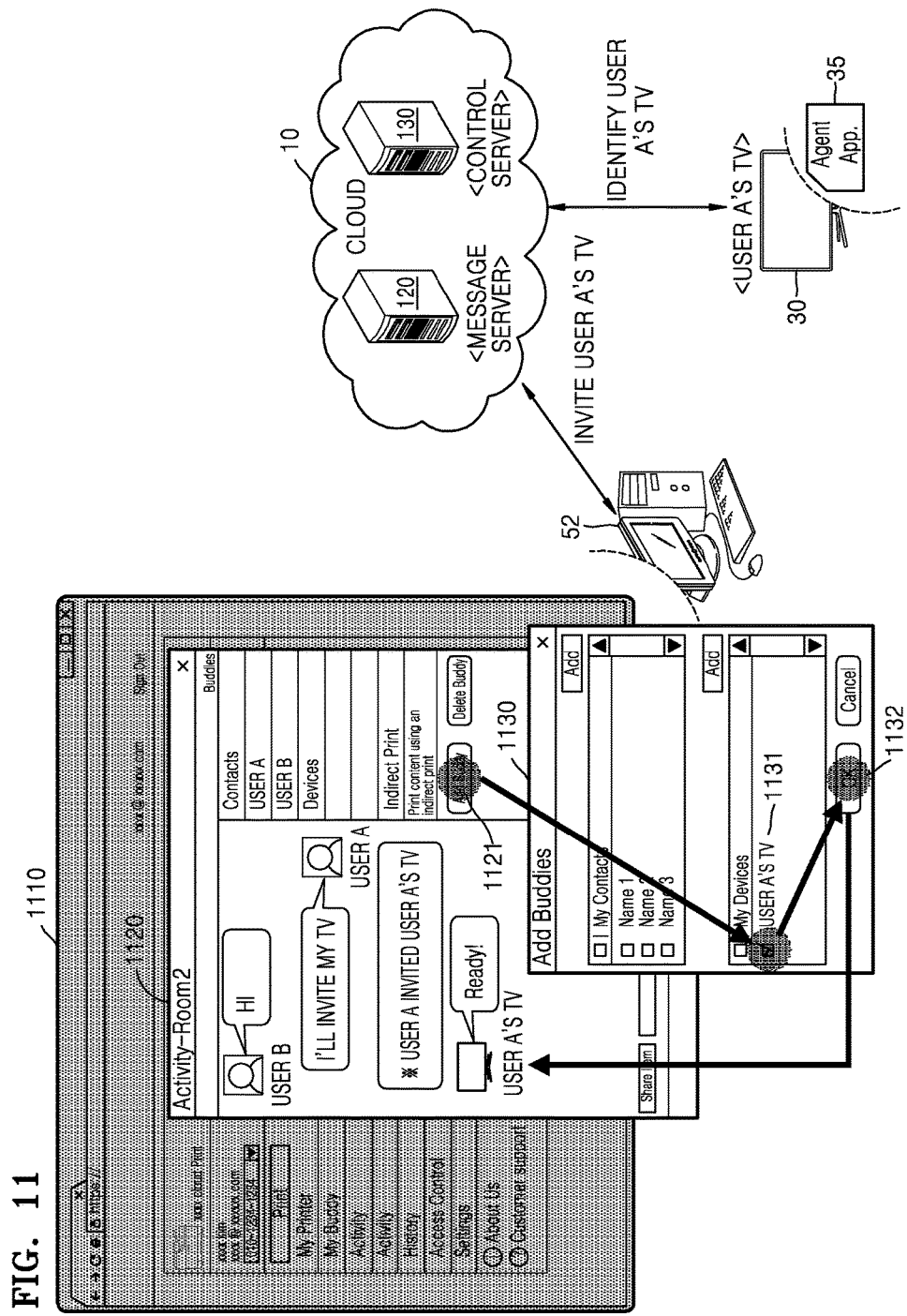
FIG. 11 is a diagram for describing inviting, by an agent application being executed in a personal computer (PC), a display device, according to an exemplary embodiment.

FIG. 11 is a diagram for describing inviting, by the agent application 35 being executed in the PC 52, the display device 30, according to an exemplary embodiment.

Unlike FIG. 10 in which a source device is the electronic device 20, FIG. 11 illustrates that the PC 52 is a source device. A cloud application 1110 is installed in the PC 52. The cloud application 1110 installed in the PC 52 may use various services, such as a display copy service, a CS service, a cloud print (hard copy or soft copy) service, provided by the cloud 10. The cloud application 1110 is a type of agent application, such as, for example, the agent application 35 of FIG. 7. The cloud application 1110 may include a function of the chat room application executed in the electronic device 20, which is described above with reference to FIG. 10.

The user A of the PC 52 may execute the cloud application 1110 on the PC 52, and activate a chat room 1120 from various functions of the cloud application 1110. In FIG. 11, it is assumed that the PC 52 of the user A and an electronic device (not shown) of the user B are first invited to the chat room 1120. As described above, the chat room 1120 may be generated and managed by the control server 130 (Conference ChatBot) of the cloud 10.

The user A may click a "Add Buddy" button 1121 through a UI of the chat room 1120 so as to invite the display device 30 (a TV) of the user A to the chat room 1120. When the "Add Buddy" button 1121 is clicked, a popup window 1130 displaying lists of addable contact numbers and devices may be displayed. When a "user A's TV" 1131 is selected and an OK button 1132 is clicked from the popup window 1130, invitation of the display device 30 is requested.

When the invitation of the display device 30 is requested by the user A in the chat room 1120, the PC 52 transmits an invitation request with respect to the display device 30 to the message server 120 of the cloud 10. The message server 120 transmits the invitation request to the control server 130.

The control server 130 identifiers the display device 30 requested to be invited, and determines whether the display device 30 is currently registered in the cloud 10. When the display device 30 is registered in the cloud 10, the control server 130 invites the display device 30 to the chat room 1120. When the display device 30 is not registered in the cloud 10, the control server 130 may notify the user A to register the display device 30 by using the agent application 35.

After the display device 30 is invited to the chat room 1120 by the control server 130, a phrase indicating that the invitation is completed may be displayed on the chat room 1120.

Referring to FIGS. 10 and 11, a source device is not limited as long as the chat room application or the cloud application 1110 is installable and operable, like the electronic device 20 (e.g., of FIG. 10) or the PC 52 (e.g., of FIG. 11).

Figure 12:
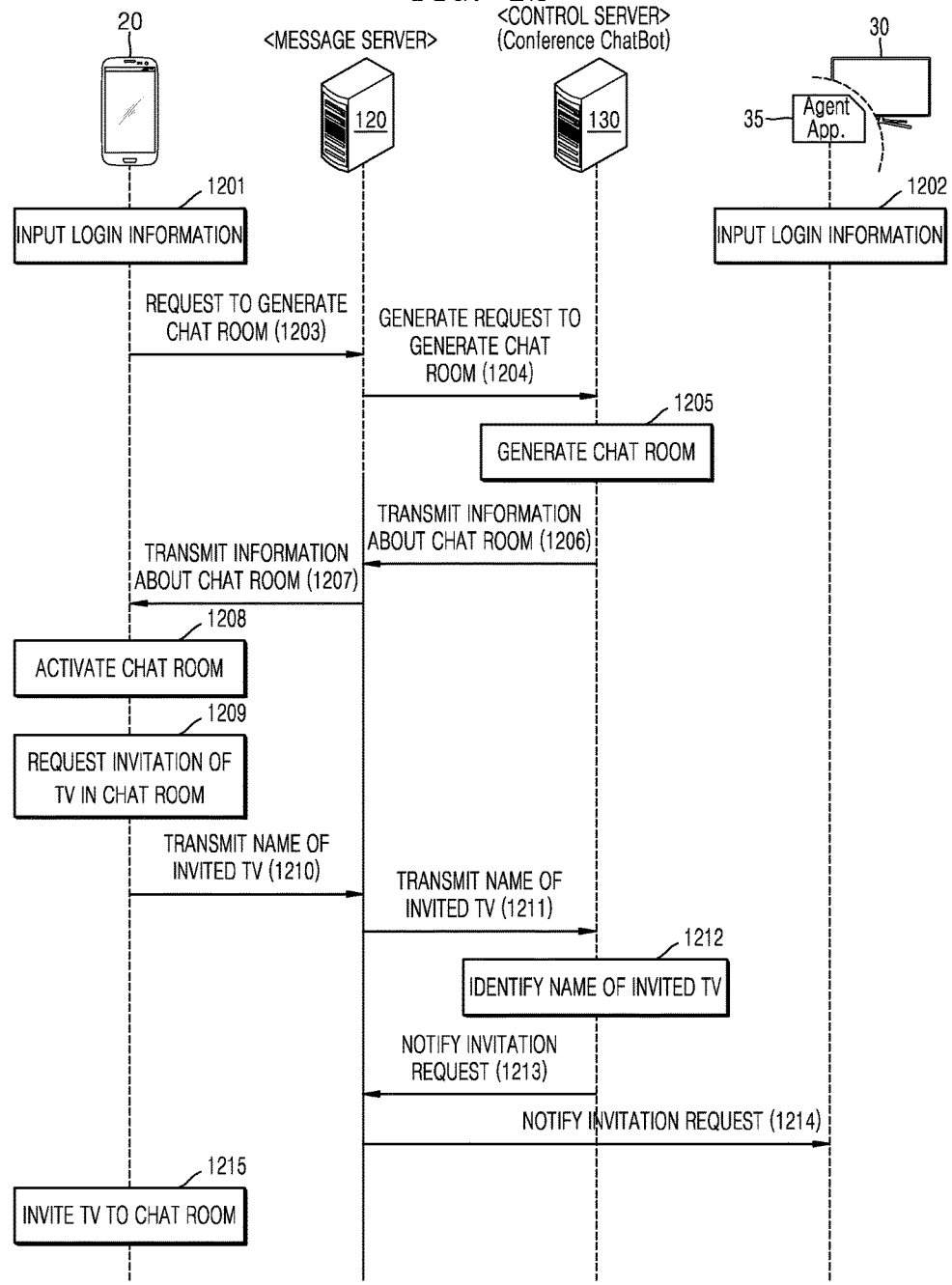
FIG. 12 is a diagram for describing processes of inviting, by a chat room application being executed in an electronic device, a display device, according to an exemplary embodiment.

FIG. 12 is a diagram for describing processes of inviting, by a chat room application (e.g., similar to the chat room application 1110 of FIG. 11) being executed in the electronic device 20, the display device 30, according to an exemplary embodiment.

While describing FIG. 12, details about some processes of transferring data and information between the servers 110 through 150 of the cloud 10, which have been described with reference to other drawings, may not be explicitly discussed, but such some processes may also be applied to FIG. 12.

In operation 1201, the user of the electronic device 20 inputs login information for executing the chat room application.

In operation 1202, the user of the display device 30 inputs login information for executing the agent application 35. When the display device 30 logs in to the cloud 10, a chat room list participatable by the display device 30 may be displayed on the display device 30. The chat room list may be received from the cloud 10. This time, the chat room list may include a public chat room to which a public attribute is assigned. Also, if a private chat room the display device 30 is allowed to participate exists, the chat room list may include the private chat room to which a private attribute is assigned. The chat room list includes a chat room generated by the electronic device 20 through operation 1205.

In operation 1203, the electronic device 20 requests the message server 120 to generate a chat room based on the login information.

In operation 1204, the message server 120 requests the request to generate the chat room to the control server 130.

In operation 1205, the control server 130 generates the chat room. At this time, the control server 130 may assign a public attribute or a private attribute to the generated chat room.

In operation 1206, the control server 130 transmits information about the chat room to the message server 120.

In operation 1207, the message server 120 transmits the information about the chat room to the electronic device 20.

In operation 1208, the electronic device 20 activates the chat room on the chat room application.

In operation 1209, the electronic device 20 requests invitation of the display device 30 (a TV) in the chat room.

In operation 1210, the electronic device 20 transmits a name of the display device 30 requested to be invited to the message server 120.

In operation 1211, the message server 120 transmits the name of the display device 30 to the control server 130.

In operation 1212, the control server 130 identifies the name of the display device 30. In other words, the control server 130 determines whether the name of the display device 30 is included in a list of devices that have been registered.

In operation 1213, the control server 130 notifies an invitation request with respect to the display device 30 to the message server 120.

In operation 1214, the message server 120 notifies the invitation request to the agent application 35 of the display device 30.

In operation 1215, after the display device 30 is invited to the chat room, the electronic device 20 may display a phrase indicating that the invitation is completed.

Figure 13:
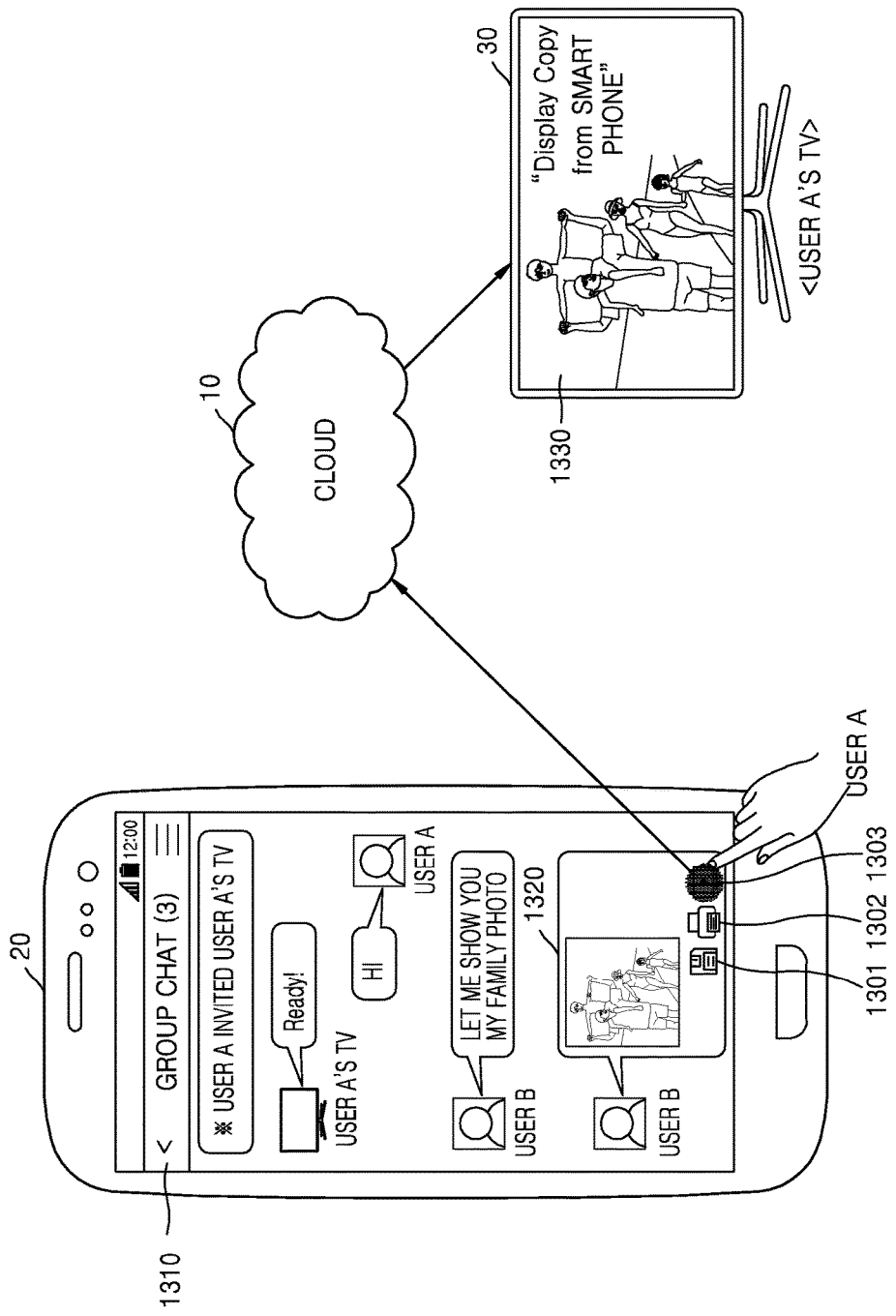
FIG. 13 is a diagram for describing performing, by an electronic device, a function of a display copy on content transmitted through a chat room, according to an exemplary embodiment.

FIG. 13 is a diagram for describing performing, by the electronic device 20, a function of a display copy on content transmitted through a chat room 1310, according to an exemplary embodiment.

In FIG. 13, the chat room application is being executed in the electronic device 20 of the user A, and the electronic device 20 of the user A, an electronic device (not shown) of the user B, and the display device 30 (a TV) of the user A are invited to the chat room 1310 activated on the chat room application.

The user A may chat with the user B through the chat room 1310. Also, the user B may transmit content 1320 in a photo file to the user A through the chat room 1310.

When the content 1320 is transmitted in the chat room 1310, various buttons, such as a store button 1301, a print button 1302, and a display copy button 1303, may also be displayed in a dialogue balloon (or a dialogue bubble) including the content 1320. The store button 1301 is used to store the content 1320 in the electronic device 20 of the user A. The print button 1302 is used to cloud-print (hard-copy) the content 1320 by using an MFP (e.g., the MFP 40 of FIG. 2) of the user A. The display copy button 1303 is used to display-copy the content 1320 by using the display device 30 of the user A.

When the user A clicks the display copy button 1303 in the chat room 1310, the content 1320 transmitted from the user B is transmitted to the cloud 10. Then, the cloud 10 renders or converts the content 1320 to obtain content 1330 via the processes described above with reference to FIGS. 7 and 8, and transmits the content 1330 to the display device 30. The content 1330 is displayed on the display screen of the display device 30 according to a request for a display copy by the electronic device 20.

In FIG. 13, since the content 1320 is a photo file, the cloud 10 may not render or convert the content 1320. However, even if the content 1320 is a photo file, the cloud 10 may render or convert the content 1320 to adjust a display format of the display device 30, such as resolution of the content 1320. In other words, whether to omit the rendering or converting in the cloud 10 may be determined based on a display format of the display device 30 that is a target device or a file format of the content 1320.

Figure 14:
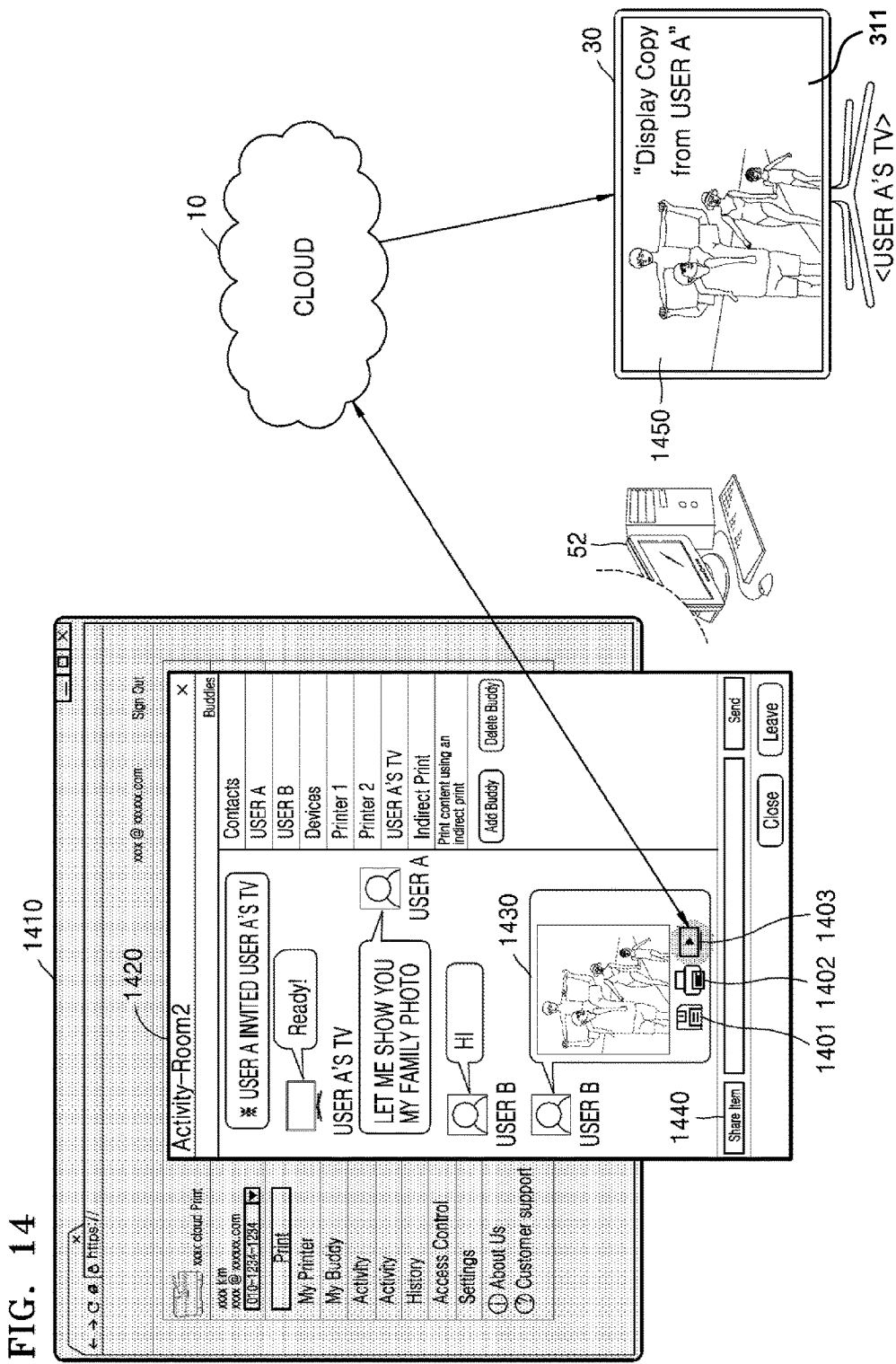
FIG. 14 is a diagram for describing performing, by a PC, a function of a display copy on content transmitted through a chat room, according to an exemplary embodiment.

FIG. 14 is a diagram for describing performing, by the PC 52, a function of a display copy on content transmitted through a chat room 1420, according to an exemplary embodiment.

In FIG. 14, a cloud application 1410 is being executed in the PC 52 of the user A, and the PC 52 of the user A, an electronic device (not shown) of the user A, the display device 30 (a TV) of the user A, Printer 1, Printer 2, etc. are invited to the chat room 1420 activated on the cloud application 1410.

The user A may chat with the user B through the chat room 1420. Also, the user B may transmit content 1430 in a photo file to the user A through the chat room 1420. Meanwhile, if the user A wants to transmit an image file or a document file to the user B, the user A clicks a "Share Item" button 1440 to search files stored in the PC 52 and transmits a selected file to the user B.

When the content 1430 is transmitted in the chat room 1420, various buttons, such as a store button 1401, a print button 1402, and a display copy button 1403, may be displayed in a dialogue balloon including the content 1430, together with the content 1430. The store button 1401 is used to store the content 1430 in the PC 52 of the user A. The print button 1402 is used to cloud-print (hard-copy) the content 1430 to the MFP (e.g., the MFP 40 of FIG. 2) of the user A. The display copy button 1403 is used to display-copy the content 1430 to the display device 30 (a TV) of the user A.

When the user A clicks the display copy button 1403 in the chat room 1420, the content 1430 transmitted from the user B is transmitted to the cloud 10. Then, the cloud 10 renders or converts the content 1430 to obtain content 1450 via the processes described above with reference to FIGS. 7 and 8, and transmits the content 1450 to the display device 30. The content 1450 is displayed on the display screen 311 of the display device 30 according to a request for a display copy by the electronic device 20.

Figure 15:
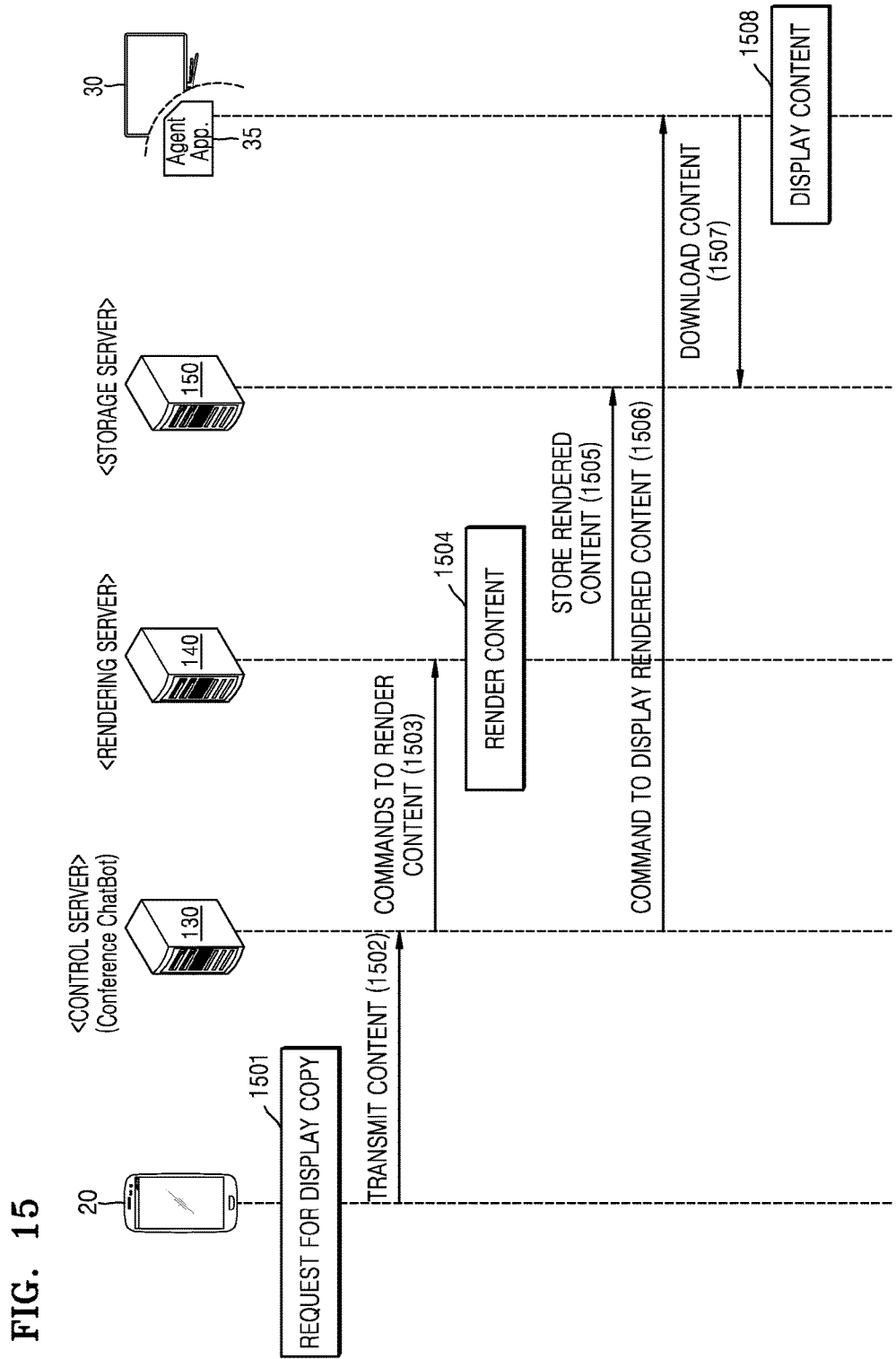
FIG. 15 is a diagram for describing performing, by an electronic device, a function of a display copy on content transmitted through a chat room, according to an exemplary embodiment.

FIG. 15 is a diagram for describing performing, by the electronic device 20, a function of a display copy on content transmitted through a chat room, according to an exemplary embodiment.

While describing FIG. 15, details about some processes of transferring data and information between the servers 110 through 150 of the cloud 10, which have been described with reference to other drawings, may not be explicitly discussed, but such some processes may also be applied to FIG. 15.

In operation 1501, the electronic device 20 requests for a display copy of content. The display copy may be requested by clicking the display copy button 1303 or 1403 of FIG. 13 or 14.

In operation 1502, the electronic device 20 transmits the content requested to be display-copied to the control server 130.

In operation 1503, the control server 130 commands the rendering server 140 to render the content.

In operation 1504, the rendering server 140 renders or converts the content.

In operation 1505, the storage server 150 stores the rendered or converted content (image files or a compressed file of the image files).

In operation 1506, the control server 130 transmits a command to display the rendered content to the agent application 35 of the display device 30.

In operation 1507, the agent application 35 downloads the rendered content (the image files or the compressed file of the image files) from the storage server 150.

In operation 1508, the display device 30 displays the content (the image files) requested to be display-copied.

Figure 16:
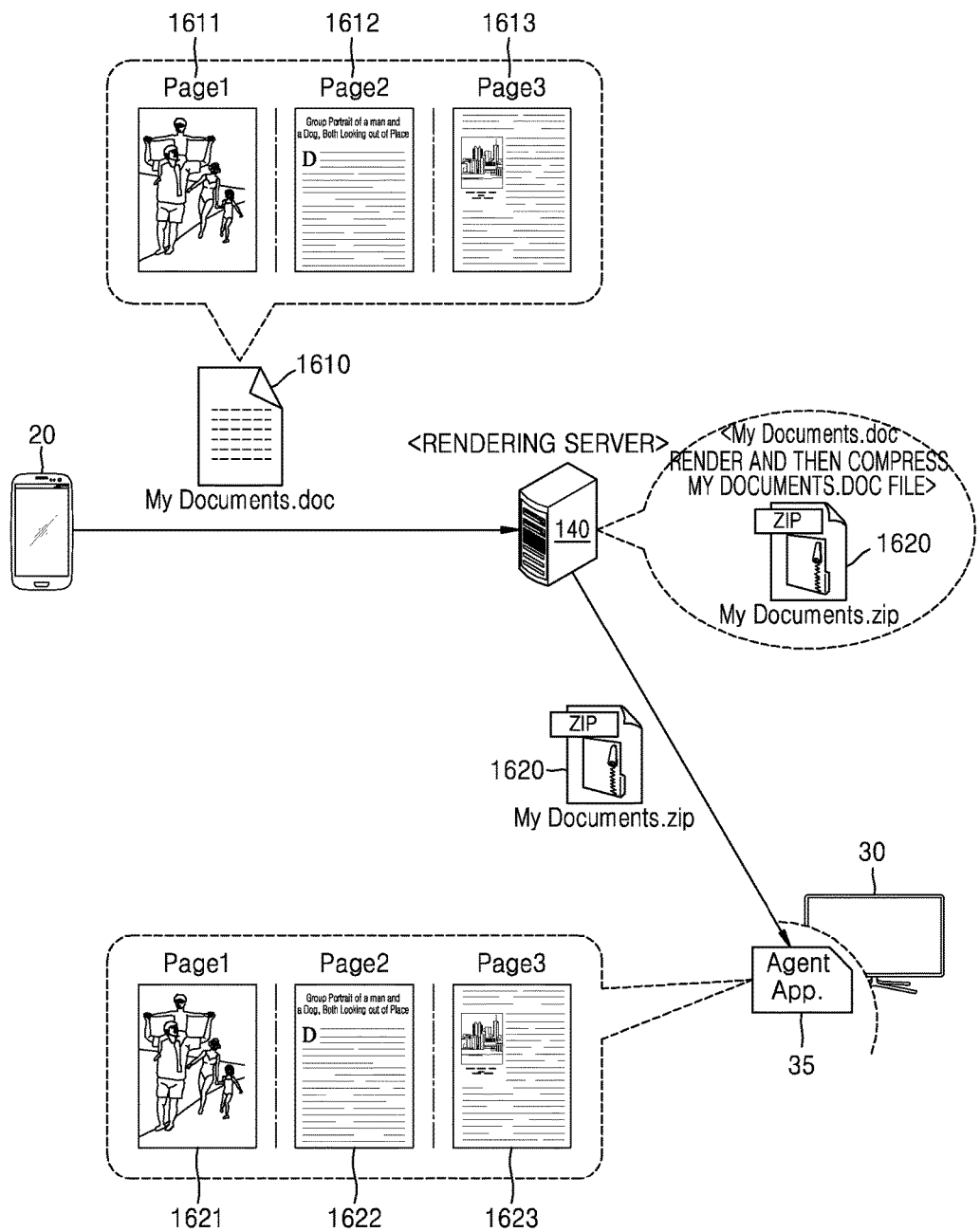
FIG. 16 is a diagram for describing a rendering process with respect to a content file, according to an exemplary embodiment.

FIG. 16 is a diagram for describing a rendering process with respect to a content file, according to an exemplary embodiment.

Referring to FIG. 16, the electronic device 20 transmits a document file 1610 ("My Documents.doc") requested to be display-copied to the rendering server 140. As described above, it may be assumed that the document file 1610 prepared by using Microsoft Word is in a file format that is not directly displayable by the display device 30.

The document file 1610 may include content of total three pages, i.e., first through third pages 1611 through 1613. For example, in the document file 1610, content of the first page 1611 may be a photo, and content of the second and third pages 1612 and 1613 may be an essay.

The rendering server 140 renders or converts the first through third pages 1611 through 1613 of the document file 1610 according to a display format of the display device 30 to obtain rendered or converted first through third pages 1621 through 1623. For example, the rendering server 140 may render or convert each of the first through third pages 1611 through 1613 to a graphic file format, such as JPG, GIF, or BMP. Then, the rendering server 140 may generate a compressed file 1620 ("My Documents.zip") by compressing the rendered or converted first through third pages 1621 through 1623.

The rendering server 140 transmits the compressed file 1620 to the display device 30. The agent application 35 installed in the display device 30 decompresses the compressed file 1620. Accordingly, the agent application 35 obtains image content of the rendered or converted first through third pages 1621 through 1623 from the compressed file 1620. The display device 30 displays the image content of the rendered or converted first through third pages 1621 through 1623 to complete the display copy requested by the electronic device 20. At this time, when a certain page, for example, the rendered or converted first page 1621, is requested to be displayed from the control server 130, the display device 30 may first display the certain page, i.e., the rendered or converted first page 1621.

Meanwhile, in FIG. 16, the rendering server 140 provides the content 1610 in form of the compressed file 1620 to the display device 30, but alternatively, the rendering server 140 may provide image files including the rendered or converted first through third pages 1621 through 1623, instead of the compressed file 1620, to the display device 30. According to an exemplary embodiment, the rendering server 140 may or may not perform compression based on a total file size of image files to be compressed. For example, when the total file size is larger than a threshold size, the rendering server 140 may generate a compressed file, and when the total file size is equal to or smaller than the threshold size, the rendering server 140 may not generate a compressed file. In other words, a file generating method of the rendering server 140 is not limited.

Figure 17:
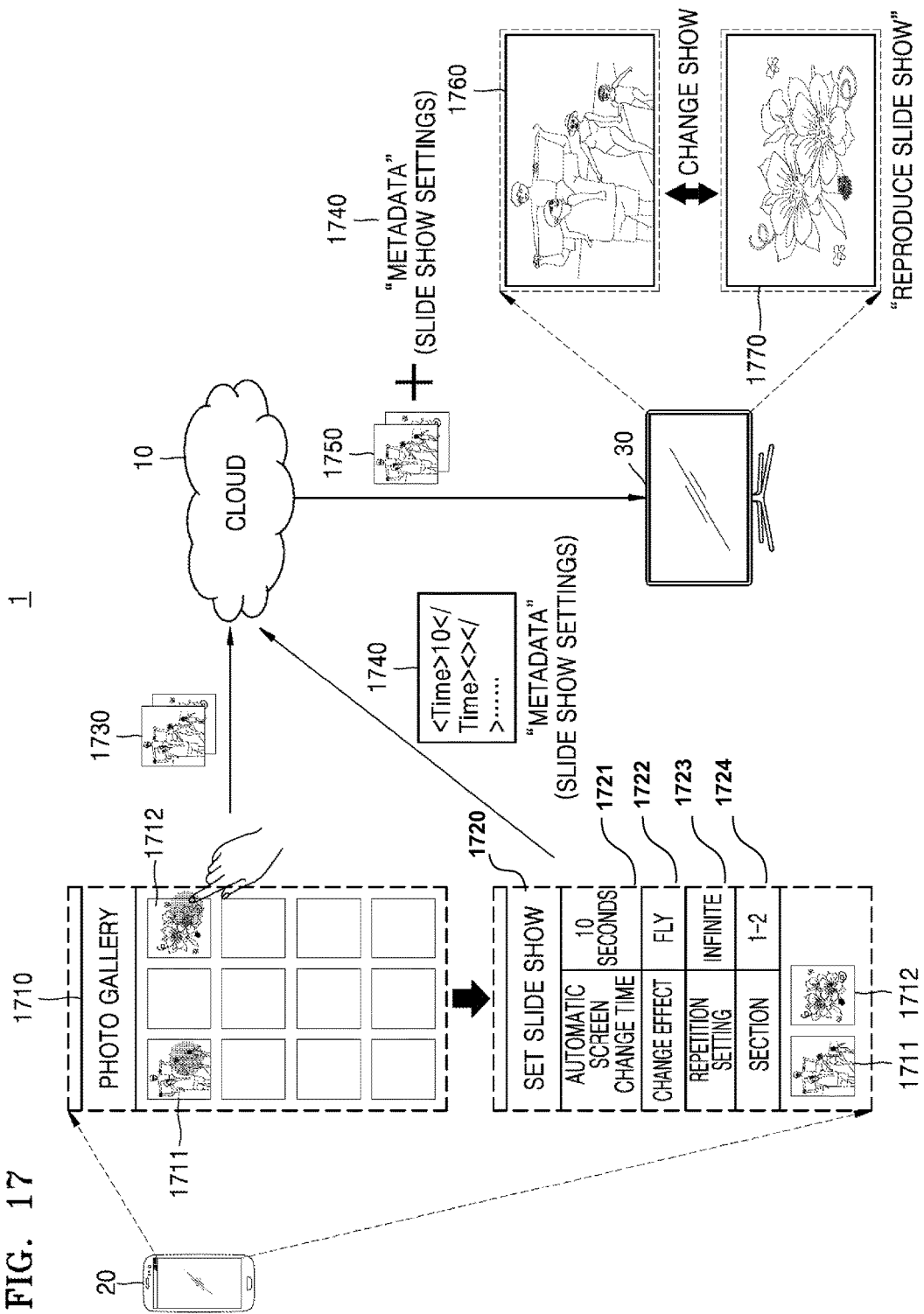
FIG. 17 is a diagram for describing reproducing, by a display device, content transmitted from an electronic device, in a slide show, according to an exemplary embodiment.

FIG. 17 is a diagram for describing reproducing, by the display device 30, content transmitted from the electronic device 20, in a slide show, according to an exemplary embodiment.

Referring to FIG. 17, the user of the electronic device 20 selects photos 1711 and 1712 through a photo gallery application 1710. Then, the electronic device 20 displays a UI screen 1720 showing slide show settings for reproducing a slide show of the photos 1711 and 1712. Here, a slide show may be reproduced by the display device 30 that is a target device of a display copy, instead of the electronic device 20.

The slide show settings may include a setting on an automatic screen change time 1721, a setting on a change effect 1722, a repetition setting 1723, and a section setting 1724. The slide show settings for reproducing a slide show, which are input through the electronic device 20, may be converted to metadata 1740.

In FIG. 17, a slide show of the photos 1711 and 1712 in the photo gallery application 1710 is reproduced, but alternatively, content manufactured by using presentation applications, such as, for example, Microsoft PowerPoint application, or word processing applications, such as, for example, Microsoft Word application stored in the electronic device 20 may be reproduced in a slide show.

The electronic device 20 transmits photo files 1730 of the selected photos 1711 and 1712, and the metadata 1740 to the cloud 10.

The cloud 10 generates an image file 1750 (or a compressed file) by rendering or converting the photo files 1730 to an image file format via the rendering or converting processes described above. Then, the cloud 10 transmits the image file 1750 and the metadata 1740 to the display device 30.

The display device 30 reproduces photos 1760 and 1770 included in the image file 1750 based on the slide show settings included in the metadata 1740. For example, the photos 1760 and 1770 may be reproduced to be changed at intervals of 10 seconds in a flying effect, as set by the electronic device 20.

Figure 18:
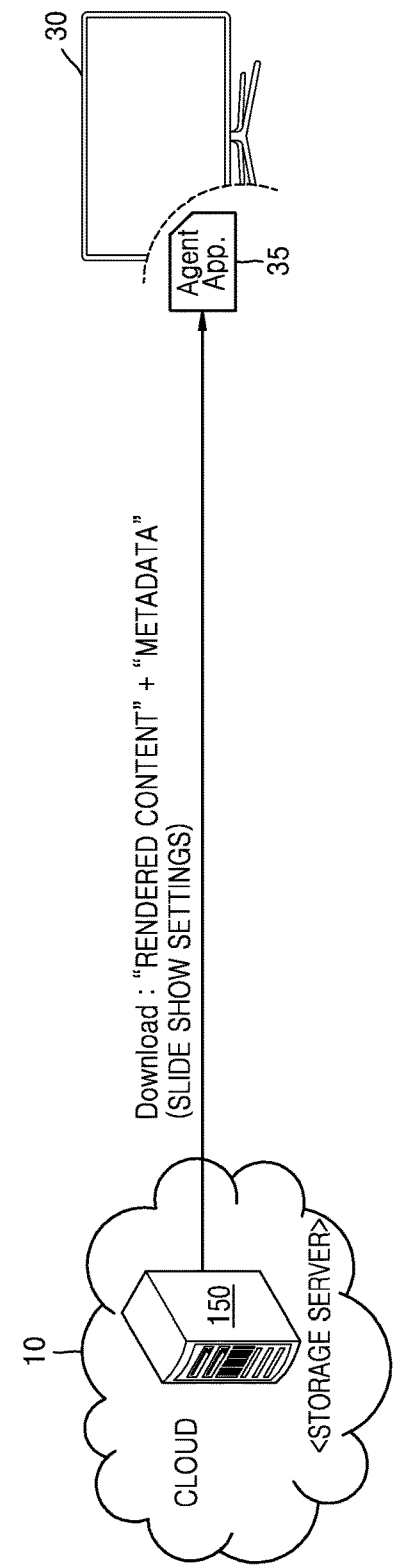
FIG. 18 is a diagram for describing receiving, by a display device, metadata related to slide show settings, according to an exemplary embodiment.

FIG. 18 is a diagram for describing receiving, by the display device 30, metadata related to slide show settings, according to an exemplary embodiment.

Referring to FIG. 18, content transmitted from a source device, for example, the electronic device 20 of FIG. 17, which requested for a display copy, may be rendered or converted and then stored in the storage server 150 of the cloud 10. Also, the metadata related to slide show settings may be stored in the storage server 150.

The agent application 35 of the display device 30 receives the rendered or converted content and the metadata from the storage server 150 of the cloud 10. Then, the display device 30 reproduces the content in a slide show based on the slide show settings (e.g., in the slide show screen 1720 of FIG. 17) included in the metadata.

Figure 19:
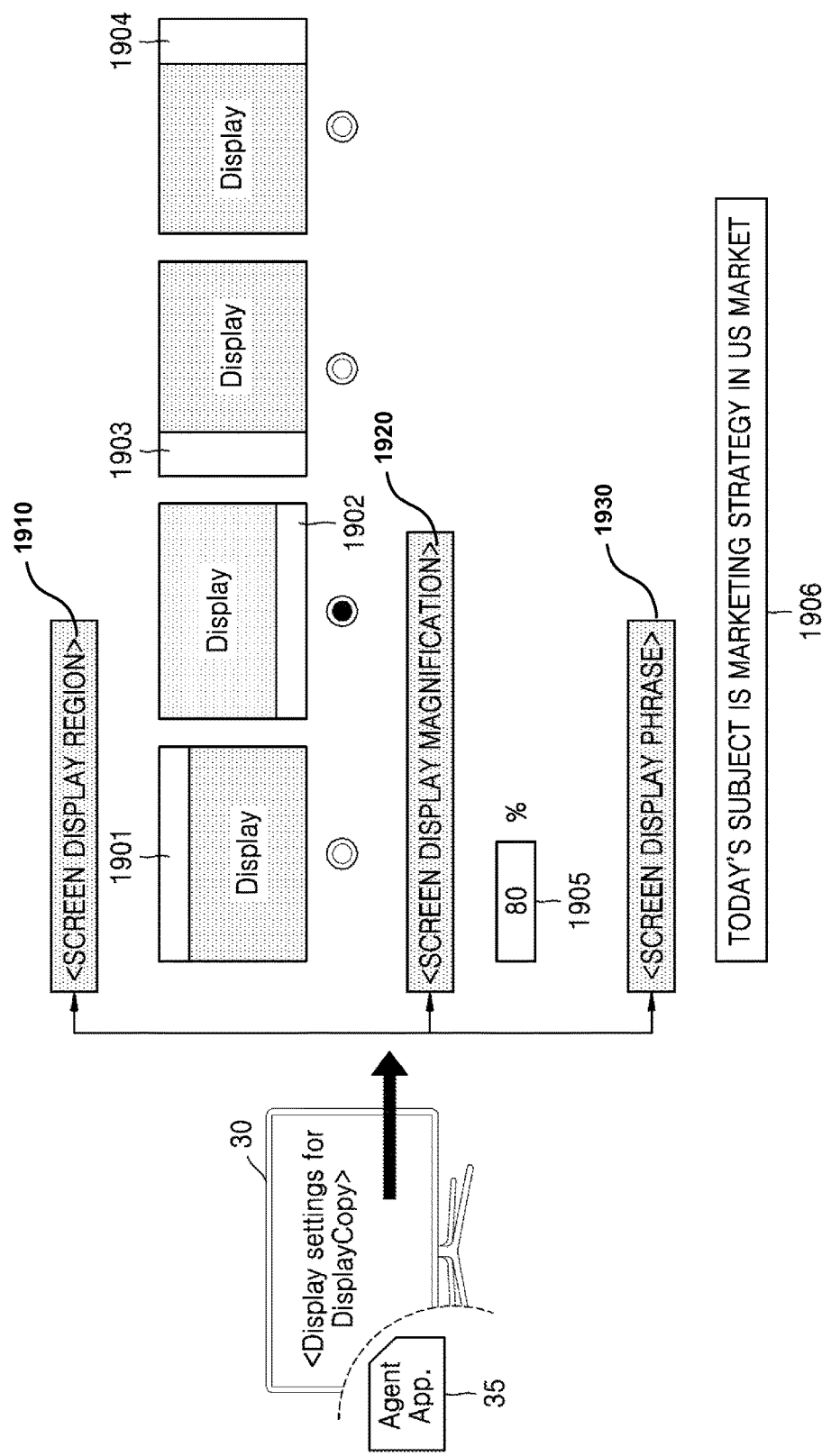
FIG. 19 is a diagram for describing display settings for a display device to display content requested for a display copy, according to an exemplary embodiment.

FIG. 19 is a diagram for describing display settings for the display device 30 to display content requested for a display copy, according to an exemplary embodiment.

Referring to FIG. 19, the display device 30 may set, for example, a screen display region 1910, a screen display magnification 1920, and a screen display phrase 1930, as the display settings. Such display settings may be managed by the agent application 35.

The display setting on the screen display region 1910 is a setting on a location of a region where the content is to be displayed or a location of a margin. For example, the display device 30 may set a top margin 1901, a bottom margin 1902, a left margin 1903, and a right margin 1904, as the display setting on the screen display region 1910. The content may be displayed in a region excluding the top, bottom, left, and right margins 1901 through 1904.

The display setting on the screen display magnification 1920 is a setting on a proportion of the region where the content is displayed in a screen of the display device 30. For example, when the screen display magnification 1920 is 80% 1905, only 80% of the screen of the display device 30 may be set as the region where the content is to be displayed, and 20% of the screen may be set as the margin. For example, when the screen display region 1910 is set to be the top margin 1901 and the screen display magnification 1920 is set to be 80%, the display device 30 uses 20% at the top as the margin and 80% at the bottom to display the content.

The display setting on the screen display phrase 1930 is a setting on a phrase to be displayed in a margin. For example, when the screen display region 1910 is set to be the top margin 1901, the screen display magnification 1920 is set to be 80%, and the screen display phrase 1930 is set to be "Today's subject is marketing strategy in US market", the display device 30 displays a phrase "Today's subject is marketing strategy in US market" 1906 in 20% at the top set as the margin and display the content in 80% at the bottom to display the content from among the screen of the display device 30.

Meanwhile the display settings may be set by a remote controller (not shown) for manipulating the display device 30, by a target device (not shown), such as a touch screen of the display device 30, or by a source device (not shown), such as the electronic device 20 (e.g., of FIG. 17) or the MFP 40 (e.g., of FIG. 2) described above.

FIGS. 20A through 20D are diagrams for describing performing, by the display device 30, a display setting on a screen display phrase, according to exemplary embodiments.

Referring to FIGS. 20A through 20D, the display setting may be input by a remote controller 37 that manipulates various functions of the display device 30. Alternatively, although not shown in FIGS. 20A through 20D, the display setting may be input by another type of a controller, such as a wearable device, which may be paired with the display device 30 to manipulate various functions of the display device 30.

Figure 20A:
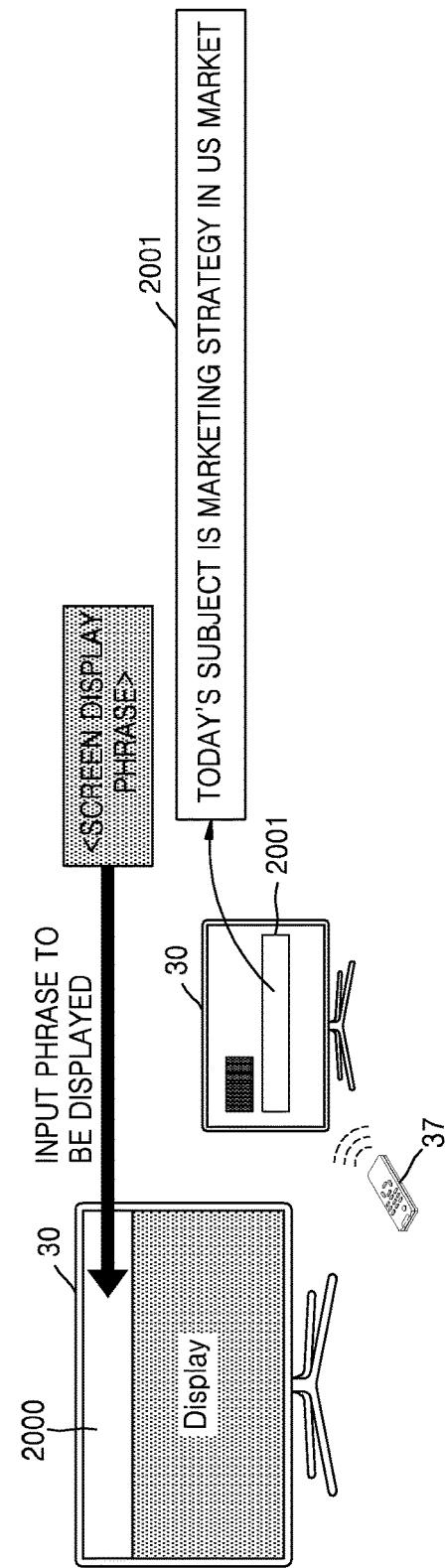
FIGS. 20A through 20D are diagrams for describing performing, by a display device, a display setting on a screen display phrase, according to exemplary embodiments.

Referring to FIG. 20A, a user may manipulate the remote controller 37 to directly input the screen display phrase "Today's subject is marketing strategy in US market" through a setting screen 2001 on the display device 30. The screen display phrase set as such may be displayed in a margin 2000 where content is not displayed.

Figure 20B:
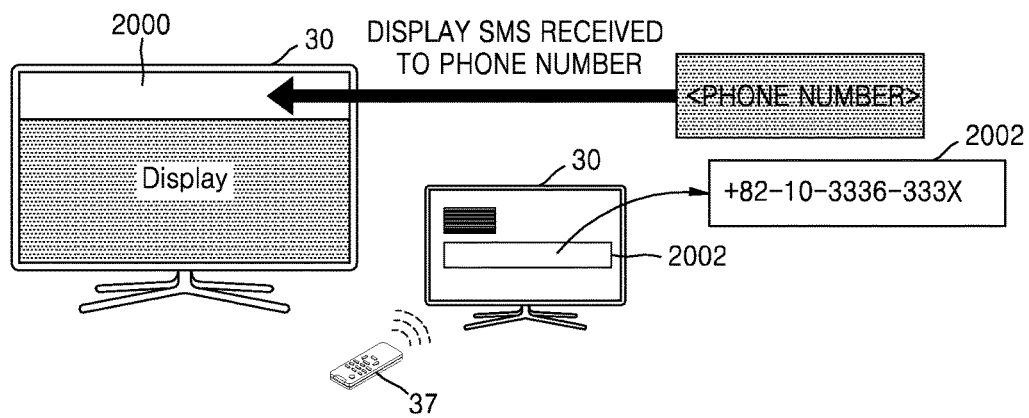
Figure 20C:
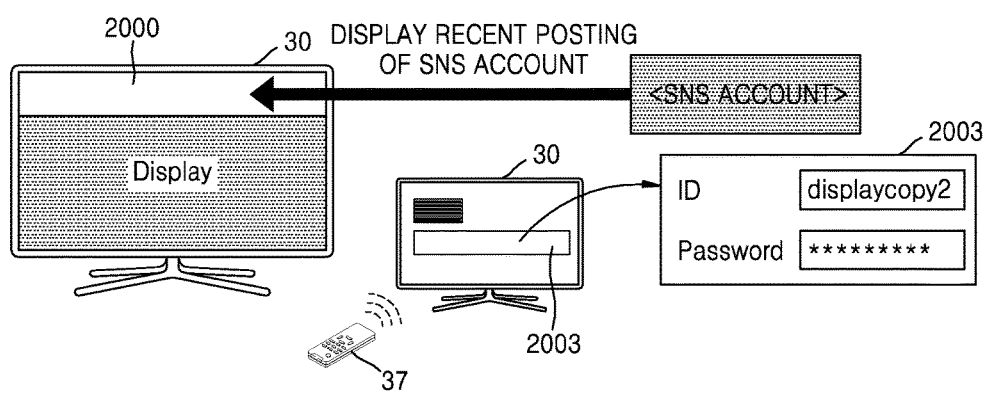
Figure 20D:
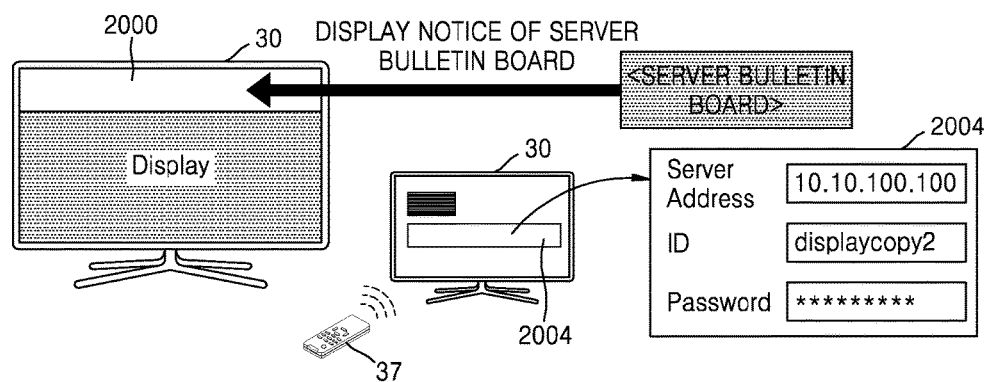

In FIGS. 20B through 20D, the display device 30 may display a short message service (SMS) or a posting existing in an external device or an external server, instead of displaying the screen display phrase input by the user like FIG. 20A.

Referring to FIG. 20B, the user may manipulate the remote controller 37 to input a phone number of a smart phone to which an SMS or a multimedia messaging service (MMS) is to be provided, through a setting screen 2002 on the display device 30. Accordingly, the SMS or the MMS may be displayed in the margin 2000.

Referring to FIG. 20C, the user may manipulate the remote controller 37 to input social networking service (SNS) account information (ID and a password) for logging in to an SNS server through a setting screen 2003 on the display device 30. Accordingly, a recent posting updated in an SNS may be displayed in the margin 2000.

Referring to FIG. 20D, the user may manipulate the remote controller 37 to input information (a server address, ID, and a password) required to identify a web server and log in to the web server, through a setting screen 2004 on the display device 30. Accordingly, a recent notice updated in the web server may be displayed in the margin 2000.

Figure 21:
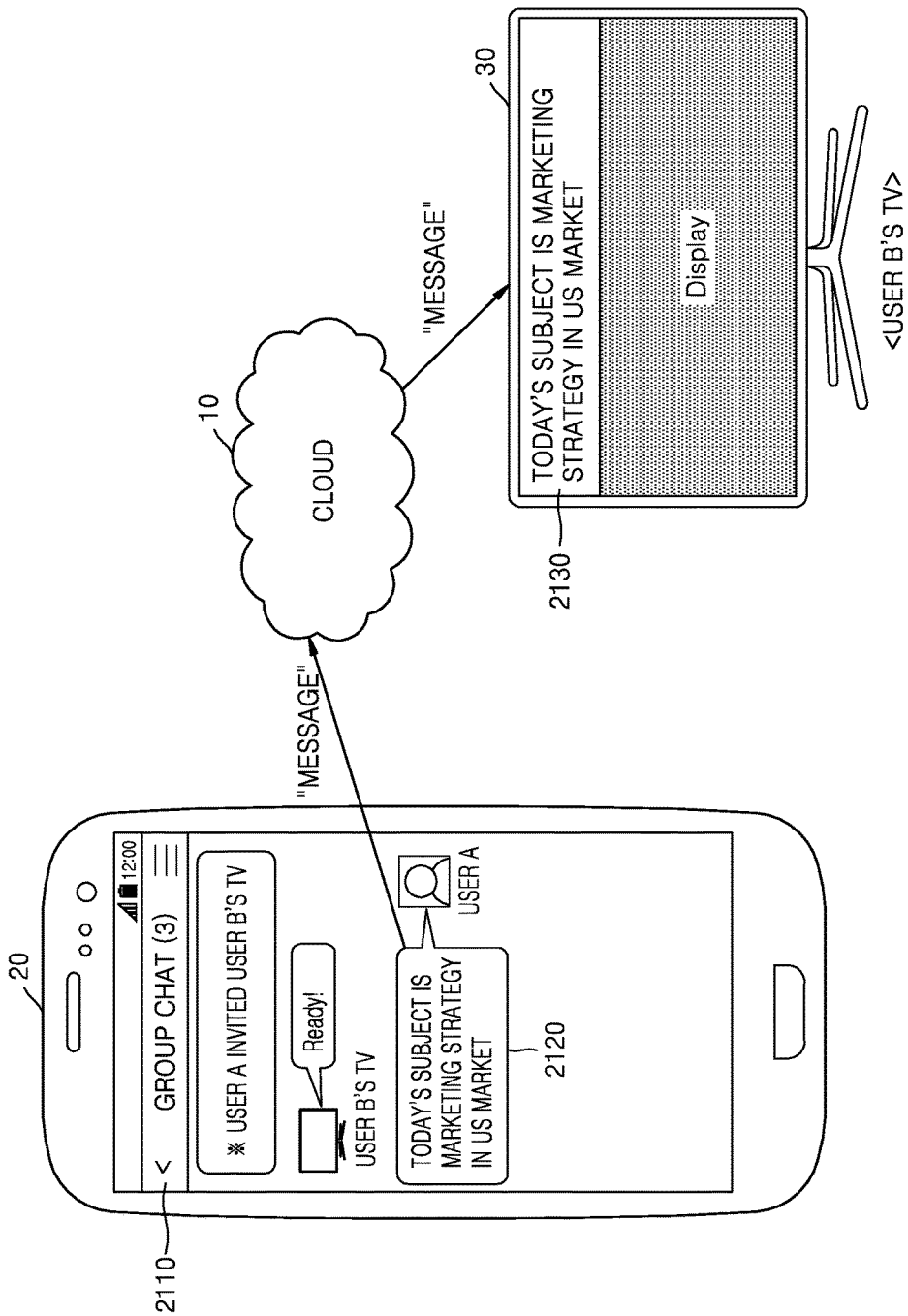
FIG. 21 is a diagram for describing displaying a chat message input from an electronic device on a display device, according to an exemplary embodiment.

FIG. 21 is a diagram for describing displaying a chat message 2120 input from the electronic device 20 on the display device 30, according to an exemplary embodiment.

Referring to FIG. 21, as described above, the cloud 10 may manage a chat room 2110 in which the electronic device 20 of the user A and the display device 30, for example, a TV, of the user B are participating, and the chatting message 2120 input through the chat room 2110. Accordingly, the electronic device 20 transmits the chat message 2120 input to the chat room 2110 to the cloud 10.

When a margin 2130 is set in the display device 30, the cloud 10 may transmit the chat message 2120 to the display device 30, and the display device 30 may display the chat message 2120 in the margin 2130. At this time, the display device 30 may display only the chat message 2120 that is recently input to the chat room 2110, in the margin 2130.

Figure 22:
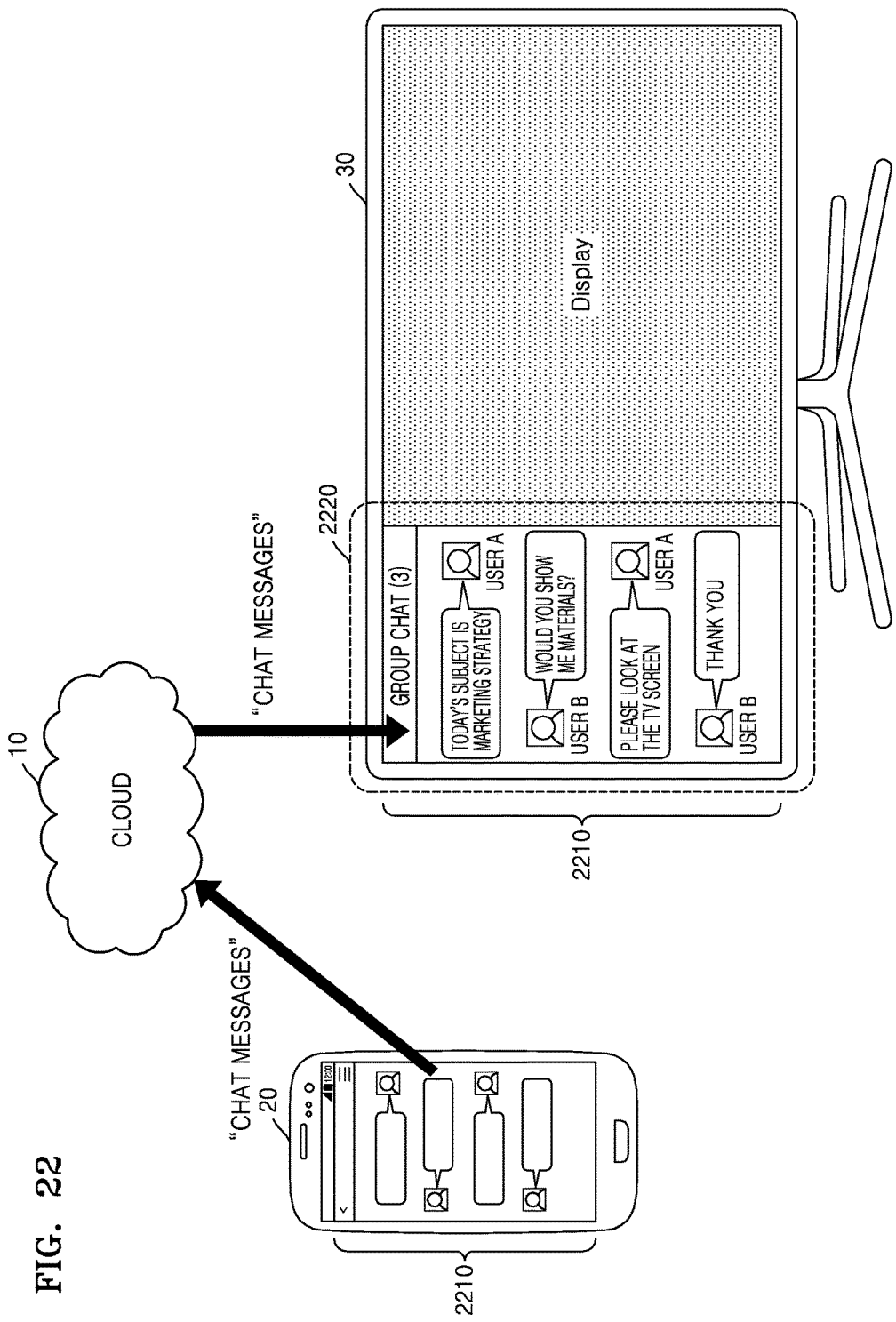
FIG. 22 is a diagram for describing displaying, by a display device, a chat room in which an electronic device is currently participating, according to an exemplary embodiment.

FIG. 22 is a diagram for describing displaying, by the display device 30, a chat room 2210 in which the electronic device 20 is currently participating, according to an exemplary embodiment.

Referring to FIG. 22, as described above, the cloud 10 may manage the chat room 2210 in which the electronic device 20 of the user A and the display device 30, for example, a TV, of the user B are participating, and chat messages input through the chat room 2210.

When a margin 2220 is set in the display device 30, the cloud 10 may transmit information about the chat room 2210 in which the display device 30 is currently participating, and the chat messages of the chat room 2210 to the display device 30, and the display device 30 may display the chat room 2210 in the margin 2220, similarly to the electronic device 20.

Figure 23:
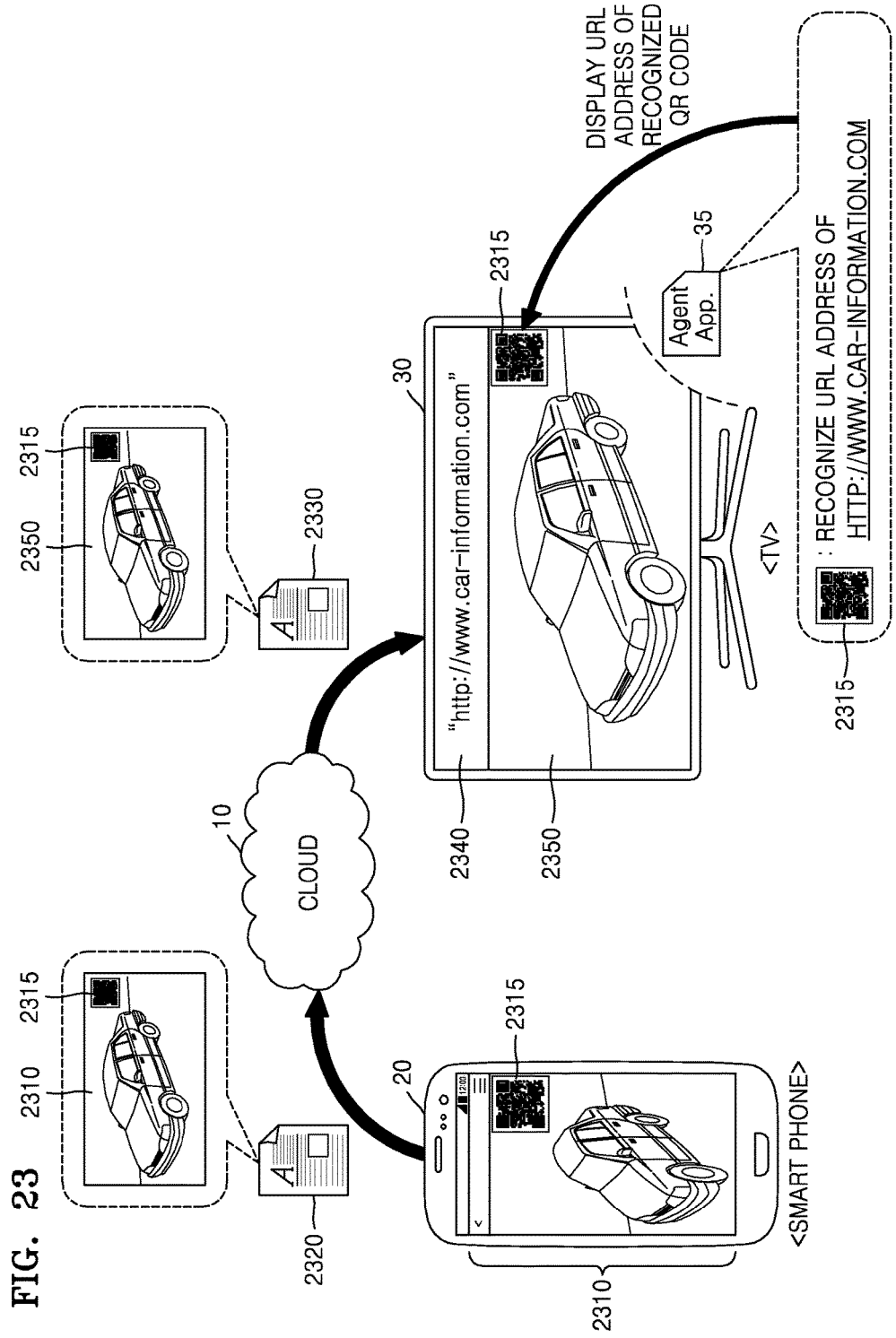
FIG. 23 is a diagram for describing requesting, by an electronic device, for a display copy with respect to content including a quick response (QR) code, according to an exemplary embodiment.

FIG. 23 is a diagram for describing requesting, by the electronic device 20, for a display copy with respect to content including a QR code, according to an exemplary embodiment.

Referring to FIG. 23, the electronic device 20 transmits a photo file 2320 of a photo 2310 stored in the electronic device 20 to the cloud 10. Here, an image of a QR code 2315 is included in the photo 2310.

The cloud 10 renders or converts the photo file 2320 to be displayable by the display device 30. In other words, the cloud 10 renders or converts the photo file 2320 to a photo file 2330 (or an image file) displayable by the display device 30. Here, since the QR code 2315 is a partial image of the photo 2310, a photo 2350 obtained by rendering or converting the photo file 2320 to the photo file 2330 may also include the QR code 2315. The cloud 10 transmits the photo file 2330 of the photo 2350 to the display device 30 (the agent application 35).

When the photo 2350 of the photo file 2330 includes the QR code 2315, the agent application 35 of the display device 30 recognizes the QR code 2315. For example, when the QR code 2315 indicates a certain URL address ("http://www-.car-information.com"), the agent application 35 may analyze the QR code 2315 and recognize the certain URL address.

When a margin 2240 is set in the display device 30, the display device 30 may display the certain URL address included in the QR code 2315 in the margin 2240, and display the photo 2350 including the QR code 2315 in a region other than the margin 2240.

Figure 24:
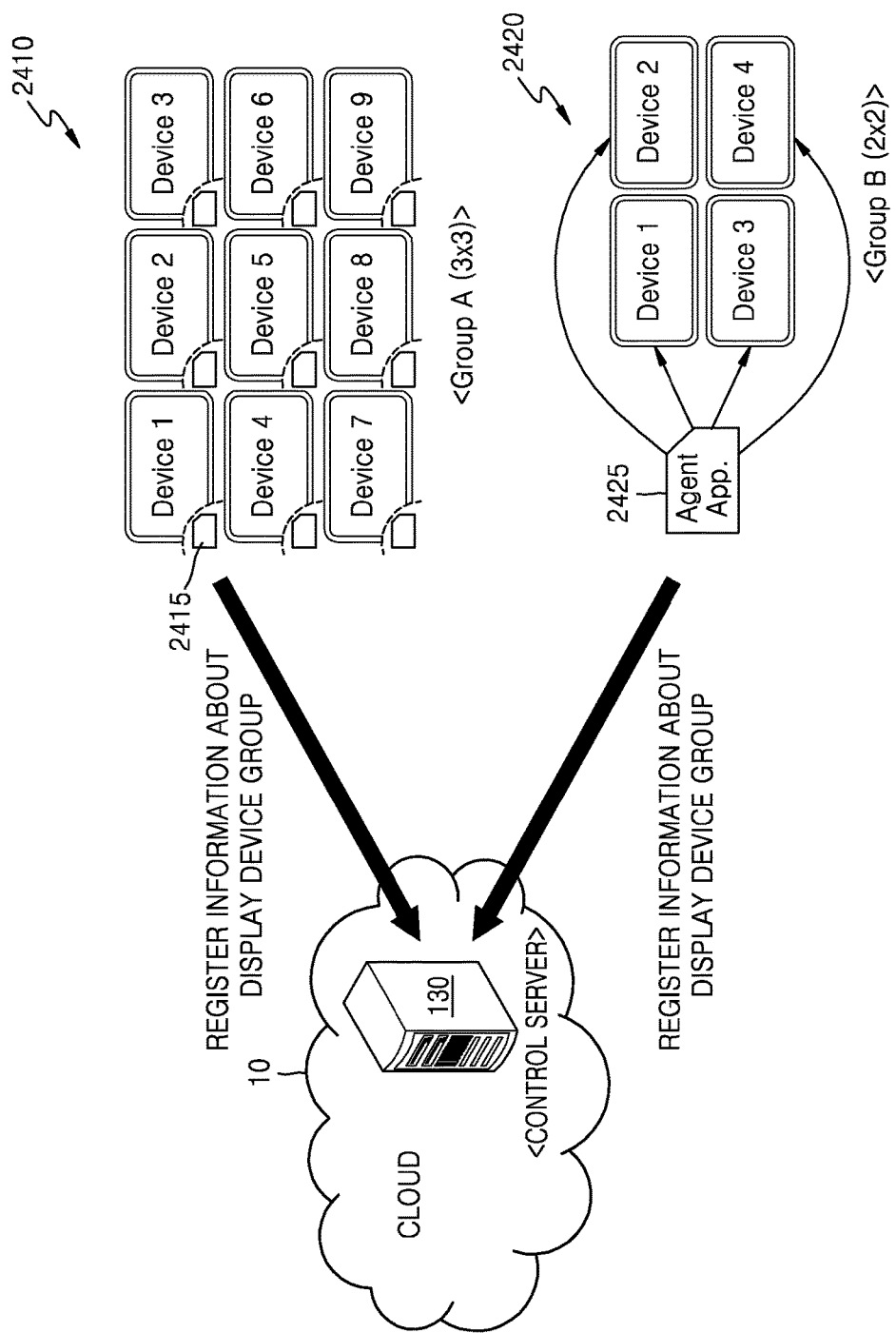
FIG. 24 is a diagram for describing registering information about multiple display devices arranged in an array form, in a cloud, according to an exemplary embodiment.

FIG. 24 is a diagram for describing registering information about multiple display devices arranged in an array form, in the cloud 10, according to an exemplary embodiment.

Referring to FIG. 24, the number of devices corresponding to target devices of a display copy may be at least two devices, wherein the devices may be grouped. For example, a display device group A 2410 of FIG. 24 may include total 9 display devices Device1 through Device9. The display devices Device1 through Device9 of the display device group A 2410 may be arranged in a 3×3 array form. Alternatively, a display device group B 2420 of FIG. 24 may include total 4 display devices Device1 through Device4. The display devices Device1 through Device4 of the display device group B 2420 may be arranged in a 2×2 array form. The number and arranged form of display devices are arbitrarily set in FIG. 24, and thus are not limited thereto.

An agent application 2415 may be installed in each of the display devices Device1 through Device9 in the display device group A 2410. Alternatively, the display devices Device1 through Device4 in the display device group B 2420 may be controlled by an agent application 2425 installed in an external device. Alternatively, although not shown, an agent application may be installed in one of display devices in a display device group, and the display devices may be controlled by the agent application. As such, an exemplary embodiment is not limited.

In FIG. 6, a process of registering the display device 30 in the cloud 10 through the agent application 35 installed in the display device 30 has been described. In FIG. 6, the number of display devices 30 is one.

However, as shown in FIG. 24, when multiple display devices that are grouped are target devices for a display copy, the cloud 10 receives information about a group of the multiple display devices from the group. In detail, the display device group A 2410 transmits, to the cloud 10, information about the number of display devices Device1 through Device9 in the display device group A 2410, resolution of each of the display devices Device1 through Device9, and an arranged shape of the display devices Device1 through Device9. The control server 130 of the cloud 10 registers the display device group A 2410 as a target device based on the received information. Similarly, the display device group B 2420 transmits, to the cloud 10, information about the number of display devices Device1 through Device4 in the display device group B 2420, resolution of each of the display devices Device1 through Device4, and an arranged shape of the display devices Device1 through Device4. The control server 130 of the cloud 10 registers the display device group B 2420 as a target device based on the received information.

Figure 25:
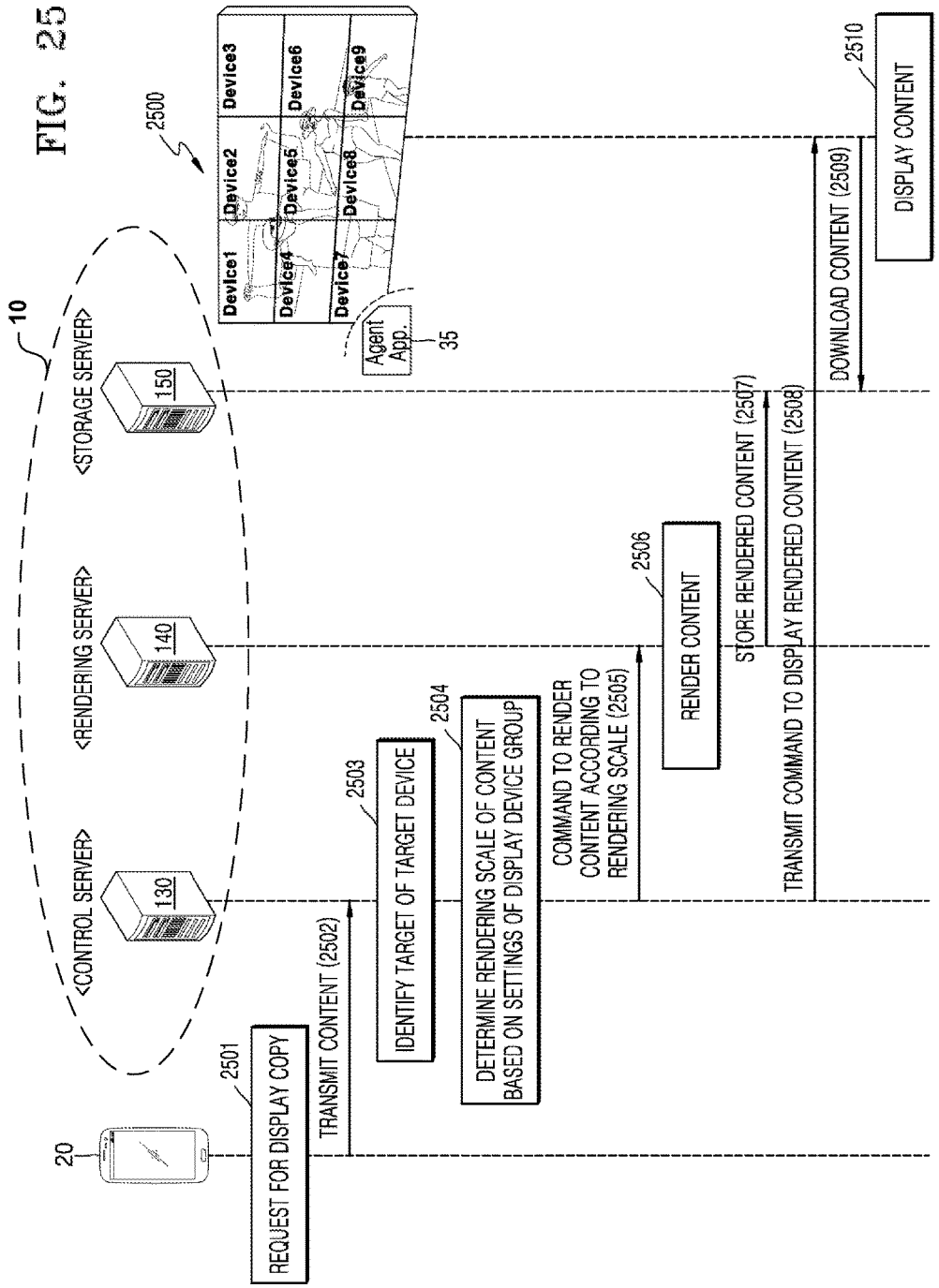
FIG. 25 is a diagram for describing a process of performing, by an electronic device, a display copy targeting multiple display devices that are grouped, according to an exemplary embodiment.

FIG. 25 is a diagram for describing a process of performing, by the electronic device 20, a display copy targeting multiple display devices that are grouped, in the cloud 10, according to an exemplary embodiment.

In operation 2501, the electronic device 20 requests for a display copy on content. The display copy may be requested by clicking the display copy button 1303 or 1403 described above with reference to FIG. 13 or 14.

In operation 2502, the electronic device 20 transmits the content requested to be display-copied to the control server 130.

In operation 2503, the control server 130 identifies a type of a target device to display the content. Here, the identified target device may be a display device group 2500 including display devices Device1 through Device9.

In operation 2504, the control server 130 determines a rendering scale of the content based on settings of the display device group 2500, for example, information about the number of display devices Device1 through Device9, resolution of each of the display devices Device1 through Device9, and an arranged shape of the display devices Device1 through Device9. Here, the rendering scale may denote information about whether to display pages of the content respectively on the display devices Device1 through Device9 or to display one page of the content on the display devices Device1 through Device9 by splitting the one page, and about resolution of the content to be rendered according to resolution of a display device for displaying the content.

In operation 2505, the control server 130 commands the rendering server 140 to render the content according to the rendering scale.

In operation 2506, the rendering server 140 renders or converts the content.

In operation 2507, the storage server 150 stores the rendered or converted content.

In operation 2508, the control server 130 transmits a command to display the rendered or converted content to the agent application 35 of the display device group 2500.

In operation 2509, the agent application 35 downloads the rendered or converted content from the storage server 150.

In operation 2510, the display device group 2500 displays the content requested to be display-copied.

Figure 26:
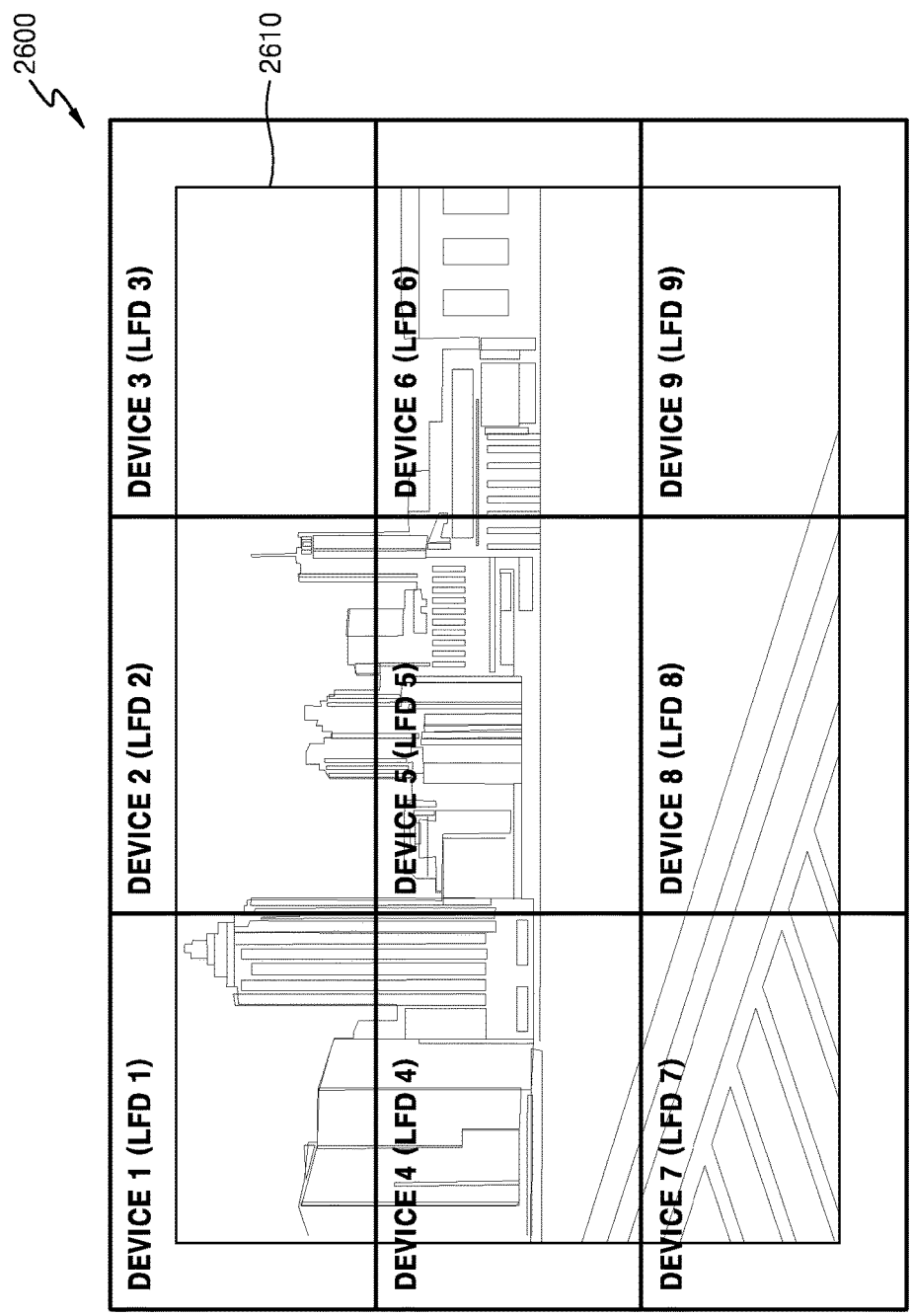
FIG. 26 is a diagram for describing displaying any one page of content on multiple display devices that are grouped, by splitting the any one page, according to an exemplary embodiment.

FIG. 26 is a diagram for describing displaying a singular page 2610 of content on multiple display devices that are grouped, by splitting the singular page 2610, according to an exemplary embodiment.

Referring to FIG. 26, a display device group 2600 may include display devices Device1 through Device9 that are arranged in a 3×3 array form. The display device group 2600 may be, for example, an outdoor billboard or a video wall including large format displays LFD1 through LFD9. The singular page 2610 of the content requested to be display-copied is split into nine pieces, and the nine pieces may be respectively displayed on the display devices Device1 through device9. In other words, the display device group 2600 may display the singular page 2610 of the content.

FIG. 27 is a diagram for describing displaying several pages 2701 through 2709 of content respectively on multiple display devices that are grouped, according to an exemplary embodiment.

Referring to FIG. 27, a display device group 2700 may include display devices Device1 through Device9 arranged in a 3×3 array form. The display device group 2700 may be, for example, an outdoor billboard or a video wall including large format displays LFD1 through LFD9. When the content requested to be display-copied include images of 9 pages 2701 through 2709, the display devices Device1 through Device9 may simultaneously and respectively display the 9 pages 2701 through 2709. In other words, the display device Device1 may display the page 2701 and the display device Device9 may display the page 2709.

Alternatively, the display device group 2600 or 2700 may display pages of content requested to be display-coped by combining methods described above with reference to FIGS. 26 and 27. In other words, one page of the content may be displayed through the display devices Devices1 through Device5, and pages of the content may be respectively displayed through the display devices Device6 through Device9. In other words, an exemplary embodiment is not limited.

Figure 28A:
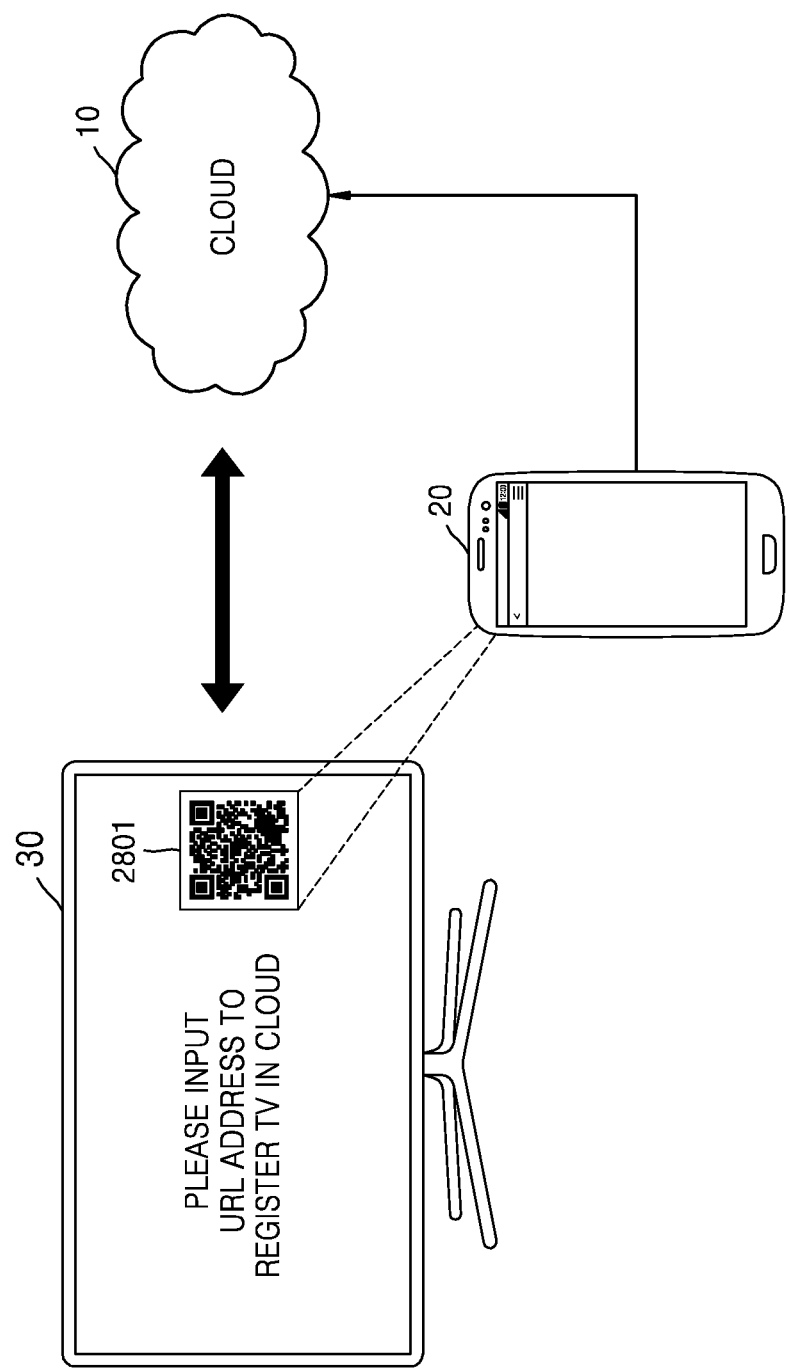
FIG. 28A is a diagram for describing registering a display device in a cloud by using a QR code, according to an exemplary embodiment.

FIG. 28A is a diagram for describing registering the display device 39 in the cloud 10 by using a QR code 2801, according to an exemplary embodiment.

Referring to FIG. 28A, the display device 30 displays a message "Please scan QR code to register TV in cloud" on a screen, together with the QR code 2801.

A user may recognize the QR code 2801 displayed on the display device 30 by using a camera module of the electronic device 20. The QR code 2801 issued by the display device 30 may include information about ID information (an MAC address, a serial number, and an IP address) of the display device 30 and a unique name (nickname) of the display device 30. Accordingly, by recognizing the QR code 2801, the electronic device 20 may obtain the ID information and the unique name of the display device 30.

The electronic device 20 transmits information obtained by recognizing the QR code 2801 (the ID information and the unique name of the display device 30) to the cloud 10.

The cloud 10 may register the display device 30 by using the information received from the electronic device 20.

Figure 28B:
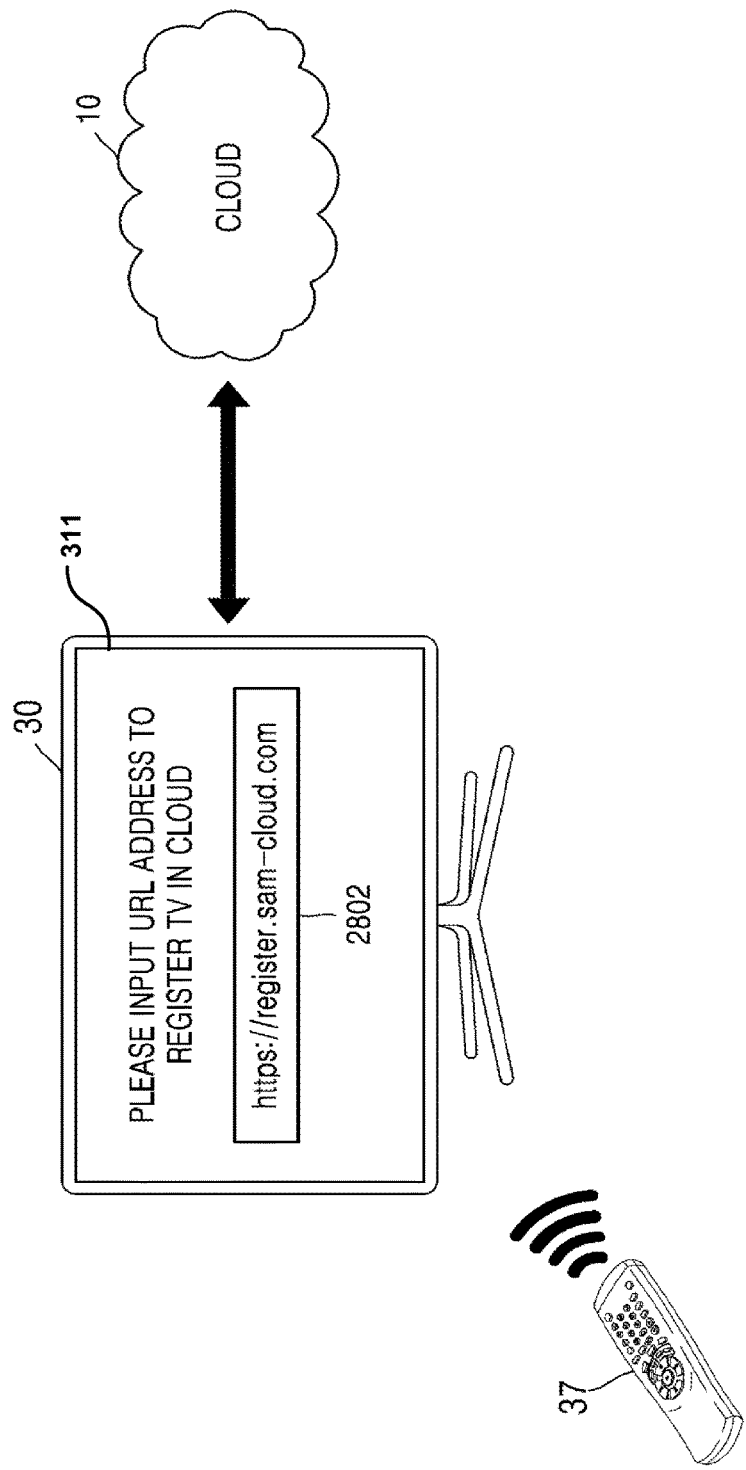
FIG. 28B is a diagram for describing registering a display device in a cloud by manipulating a remote controller, according to an exemplary embodiment.

FIG. 28B is a diagram for describing registering the display device 30 in the cloud 10 by manipulating the remote controller 37, according to an exemplary embodiment.

Referring to FIG. 28B, the display device 30 may display an input box 2802 together with a message "Please input URL address to register TV in cloud" on the display screen 311.

A user may manipulate the remote controller 37 to input a URL address "https://register.sam-cloud.com" of the cloud 10 to the input box 2802 of the display device 30. The display device 30 accesses the URL address to transmit information about ID information (a MAC address, a serial number, and an IP address) of the display device 30 and a unique name (nickname) of the display device 30 to the cloud 10.

The cloud 10 may register the display device 30 by using the information received from the display device 30.

FIG. 29 is a diagram for describing a process of selecting, by a device requesting for a display copy, a display device by logging in to the cloud 10, according to an exemplary embodiment.

In operation 2901, a manager device (an electronic device 291 or a PC 292) executes a management application, and a manager logs in to the management application via a manager account. Here, the management application may be an application for managing a cloud service provided by the cloud 10.

In operation 2902, the cloud 10 transmits a list of display devices currently registered in the cloud 10 to the manager device.

In operation 2903, the manager device uses the management application to authorize a user A's device (the electronic device 20 or the PC 52) to use a certain display device, such as the display device 30 (e.g., of FIG. 28B). For example, when the manager receives a request to use the display device 30 from the user A, the manager device uses the management application to map the user A's device and the display device 30 from the list of display devices.

In operation 2904, the manager device transmits information about authority of the user A's device to the cloud 10. For example, the manager device may transmit information that the user A's device is authorized to use the display device 30 to the cloud 10.

In operation 2905, the cloud 10 updates the information about authority. Here, the cloud 10 may update a list of display devices the user A's device is authorized to use, which is stored in the storage server 150 (e.g., of FIG. 7).

In operation 2906, the user A's device executes an application for using a cloud service, such as a display copy, and the user A logs in to the application.

In operation 2907, the cloud 10 transmits a list of display devices the user A's device is authorized to use, to the user A's device.

In operation 2908, the user A's device displays the received list of display devices.

In operation 2909, the user A may select a display device to perform a display copy, for example, the display device 30, from the list of display devices displayed on the user A's device.

Figure 30A:
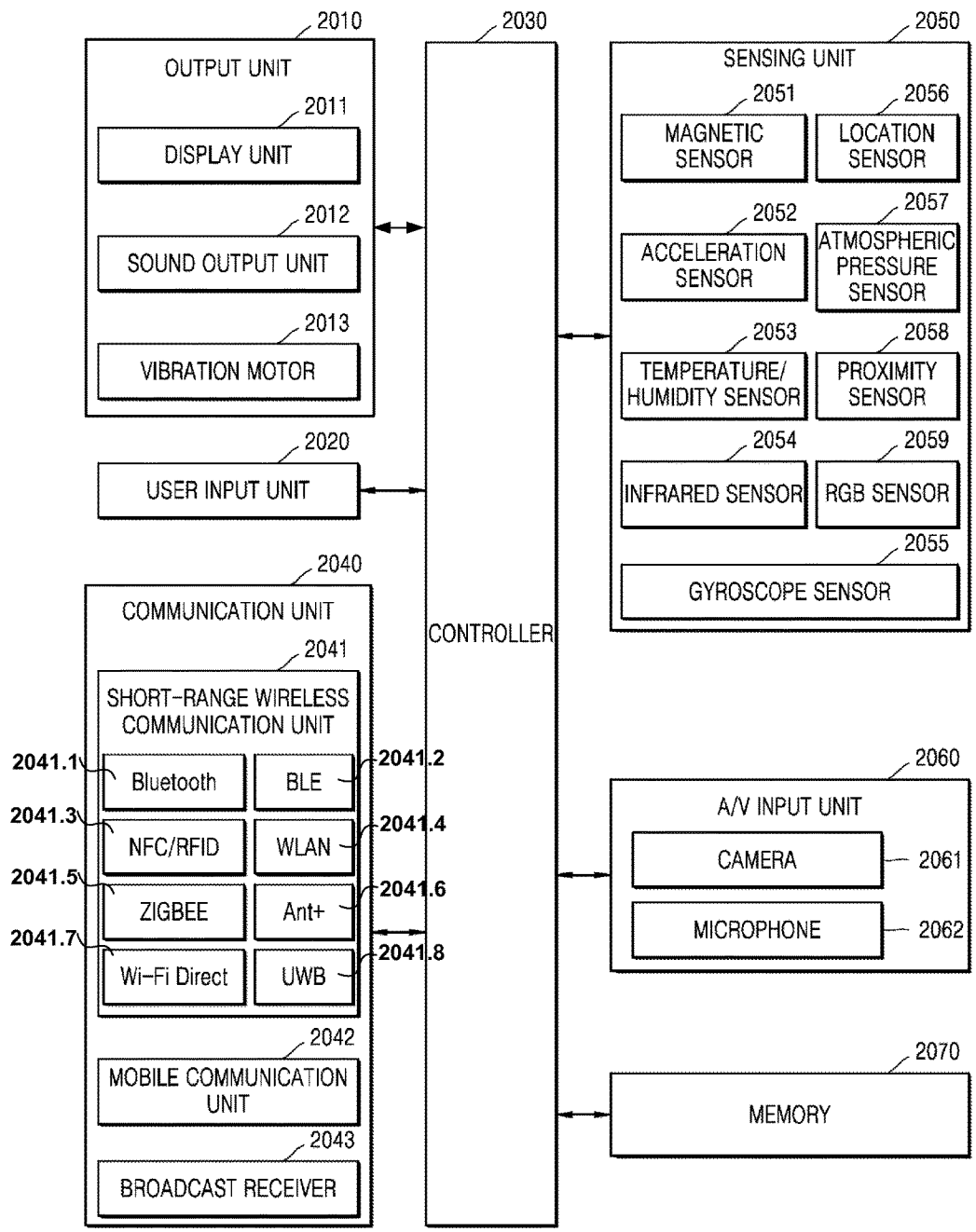
FIG. 30A is a block diagram of hardware components of an electronic device, according to an exemplary embodiment.

FIG. 30A is a block diagram of hardware components of the electronic device 20, according to an exemplary embodiment. The electronic device 20 of FIG. 30A may correspond to the electronic device 20 (e.g., of FIG. 29) described above. Thus, the operations of the electronic device 20 described above may be performed by the hardware components of the electronic device 20 of FIG. 30A.

An output unit 2010 outputs an audio signal, a video signal, or a vibration signal, and may include a display unit 2011, a sound output unit 2012, and a vibration motor 2013.

The display unit 2011 displays and outputs information processed by the electronic device 20. For example, the display unit 2011 may display photos, images, or videos of a photo gallery application (similar to, e.g., the photo gallery application 1710 of FIG. 17) installed in the electronic device 20. Also, the display unit 2011 may display web pages or images in a web page executed in a web browsing application installed in the electronic device 20, and may display attached documents, attached photos, and mail buddies of a mail application. Furthermore, as described above with reference to FIGS. 10 through 15, the display unit 2011 may display a chat room screen (similar to, e.g., chat room screen 1010 of FIG. 10) and chat messages of a messenger application installed in the electronic device 20, and may display a print application for performing a function of a display copy. In other words, the display unit 2011 may display various execution screens of applications installed in the electronic device 20, and content provided by the applications.

When the display unit 2011 is configured as a touch screen by forming a layer structure with a touch pad, the display unit 2011 may be used as an input device as well as an output device. The display unit 2011 may be realized in any one of various types, such as a liquid crystal display (LCD), a thin-film transistor-liquid crystal display (TFT-LCD), an organic light-emitting diode (OLED), a flexible display, a 3-dimensional (3D) display, and an electrophoretic display.

The sound output unit 2012 outputs audio data received from a communication unit 2040 or stored in a memory 2070. Also, the sound output unit 2012 outputs a sound signal related to a function formed by the electronic device 20, such as a call signal reception sound, a message reception sound, or an alarm sound. The sound output unit 2012 may be a speaker or a buzzer.

The vibration motor 2013 may output a vibration signal. For example, the vibration motor 2013 may output a vibration signal corresponding to output of audio data or video data, such as a call signal reception sound or a message reception sound. Also, the vibration motor 2013 may output a vibration signal when a touch is input to the touch screen.

A user input unit 2020 is used by a user to input data for controlling the electronic device 20. For example, the user input unit 2020 may be a key pad, a dome switch, a touch pad (e.g., contact capacitance type, a pressure resistance film type, an infrared ray detection type, a surface ultrasonic conducting type, an integral tension measuring type, or a piezo-effect type), a jog wheel, or a jog switch, but is not limited thereto.

The user input unit 2020 may receive a user input for selecting one of various types of content displayed on the display unit 2011, or a user input for preparing content (a document).

A controller 2030 is a hardware component including at least one processor, and may control overall operations of the electronic device 20. For example, the controller 2030 may execute programs stored in the memory 2070 to control the output unit 2010, the user input unit 2020, the communication unit 2040, a sensing unit 2050, and an audio/video (A/V) input unit 2060.

The controller 2030 may execute a photo gallery application (similar to, e.g., the photo gallery application 212 of FIG. 2), a web browsing application (e.g., Microsoft Internet Explorer), a mail application (e.g., Microsoft Outlook), or a document preparing application (e.g., Microsoft Word, or Microsoft PowerPoint). Also, as described above with reference to FIGS. 10 through 15, the controller 2030 may execute a messenger application or a print application. Accordingly, the user may use applications executed by the controller 2030 to select or personally prepare content to be display-copied, through the user input unit 2020.

The communication unit 2040 may include at least one component that performs communication between the electronic device 20 and the cloud 10 or between the electronic device 20 and other electronic devices. For example, the communication unit 2040 may include a short-range wireless communication unit 2041, a mobile communication unit 2042, and a broadcast receiver 2043.

The short-range wireless communication unit 2041 may include a Bluetooth communication unit 2041.1, a Bluetooth low energy (BLE) communication unit 2041.2, a near field communication (NFC/RFID) unit 2041.3, a wireless local area network (WLAN) (Wi-Fi) communication unit 2041.4, a Zigbee communication unit 2041.5, an Ant+ communication unit 2041.6, a Wi-Fi direct (WFD) communication unit 2041.7, an ultra wideband (UWB) communication unit 2041.8, or an optional infrared data association (IrDA) communication unit (not shown), but is not limited thereto.

The mobile communication unit 2042 transmits and receives a wireless signal to and from at least one of a base station (not shown), an external terminal (not shown), and a server (not shown), on a mobile communication network (not shown). Here, the wireless signal may include data in any format, such as a voice call signal, a video call signal, or a text/multimedia message.

The broadcast receiver 2043 receives a broadcast signal and/or broadcast-related information from an external source (not shown) through a broadcast channel (not shown). The broadcast channel may be a satellite channel (not shown) or a terrestrial wave channel (not shown). According to an exemplary embodiment, the electronic device 20 may not include the broadcast receiver 2043.

When content is requested to be display-copied, the communication unit 2040 may transmit the content to the cloud 10.

The sensing unit 2050 may detect information about a status of the electronic device 20 or a surrounding status of the electronic device 20, and transmit the detected information to the controller 2030.

The sensing unit 2050 may include at least one of a magnetic sensor 2051, an acceleration sensor 2052, a temperature/humidity sensor 2053, an infrared sensor 2054, a gyroscope sensor 2055, a location sensor 2056 like a global positioning system (GPS), an atmospheric pressure sensor 2057, a proximity sensor 2058, and a red/green/blue (RGB) sensor (illuminance sensor) 2059, but is not limited thereto. Since functions of the sensors included in the sensing unit 2050 are intuitively inferred by one of ordinary skill in the art based on their names, details thereof are not provided here.

The A/V input unit 2060 is used to input an audio signal or a video signal, and may include a camera 2061 and a microphone 2062. The camera 2061 may obtain an image frame, such as a still image or a moving image, via an image sensor in a video call mode or a photographing mode. A photo captured through the image sensor may be processed by the controller 2030. As such, an image captured by using the camera 2061 may be displayed on the display unit 2011 through the photo gallery application, and the user may select the image as content requested to be display-copied through the user input unit 2020.

An image frame processed by the camera 2061 may be stored in the memory 2070 or transmitted to an external device, such as the cloud 10 (e.g., of FIG. 1), through the communication unit 2040.

The microphone 2062 receives an external sound signal and processes the external sound signal to electric voice data. For example, the microphone 2062 may receive a sound signal from an external device or a speaker. The microphone 2062 may use various noise removing algorithms to remove noise generated while receiving the external sound signal.

The memory 2070 may store programs for processes and controls of the controller 2030, and may also store various types of data, such as applications and content (photos, documents, and images).

The memory 2070 may include at least one type of storage media, such as a flash memory type memory, a hard disk type memory, a multimedia card micro type memory, a card type memory (e.g., a secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the electronic device 20 may operate a web storage that performs a storage function of the memory 2070 on the Internet.

Figure 30B:
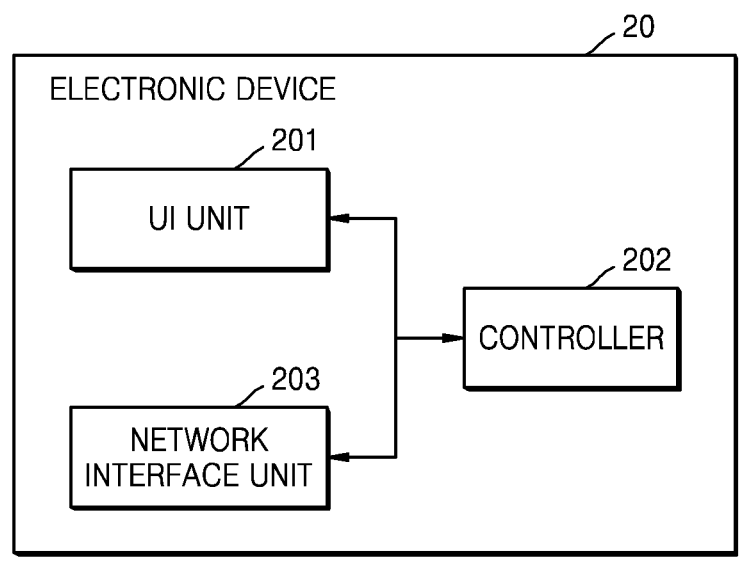
FIG. 30B is a block diagram of hardware components of an electronic device, which perform an operation of a display copy, according to an exemplary embodiment.

FIG. 30B is a block diagram of hardware components of the electronic device 20, which perform an operation of a display copy, according to an exemplary embodiment. The hardware components of FIG. 30B may correspond to those of FIG. 30A related to the operation of the display copy, but are not limited thereto. Also, the operations of the electronic device 20 described herein may be performed by those of FIG. 30B.

Referring to FIG. 30B, the electronic device 20 may include a UI unit 201, a controller 202, and a network interface unit 203.

The UI unit 201 is a component that includes the output unit 2010 and the user input unit 2020 of FIG. 30A. The UI unit 201 may display photos, images, or videos of the photo gallery application installed in the electronic device 20. Also, the UI unit 201 may display web pages or images in a web page being executed in the web browsing application, and display attached documents, attached photos, or mail buddies of the mail application. Moreover, as described above with reference to FIGS. 10 through 15, the display unit 2011 may display a chat room screen and chat messages of the messenger application installed in the electronic device 20, and display the print application for performing a function of a display copy. In other words, the UI unit 201 may display various execution screens of applications installed in the electronic device 20 and content provided by the applications.

The UI unit 201 may receive a user input of selecting one of various types of content from applications being executed, or a user input of preparing content (a document).

The controller 202 is a hardware component that may correspond to the controller 2030 of FIG. 30A, and may control overall operations of the electronic device 20. For example, the controller 202 may execute the photo gallery application, the web browsing application, the mail application, or the document preparing application. Also, as described above with reference to FIGS. 10 through 15, the controller 202 may execute the messenger application or the print application. Accordingly, a user may use applications executed by the controller 202 to select or personally prepare content to be display-copied, through the UI unit 201. Meanwhile, as described above with reference to FIGS. 10 through 15, the user may share the content to be display-copied by using the messenger application executed by the controller 202 in the print application.

The network interface unit 203 is a hardware component that may correspond to the communication unit 2040 of FIG. 30A, and may transmit content to the cloud 10 when the content is requested to be display-copied.

Figure 31:
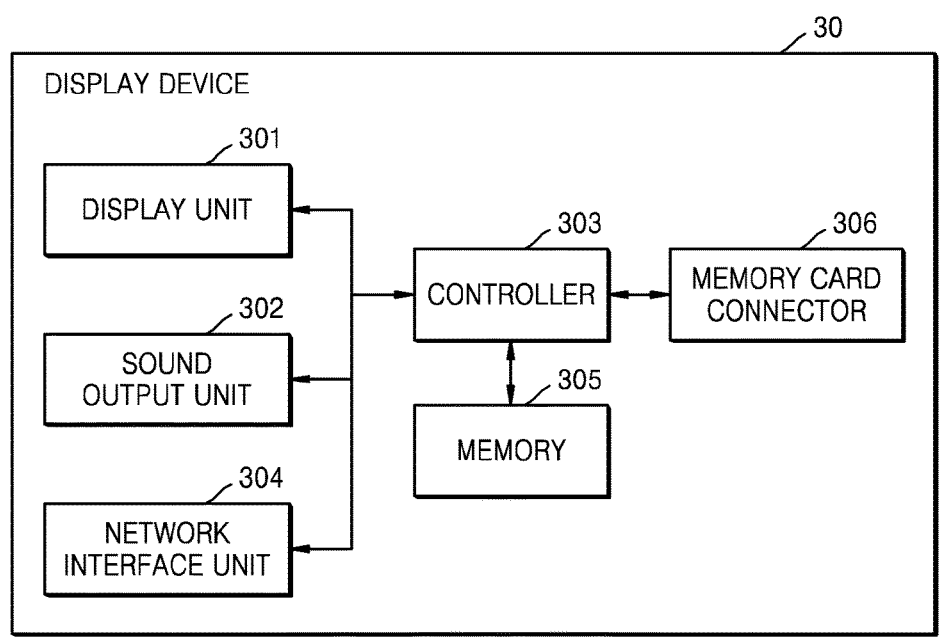
FIG. 31 is a block diagram of hardware components of a display device, according to an exemplary embodiment.

FIG. 31 is a block diagram of hardware components of the display device 30, according to an exemplary embodiment. Operations of the display device 30 described herein may be performed by the hardware components of the display device 30 of FIG. 31.

Referring to FIG. 31, the display device 30 includes a display unit 301, a sound output unit 302, a controller 303, a network interface unit 304, a memory 305, and a memory card connector 306.

The display unit 301 may correspond to the display screen 311 of FIG. 1, and may be realized in any one of various types, such as an LCD, a TFT-LCD, an OLED, a flexible display, a 3-dimensional (3D) display, and an electrophoretic display.

When the display device 30 is a TV, the display unit 301 may display broadcast data, and when the display device 30 is an LFD, the display unit 301 may display a commercial, a guide screen, or broadcast data. Also, as described above with reference to FIG. 3, since the display device 30 may be the electronic device 20 (a smart phone), the electronic device 62 (a tablet device), the laptop 63, or the PC 64, the display device 30 may display execution screens of various applications.

The sound output unit 302 outputs audio of broadcast data. Also, the sound output unit 302 may output a sound signal related to a function performed by the display device 30, such as a call signal reception sound, a message reception sound, or an alarm sound. The sound output unit 302 may be a speaker or a buzzer.

The controller 303 is a hardware component realized by at least one processor, and may control overall functions and operations of the hardware components of the display device 30.

The controller 303 may execute the agent application 35 for supporting a cloud service, such as a display copy.

The network interface unit 304 may receive a broadcast signal and/or broadcast-related information from an external source through a broadcast channel, such as a satellite channel or a terrestrial wave channel, by using a broadcast receiving module. Also, the network interface unit 304 may access the Internet or Intranet wiredly or wirelessly by using a Wi-Fi module or an Ethernet module. The display device 30 may communicate with the cloud 10 by using the network interface unit 304.

The memory 305 may store programs for processes or controls of the controller 303, and may store various types of data, such as broadcast data, commercial data, applications, and content (photos, documents, and images). In detail, the memory 305 may store the agent application 35 (e.g., of FIG. 6) for supporting a cloud service, such as a display copy. Also, the memory 305 may store various types of ID information of the display device 30 and a unique name of the display device 30. Here, the ID information may include a MAC address, a serial number, and an IP address of the network interface unit 304, and the unique name may be a nickname arbitrarily set by a user.

The memory 305 may include at least one type of storage media, such as a flash memory type memory, a hard disk type memory, a multimedia card micro type memory, a card type memory (e.g., an SD or XD memory), an RAM, an SRAM, an ROM, an EEPROM, a PROM, a magnetic memory, a magnetic disk, and an optical disk.

The memory card connector 306 is a hardware component connectable to an external portable or removable storage device, such as a USB storage device or an SD card. The memory card connector 306 may receive data stored in the USB device or the SD card from the USB device or the SD card. For example, the memory card connector 306 may receive an installation file of the agent application 35 stored in the USB device or the SD card. The controller 303 may execute the installation file of the agent application 35 to install the agent application 35 in the display device 30.

Operations of the display device 30 related to a display copy will now be described in detail.

Referring to other drawings and FIG. 31 together, when the agent application 35 is installed in the display device 30, the controller 303 executes the agent application 35. When the agent application 35 is executed, the display device 30 may transmit various types of ID information of the display device 30 and a unique name of the display device 30 to the cloud 10 through the network interface unit 304 in order to be registered in the cloud 10. When the user inputs login information assigned to the display device 30 to access the cloud 10 after the display device 30 is registered in the cloud 10, the network interface unit 304 transmits the login information to the cloud 10 such that the display device 30 logs in to the cloud 10.

Referring to other drawings and FIG. 31 together, when content (an image file) requested to be display-copied is stored in the storage server 150 (e.g., of FIG. 5) of the cloud 10 (e.g., of FIG. 5), the network interface unit 304 downloads the content from the storage server 150. At this time, the network interface unit 304 may receive a URL address indicating an address of a directory of the storage server 150, in which rendered content (an image file or a compressed file) is stored, from the cloud 10, and access the URL address to download the rendered content.

The controller 303 controls the rendered content received from the cloud 10 to be displayed through the display unit 301, thereby completing the operation of the display copy. If the compressed file is received from the cloud 10, the controller 303 may decompress the compressed file to extract the image file, and control the image file to be displayed through the display unit 301, thereby completing the operation of the display copy.

Figure 32:
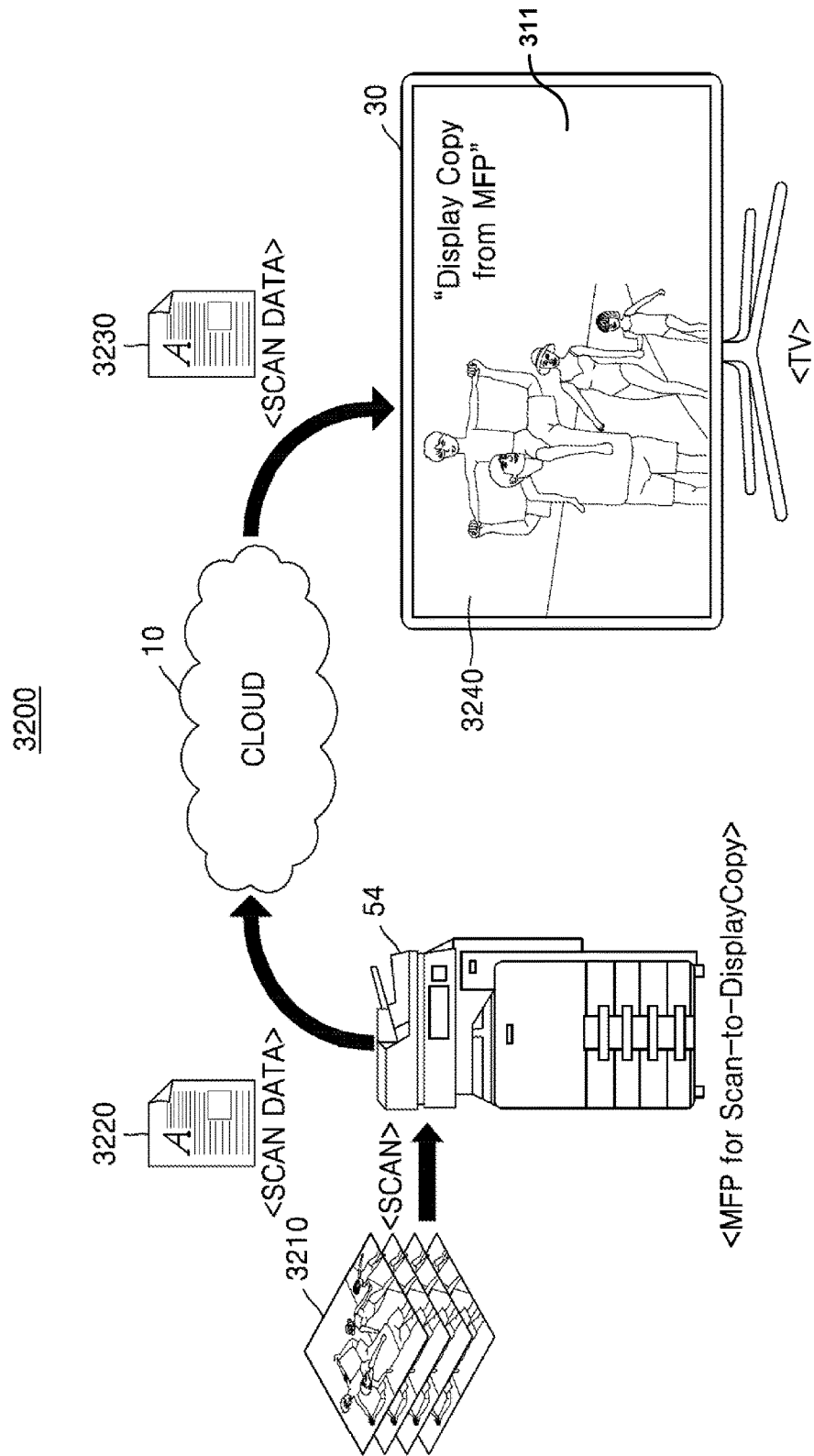
FIG. 32 is a diagram for describing a cloud system that prints or copies a document scanned by an image forming apparatus to a display screen of a TV, according to an exemplary embodiment.

FIG. 32 is a diagram for describing a cloud system 3200 that prints or copies a document scanned by the image forming apparatus 54 to a display screen (e.g., the display screen 311 of FIG. 1) of a TV (e.g., the display device 30 of FIG. 1), according to an exemplary embodiment.

Referring to FIG. 32, the cloud system 3200 includes the cloud 10, the image forming apparatus 54, and the display device 30. In the cloud system 1, the image forming apparatus 54 and the display device 30 may be connected to each other via the cloud 10. Comparing the cloud system 3200 of FIG. 32 with the cloud system 1 of FIG. 1, a source device requesting for a display copy is the image forming apparatus 54, not the electronic device 20, in the cloud system 3200 of FIG. 32. Thus, instead of requesting to display-copy content stored in the electronic device 20 as described above, a document scanned by the image forming apparatus 54 may be requested to be display-copied in the cloud system 3200. Accordingly, the operations of the cloud system 1 including the electronic device 20 may be similarly applied to those of the cloud system 3200 including the image forming apparatus 54.

In detail, the image forming apparatus 54 generates scan data 3220 by scanning a document 3210, and assigns the display device 30 to which the scan data 3220 is to be transmitted, through a chat room. Then, the image forming apparatus 54 transmits the scan data 3220 and information about the display device 30 to the cloud 10. When the scan data 3220 is displayable on the display device 30, the cloud 10 may transmit the scan data 3220 to the display device 30 without performing a separate converting process. In other words, file formats of the scan data 3220 and scan data 3230 are the same because the image forming apparatus 54 is able to generate the scan data 3220 in a file format of a PDF file or a graphic file, such as "*.jpg" file or "*.bmp" file. However, when the scan data 3220 is not displayable on the display device 30, the cloud 10 converts the scan data 3220 to be displayable on the display device 30. In other words, the cloud 10 converts the scan data 3220 to the scan data 3230 displayable on the display device 30.

The cloud 10 transmits the scan data 3230 to the display device 30. The display device 30 displays the scan data 3230 on the display screen, thereby completing an operation of a display copy requested by the image forming apparatus 54.

As such, a function of the cloud system 3200 outputting a document scanned by the image forming apparatus 54 on the display screen 311 of the display device 30 may be defined by a term "Scan-to-DisplayCopy". Such a function may be replaced by another term having a similar meaning as the term "Scan-to-DisplayCopy".

Figure 33:
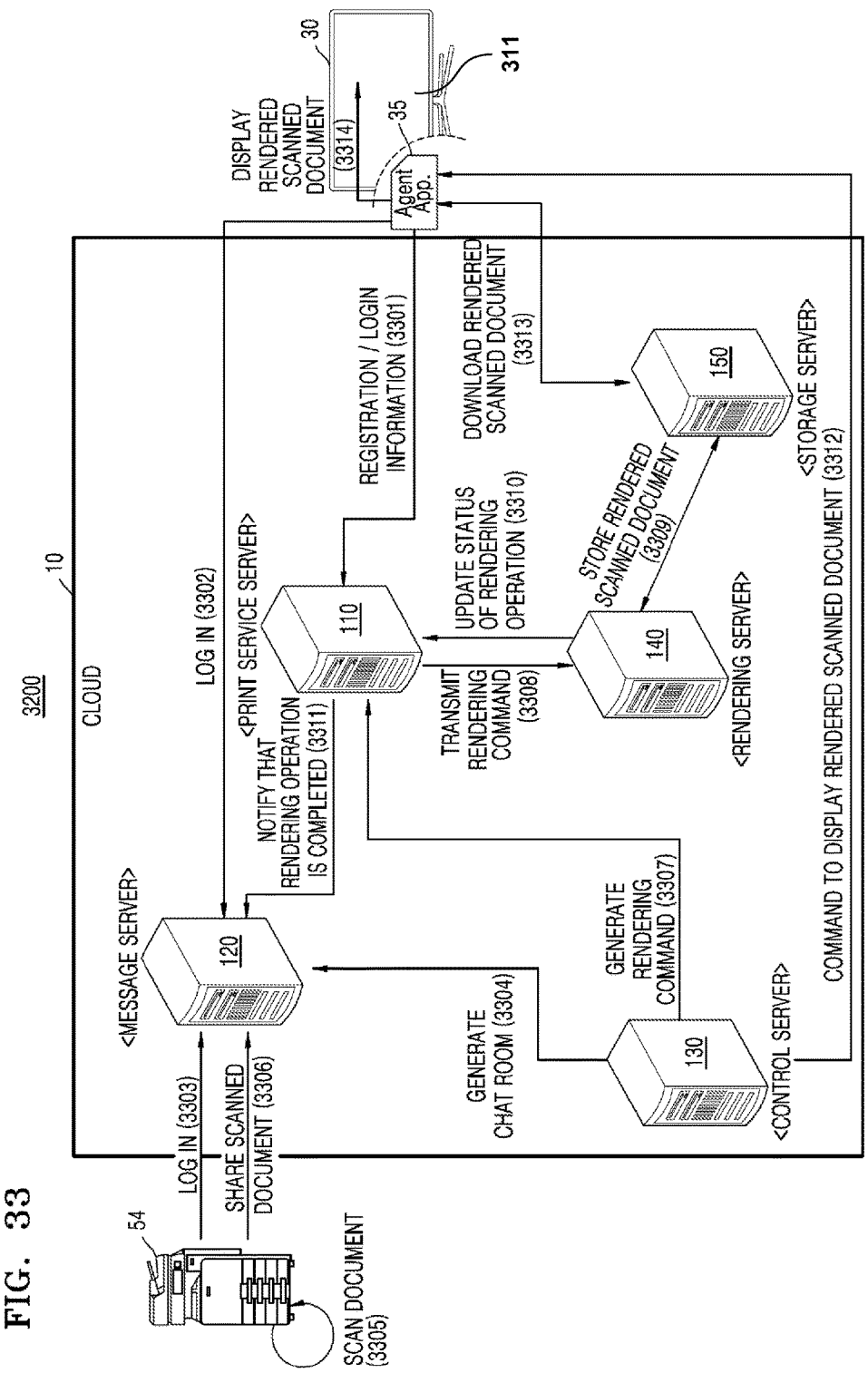
FIG. 33 is a diagram for describing operations of a cloud for performing, by a cloud system, a function of Scan-to-DisplayCopy, according to an exemplary embodiment.

FIG. 33 is a diagram for describing operations of the cloud 10 for performing, by the cloud system 3200, a function of Scan-to-DisplayCopy, according to an exemplary embodiment.

Referring to FIG. 33, a document scanned by the image forming apparatus 54 may be display-copied on the display screen 311 of the display device 30 through the cloud 10.

In operation 3301, the agent application 35 installed in the display device 30 is registered in the print service server 110. As described above with reference to FIG. 6, when the agent application 35 transmits ID information (a MAC address, a serial number, and an IP address) of the display device 30 and a unique name of the display device 30 to the print service server 110, the print service server 110 stores the ID information and the unique name in the storage server 150 and registers the agent application 35 and the display device 30 in which the agent application 35 is installed. Also, the agent application 35 may transmit login information (ID and a password) of a user. At this time, the print service server 110 may map and manage the login information and the ID information of the display device 30.

In operation 3302, the agent application 35 logs in to the message server 120. The agent application 35 transmits the login information of the user of the display device 30, which is input by manipulating a UI included in the display device 30 or a remote controller, to the message server 120. The message server 120 transmits the login information to the control server 130, and the control server 130 determines whether the login is successful by comparing login information pre-stored in the storage server 150 and the received login information. Meanwhile, the storage server 150 may perform a function of a LDAP server for managing employee information of a company, and the control server 130 may determine whether the login is successful based on whether matching login information exists in the LDAP server of the storage server 150.

In operation 3303, the image forming apparatus 54 logs in to the message server 120. A print application for performing a function of Scan-to-DisplayCopy may be pre-installed in the image forming apparatus 54. After executing the print application, the image forming apparatus 54 inputs login information of the user of the image forming apparatus 54. Then, the print application of the image forming apparatus 54 transmits the login information to the message server 120, and the control server 130 determines whether the login is successful by comparing the received login information and login information pre-stored in the storage server 150.

In operation 3304, when the image forming apparatus 54 is logged in, the control server 130 generates or initiates a chat room. An account of the user of the image forming apparatus 54, an account of the user of the display device 30, or an account of a third person may be invited to the chat room. Meanwhile, an account assigned to the display device 30 may be invited to the chat room.

In operation 3305, the image forming apparatus 54 generates scan data (scanned document) by scanning a document.

In operation 3306, the image forming apparatus 54 transmits metadata (e.g., file format information, file size information, and file name information) of the scan data (scanned document) that is requested to be display-copied, to the message server 120. At this time, the scan data (of the scanned document) may be in a file format (such as a "*.doc" file or a "*.ppt" file) that is not immediately displayable on the display device 30 or in a file format (such as a "*.jpg" file or a "*.bmp" file) that is immediately displayable on the display device 30. When the scan data (of the scanned document) is in a file format that is immediately displayable on the display device 30, operation 3308 may be skipped, and rendered or converted scan data (of the scanned document) described in operations 3308 through 3314 may be replaced by the scan data (of the scanned document) received from the image forming apparatus 54.

In operation 3307, the control server 130 generates a rendering command for performing a rendering operation on the scan data (of the scanned document) received from the image forming apparatus 54, and transmits the rendering command to the print service server 110.

In operation 3308, the print service server 110 transmits the rendering command to the rendering server 140. The rendering server 140 renders or converts the scan data (of the scanned document) received from the image forming apparatus 54 to an image file type in a graphic file format according to the rendering command. Also, the rendering server 140 may additionally generate a compressed file (e.g., a ZIP file) of the rendered or converted scan data (of the scanned document).

In operation 3309, the rendering server 140 stores the rendered or converted scan data (of the scanned document) in the storage server 150.

In operation 3310, when the rendering operation is completed, the rendering server 140 notifies the print service server 110 that the rendering operation is completed. In other words, the rendering server 140 updates a status of the rendering operation to indicate that the rendering operation is completed. For example, the rendering server 140 may receive rendering commands for a display copy not only from the image forming apparatus 54, but also from many other devices. Thus, the rendering server 140 may generate a queue of rendering operations according to an order in which the rendering operations are requested, and then update a status of a rendering operation included in the queue according to an order in which the rendering operations are completed.

In operation 3311, the print service server 110 notifies the message server 120 that the rendering operation is completed.

In operation 3312, the control server 130 commands the agent application 35 to display the rendered or converted scan data (of the scanned document) requested by the image forming apparatus 54 for Scan-to-DisplayCopy. Here, the control server 130 may command the agent application 35 to display a certain page, for example, a first page, of the rendered or converted scan data (of the scanned document).

In operation 3313, the agent application 35 downloads the rendered or converted scan data (of the scanned document) from the storage server 150. Here, the storage server 150 may provide information about a web address or URL of the storage server 150 in which the rendered or converted scan data (of the scanned document) is stored to the agent application 35, and the agent application 35 may access the web address or URL of the storage server 150 to receive the rendered or converted scan data (of the scanned document).

In operation 3314, the agent application 35 controls the display device 30 such that the scan data (of the scanned document) requested for Scan-to-DisplayCopy is displayed on the display screen of the display device 30.

Here, a target device having a function of Scan-to-DisplayCopy may be multiple display devices, such as the display device group A 2410 or the display device group B 2420 of FIG. 24, instead of the display device 30.

Figure 34:
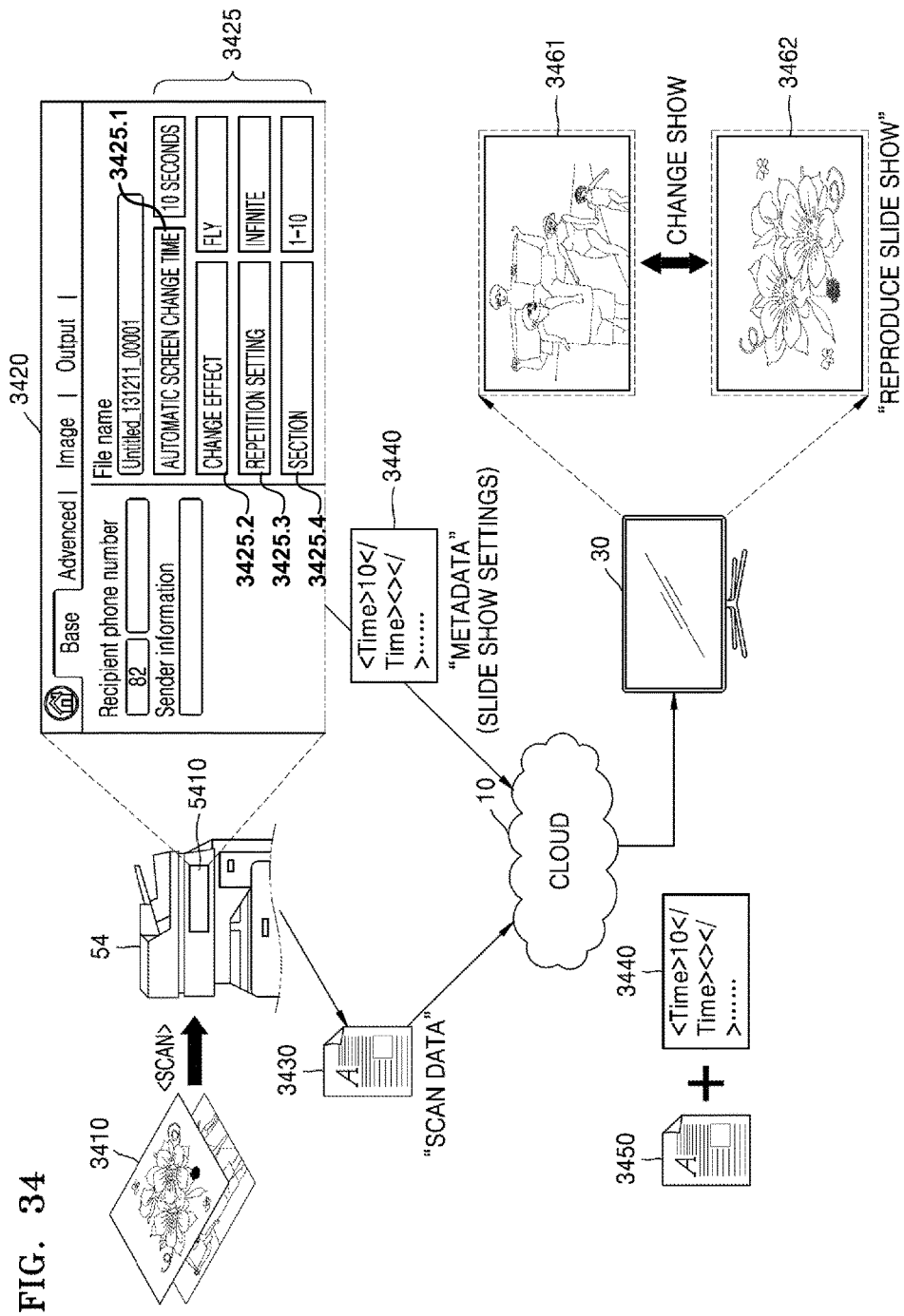
FIG. 34 is a diagram for describing reproducing, by a display device, documents scanned by an image forming apparatus, in a slide show, according to an exemplary embodiment.

FIG. 34 is a diagram for describing reproducing, by the display device 30, documents scanned by the image forming apparatus 54, in a slide show, according to an exemplary embodiment.

Referring to FIG. 34, the image forming apparatus 54 generates scan data 3430 by scanning a document 3410 in a plurality of pages. Then, the image forming apparatus 54 displays a UI screen 3420 displaying settings 3425 for reproducing the pages of the document 3410 in a slide show.

The settings 3425 may include a setting on an automatic screen change time 3425.1, a setting on a change effect 3425.2, a repetition setting 3425.3, and a section setting 3425.4. The settings 3425 input through the image forming apparatus 54 may be converted to metadata 3440.

The image forming apparatus 54 transmits the scan data 3430 and the metadata 3440 of the settings 3425 to the cloud 10.

The cloud 10 transmits scan data 3450 and the metadata 3440 to the display device 30.

The display device 30 reproduces document images of each page included in the scan data 3450 based on the settings 3425 included in the metadata 3440. For example, images 3461 and 3462 may be changed at intervals of 10 seconds in a flying effect, as set by the image forming apparatus 54.

Figure 35:
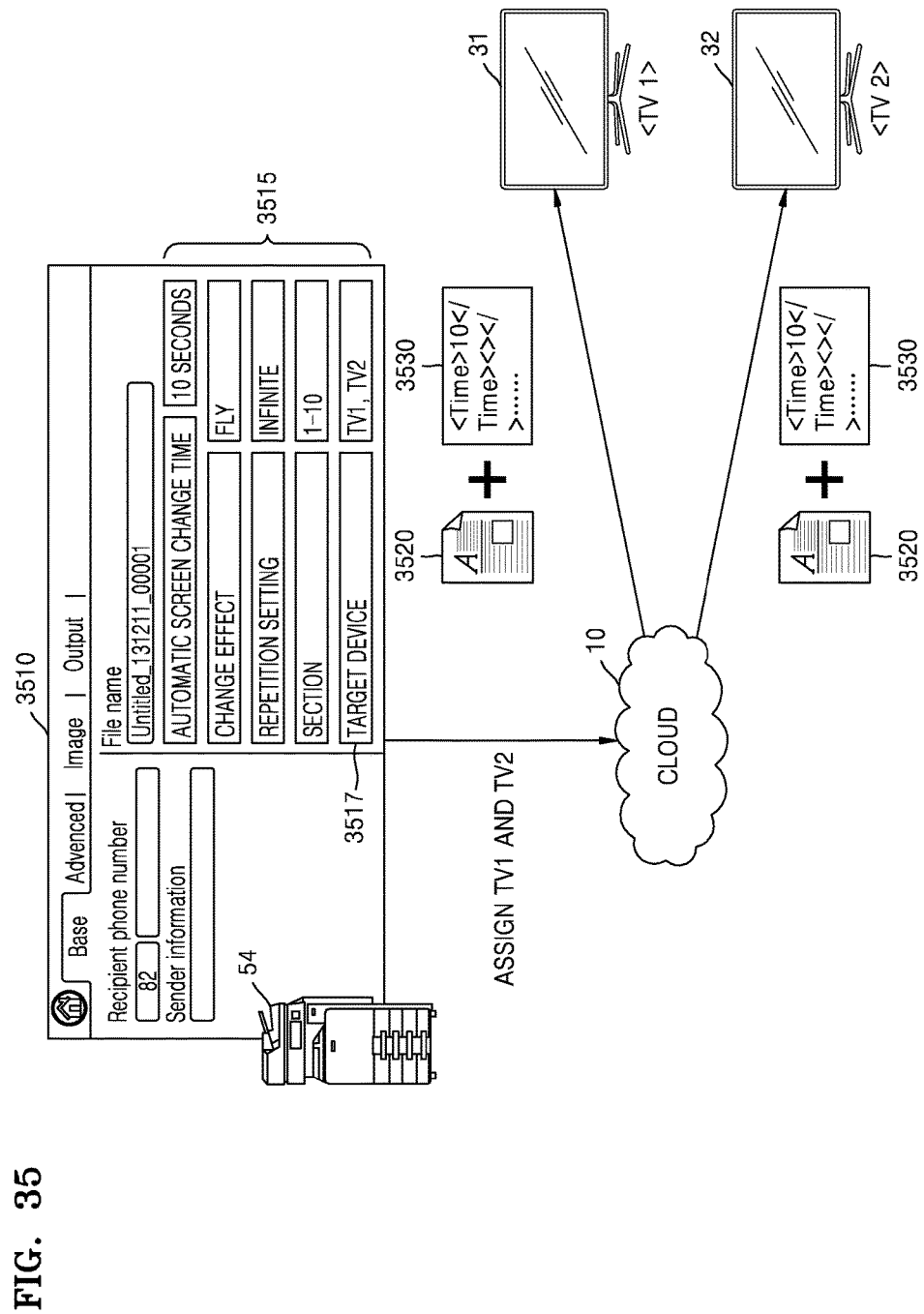
FIG. 35 is a diagram for describing reproducing, by a plurality of display devices, documents scanned by an image forming apparatus, in a slide show, according to an exemplary embodiment.

FIG. 35 is a diagram for describing reproducing, by a plurality of display devices, documents scanned by the image forming apparatus 54, in a slide show, according to an exemplary embodiment.

Referring to FIG. 35, as described above with reference to FIG. 34, the image forming apparatus 54 displays a UI screen 3510 displaying settings 3515 for a slide show. However, unlike the UI screen 3420 of FIG. 34, the UI screen 3510 of FIG. 35 may provide an input box 3517 for assigning a target device for Scan-to-DisplayCopy. When TVs 31 and 32 are assigned as target devices for Scan-To-DisplayCopy, the cloud 10 may transmit scan data 3520 (image files or a ZIP file) and metadata 3530 to each of the TVs 31 and 32. Accordingly, each of the TVs 31 and 32 may reproduce pages included in the scan data 3520 in a slide show based on the settings 3515 included in the metadata 3530. In other words, a function of Scan-to-DisplayCopy requested from the image forming apparatus 54 may be independently performed by several different display devices, such as the TVs 31 and 32.

FIGS. 36A through 36D are diagrams for describing setting, by the image forming apparatus 54, a screen display phrase of the display device 30, according to exemplary embodiments.

Referring to FIGS. 36A through 36D, display settings on the screen display phrase of the display device 30 may be input through an operation panel 5400 of the image forming apparatus 54. Information about the display settings input through the operation panel 5400 of the image forming apparatus 54 may be transmitted to the display device 30 through the cloud 10.

Referring to FIG. 36A, a user may directly input a screen display phrase "Today's subject is marketing strategy in US market" through a setting screen 3601 displayed on the operation panel 5400. The screen display phrase set as such may be displayed in a margin 3600 where content is not displayed on the screen of the display device 30.

Figure 36B:
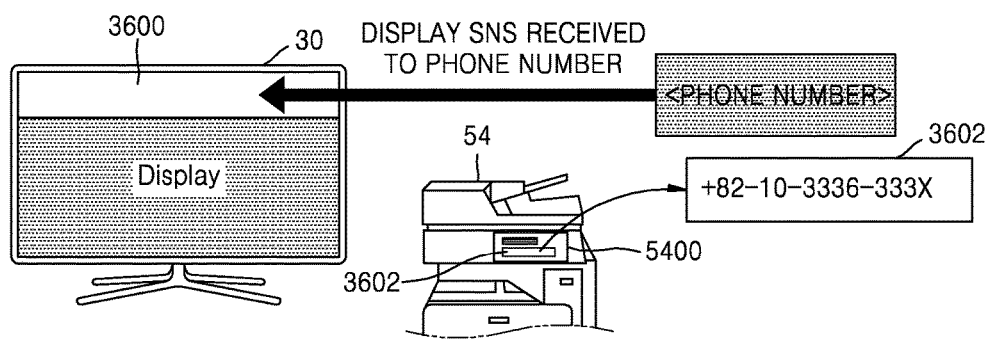

Referring to FIG. 36B, the user may input a phone number of a smart phone to which an SMS or MMS is to be provided, through a setting screen 3602 displayed on the operation panel 5400. Accordingly, the SMS or MMS may be displayed in the margin 3600.

Figure 36C:
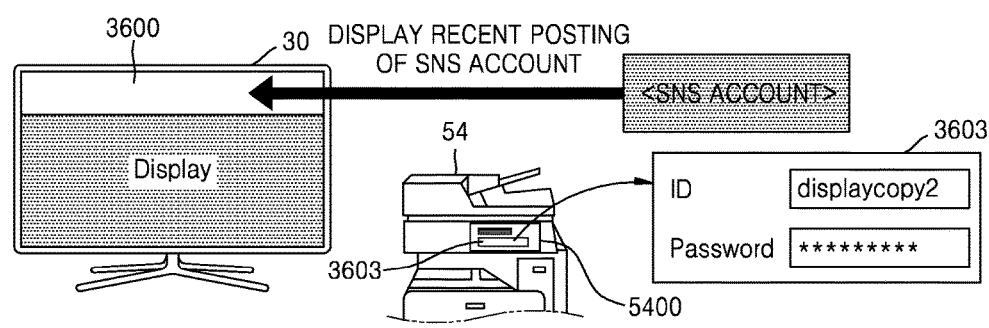

Referring to FIG. 36C, the user may input SNS account information (ID and a password) for logging in to an SNS server, through a setting screen 3603 displayed on the operation panel 5400. Accordingly, a recent posting updated in an SNS may be displayed in the margin 3600.

Figure 36D:
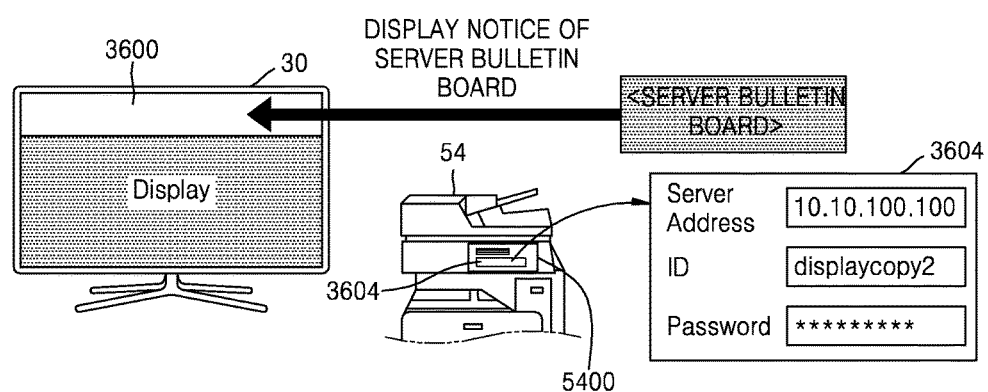

Referring to FIG. 36D, the user may input information (a server address, ID, and a password) for identifying and logging in to a web server, through a setting screen 3604 displayed on the operation panel 5400. Accordingly, a recent notice updated in the web server may be displayed in the margin 3600.

FIG. 37 is a diagram for describing requesting, by the image forming apparatus 54, for Scan-to-DisplayCopy by scanning a photo 3710 including a QR code 3715, according to an exemplary embodiment.

Referring to FIG. 37, the image forming apparatus 54 generates scan data 3720 by scanning the photo 3710 including the QR code 3715. Then, the image forming apparatus 54 transmits the scan data 3720 to the cloud 10.

The cloud 10 transmits scan data 3730 about the photo 3710 to the display device 30 (the agent application 35).

The agent application 35 of the display device 30 recognizes the QR code 3715 when an image of the QR code 3715 is included in the photo 3710 of the scan data 3730. For example, when the QR code 3715 indicates a certain URL address ("http://www.car-information.com"), the agent application 35 may analyze the QR code 3715 and recognize the certain URL address.

When a margin 3740 is set in the display screen 311 of the display device 30, the display device 30 may display the certain URL address of the QR code 3715 in the margin 3740, and display a photo 3750 including the QR code 3715 in another region of the display screen 311.

Figure 38:
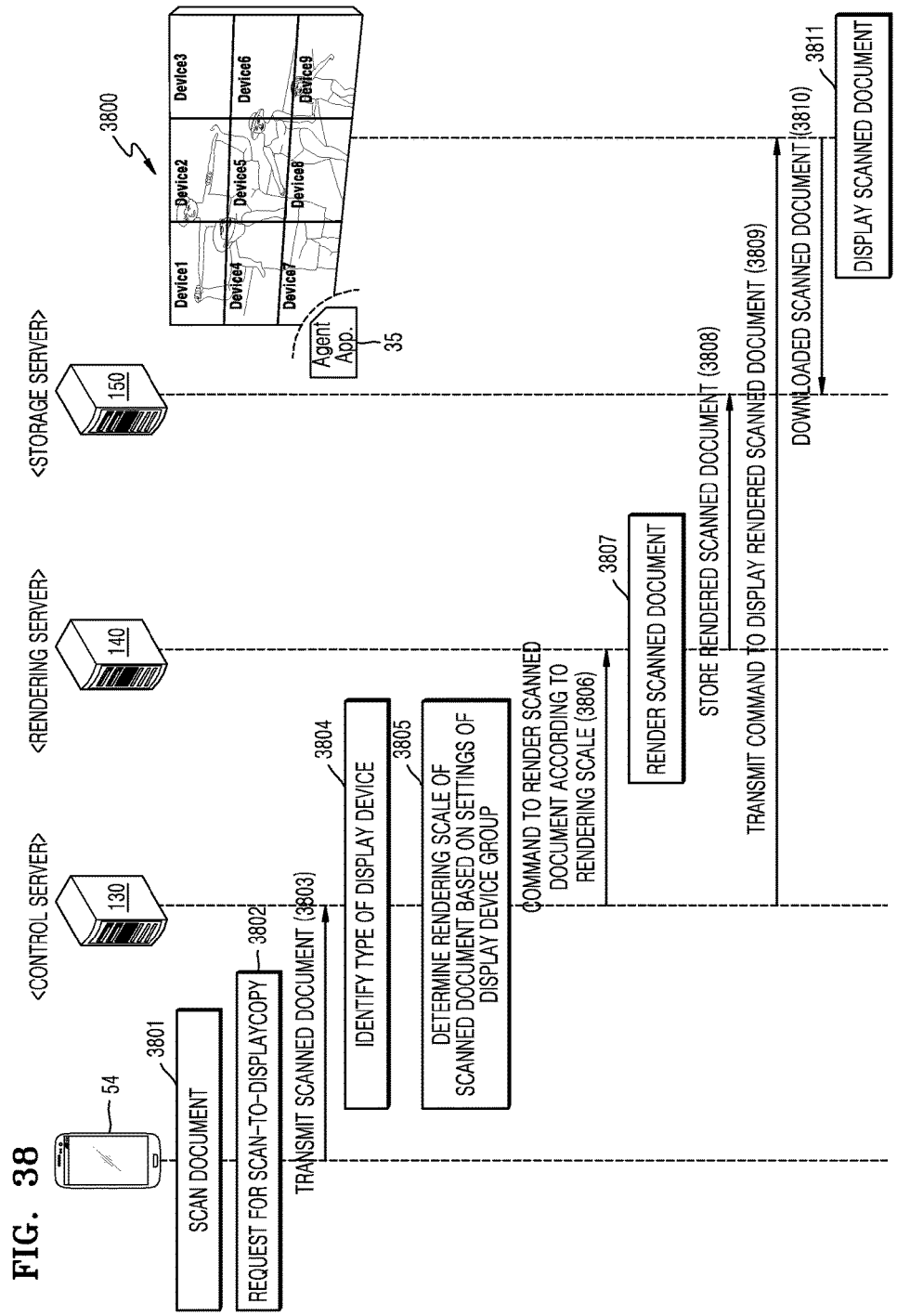
FIG. 38 is a diagram for describing a process of performing, by an image forming apparatus, Scan-to-DisplayCopy targeting multiple display devices that are grouped, according to an exemplary embodiment.

FIG. 38 is a diagram for describing a process of performing, by the image forming apparatus 54, Scan-to-DisplayCopy targeting multiple display devices that are grouped, according to an exemplary embodiment.

In operation 3801, the image forming apparatus 54 scans a document.

In operation 3802, the image forming apparatus 54 requests the scanned document (scan data) for Scan-to-DisplayCopy.

In operation 3803, the image forming apparatus 54 transmits the scanned document (or scan data indicative of the scanned document) to the control server 130.

In operation 3804, the control server 130 identifies a type of a target device to display the scanned document (or scan data indicative of the scanned document). Here, the identified target device may correspond to a display device group 3800 including display devices Device1 through Device9.

In operation 3805, the control server 130 determines a rendering scale of the scanned document based on settings of the display device group 3800, for example, a number of the display devices Device1 through Device9, resolution of each of the display devices Device1 through Device9, and an arrangement of the display devices Device1 through Device9. Here, the rendering scale may indicate whether to display pages of the scanned document respectively on the display devices Device1 through Device9 or to display one page of the scanned document on the display devices Device1 through Device9 by splitting the one page, and resolution of the scanned document to be rendered according to resolution of a display device on which the scanned document is to be displayed.

In operation 3806, the control server 130 commands the rendering server 140 to render the scanned document according to the rendering scale.

In operation 3807, the rendering server 140 renders or converts the scanned document.

In operation 3808, the storage server 150 stores the rendered or converted scanned document.

In operation 3809, the control server 130 transmits a command to display the rendered or converted scanned document to the agent application 35 of the display device group 3800.

In operation 3810, the agent application 35 downloads the rendered or converted scanned document from the storage server 150.

In operation 3811, the display device group 3800 displays the scanned document requested for Scan-to-DisplayCopy.

Figure 39:
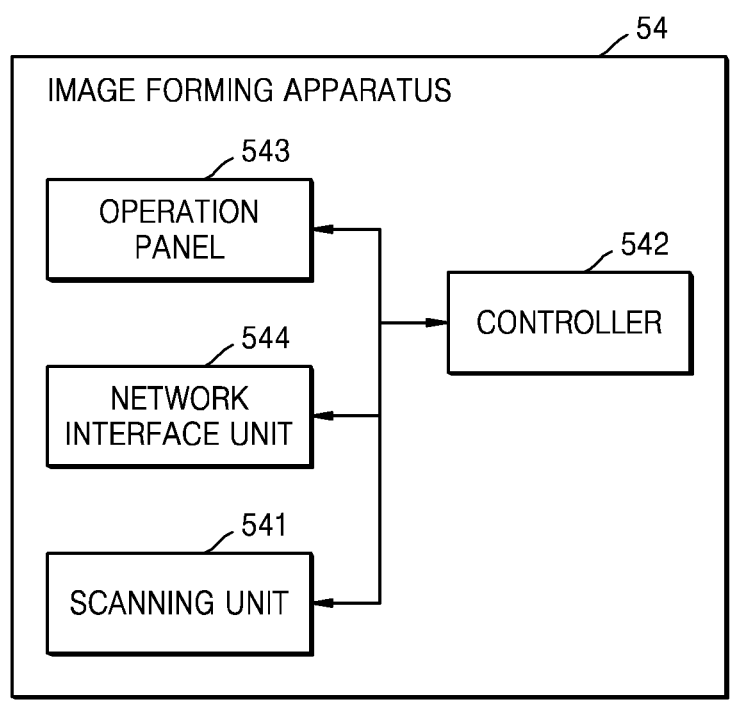
FIG. 39 is a block diagram of hardware components of an image forming apparatus, according to an exemplary embodiment.

FIG. 39 is a block diagram of hardware components of the image forming apparatus 54, according to an exemplary embodiment. The hardware components of the image forming apparatus 54 of FIG. 39 may correspond to only those related to an operation of a display copy, but are not limited thereto. The image forming apparatus 54 of FIG. 38 may additionally include other general-purpose components. Also, operations of the image forming apparatus 54 described herein may be performed by the hardware components of the image forming apparatus 54 of FIG. 39. Moreover, operations of the electronic device 20 described herein may also be applied to the image forming apparatus 54 of FIG. 39.

A scanning unit 541 generates scan data (a scan image file or a scanned document) by scanning a document.

A controller 542 may control overall functions of the image forming apparatus 54. For example, the controller 542 may control a scan operation of the scanning unit 541, control display of information through an operation panel 543, process information input through the operation panel 543, or control data transmission and reception of a network interface unit 544. The controller 542 may execute a print application or a messenger application, which supports a function of Scan-to-DisplayCopy, installed in the image forming apparatus 54.

The operation panel 543 displays the print application or the messenger application (a chat room application) supporting the function of Scan-to-DisplayCopy. The operation panel 543 may display a chat room in which the image forming apparatus 54 and at least one device, such as the display device 30, are participating. When the scanning performed by the scanning unit 541 is completed, the operation panel 543 may display the print application or the messenger application to display a UI screen for setting a target device, such as the display device 30, for requesting Scan-to-DisplayCopy with respect to the scan data. The operation panel 543 may receive a user input of assigning the target device (the display device 30) through the UI screen. In other words, the operation panel 543 corresponds to an input/output hardware that displays information processed by the image forming apparatus 54 or receives information from a user.

When Scan-to-DisplayCopy is requested, the network interface unit 544 may transmit the scan data to the cloud 10. Also, the network interface unit 544 may transmit information about the target device to the cloud 10. The network interface unit 544 may access the Internet or intranet via wires or wirelessly by using any one of wired/wireless communication units, such as a Wi-Fi module and an Ethernet module. The network interface unit 544 may transmit information about the target device assigned through the operation panel 543 to the cloud 10.

Meanwhile, the hardware components of the image forming apparatus 54 of FIG. 39 may perform the functions of Scan-to-DisplayCopy described above with reference to FIGS. 32 through 38. For example, the UI screens 3420 and 3510 described in FIGS. 34 and 35 may be displayed through the operation panel 543 of FIG. 39. Also, the operation panel 5400 of the image forming apparatus 54 of FIGS. 36A through 36D corresponds to the operation panel 543 of FIG. 39, and the image forming apparatus 54 of FIG. 39 may set a phrase to be displayed on the display device 30. The controller 542 may process information input through the UI screens 3420 and 3510 and the operation panel 5400, and the network interface unit 544 may transmit the processed information to the cloud 10.

Figure 40:
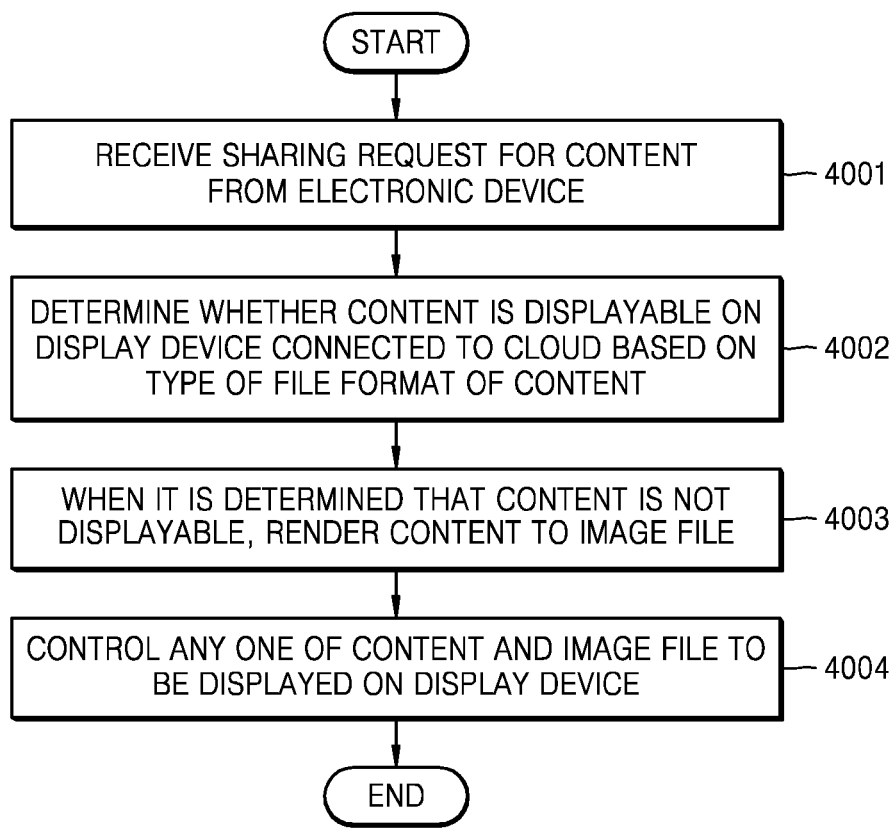
FIG. 40 is a flowchart of a method of providing, by a cloud, a cloud service for displaying content, according to an exemplary embodiment.

FIG. 40 is a flowchart of a method of providing, by the cloud 10, a cloud service for displaying content, according to an exemplary embodiment. Referring to FIG. 40, the method according to the current embodiment includes operations that are performed in time-series by the cloud 10 described above. Thus, details about the cloud 10 described above may be applied to the method of FIG. 40 even if not explicitly discussed.

In operation 4001, the message server 120 (first server) receives a sharing request for content from the electronic device 20.

In operation 4002, the print service server 110 (second server) determines whether the content is displayable on the display device 30 connected to the cloud 10 based on a type of a file format of the content.

In operation 4003, the rendering server 140 (third server) renders the content to an image file when it is determined that the content is not displayable.

In operation 4004, the control server 130 (fourth server) controls any one of the content and the image file to be displayed on the display device 30.

Figure 41:
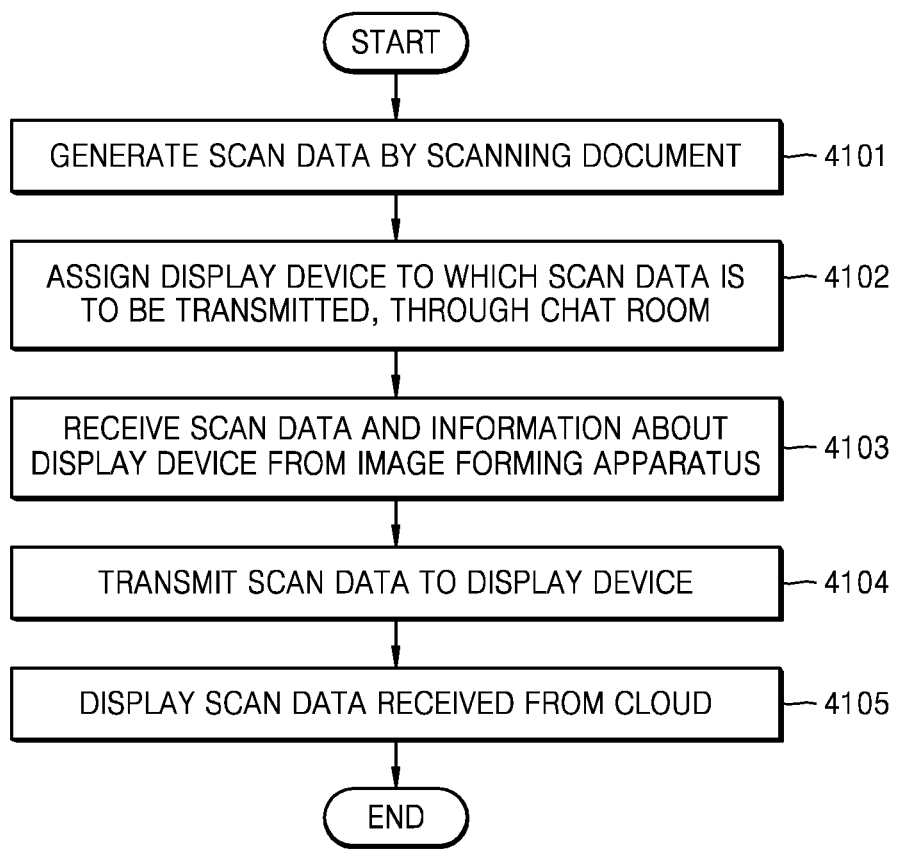
FIG. 41 is a flowchart of a method of providing, by a cloud, a cloud service for displaying scan data, according to an exemplary embodiment.

FIG. 41 is a flowchart of a method of providing, by the cloud 10, a cloud service for displaying scan data, according to an exemplary embodiment. Referring to FIG. 41, the method according to the current embodiment includes operations that are performed in time-series by the cloud 10 described above. Thus, details about the cloud 10 described above may be applied to the method of FIG. 41 even if not explicitly discussed.

In operation 4101, the image forming apparatus 54 generates scan data by scanning a document.

In operation 4102, the image forming apparatus 54 assigns the display device 30 to which the scan data is to be transmitted, through a chat room.

In operation 4103, the cloud 10 receives the scan data and information about the display device 30 (e.g., of FIG. 1) from the image forming apparatus 54 (e.g., of FIG. 2).

In operation 4104, the cloud 10 transmits the scan data to the display device 30.

In operation 4105, the display device 30 displays the scan data received from the cloud 10.

Hereinafter, various embodiments of storing content (or scan data) requested for display copy or Scan-to-Display-Copy by a source device, such as the electronic device 20 (e.g., of FIG. 1), the PC 52 (e.g., of FIG. 3), or the image forming apparatus 54, in the cloud 10 will be described with reference to FIGS. 42 through 44.

Figure 42:
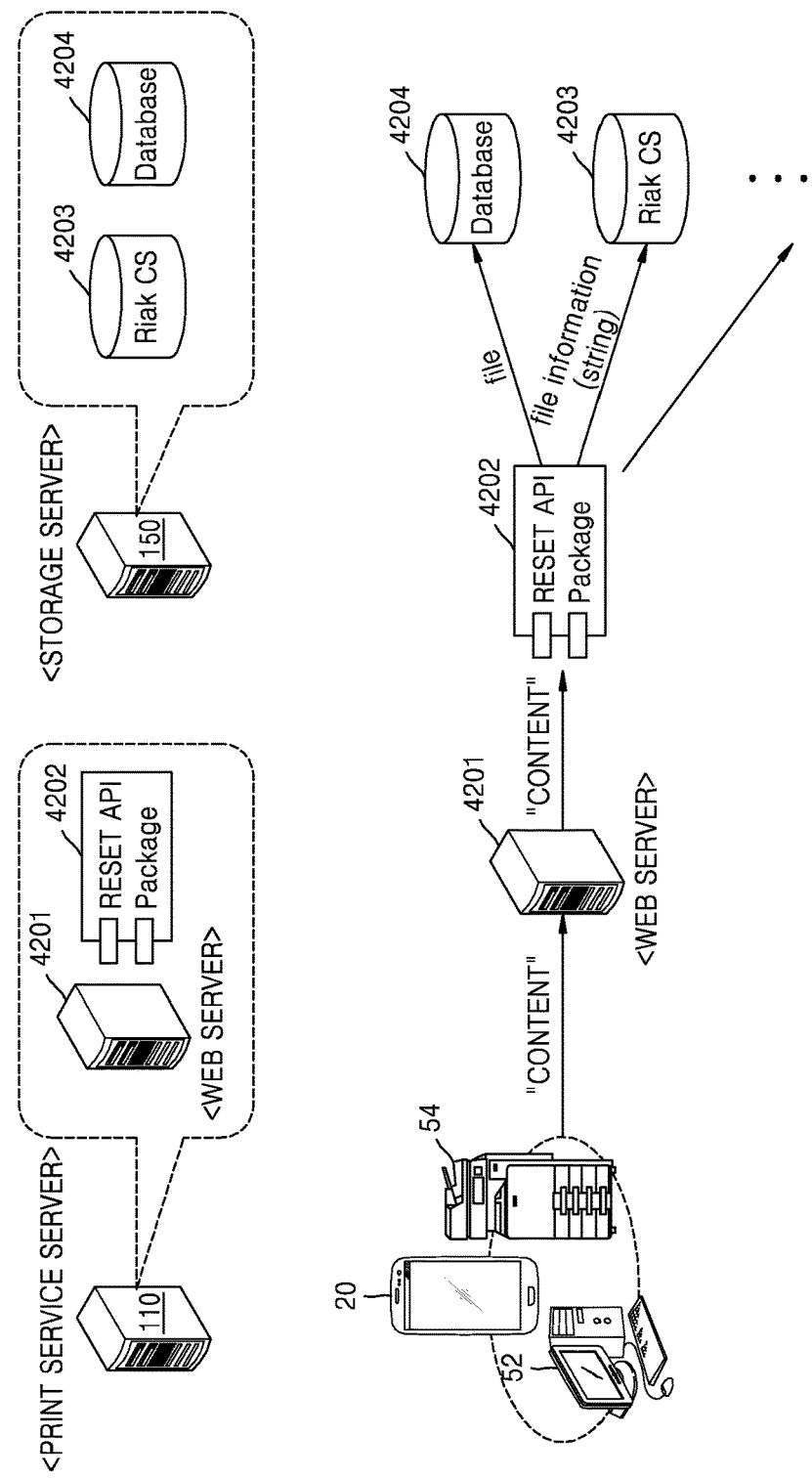
FIG. 42 is a diagram for describing storing, by a cloud, content, according to an exemplary embodiment.

FIG. 42 is a diagram for describing storing, by the cloud 10, content, according to an exemplary embodiment.

Referring to FIG. 42, the print service server 110 may include a web server 4201 and a REST API package 4202, and the storage server 150 may include a Riak CS 4203 and a database 4204.

A source device (the electronic device 20, the PC 52, or the image forming apparatus 54) requesting for display copy (or Scan-to-DisplayCopy) transmits content (or scan data) to the web server 4201 of the cloud 10.

The REST API package 4202 analyzes the content received by the web server 4201 to a file or file information (string). Here, when the content is an image file (document file), the file (content data) may correspond to image data (document data) and the file information may correspond to metadata including an extension, a generated date, and capacity of the image file (document file). In other words, the file information may be metadata included in the sharing request received from the message server 120, which has been described above.

In the storage server 150, the file (content data) is distributed and stored in the database 4204, and the file information (string) including the extension, the generated date, and the capacity, is distributed and stored in the Riak CS 4203. In other words, the storage server 150 distributes and stores the content received from the source device in the database 4204 and the Riak CS 4203.

Figure 43:
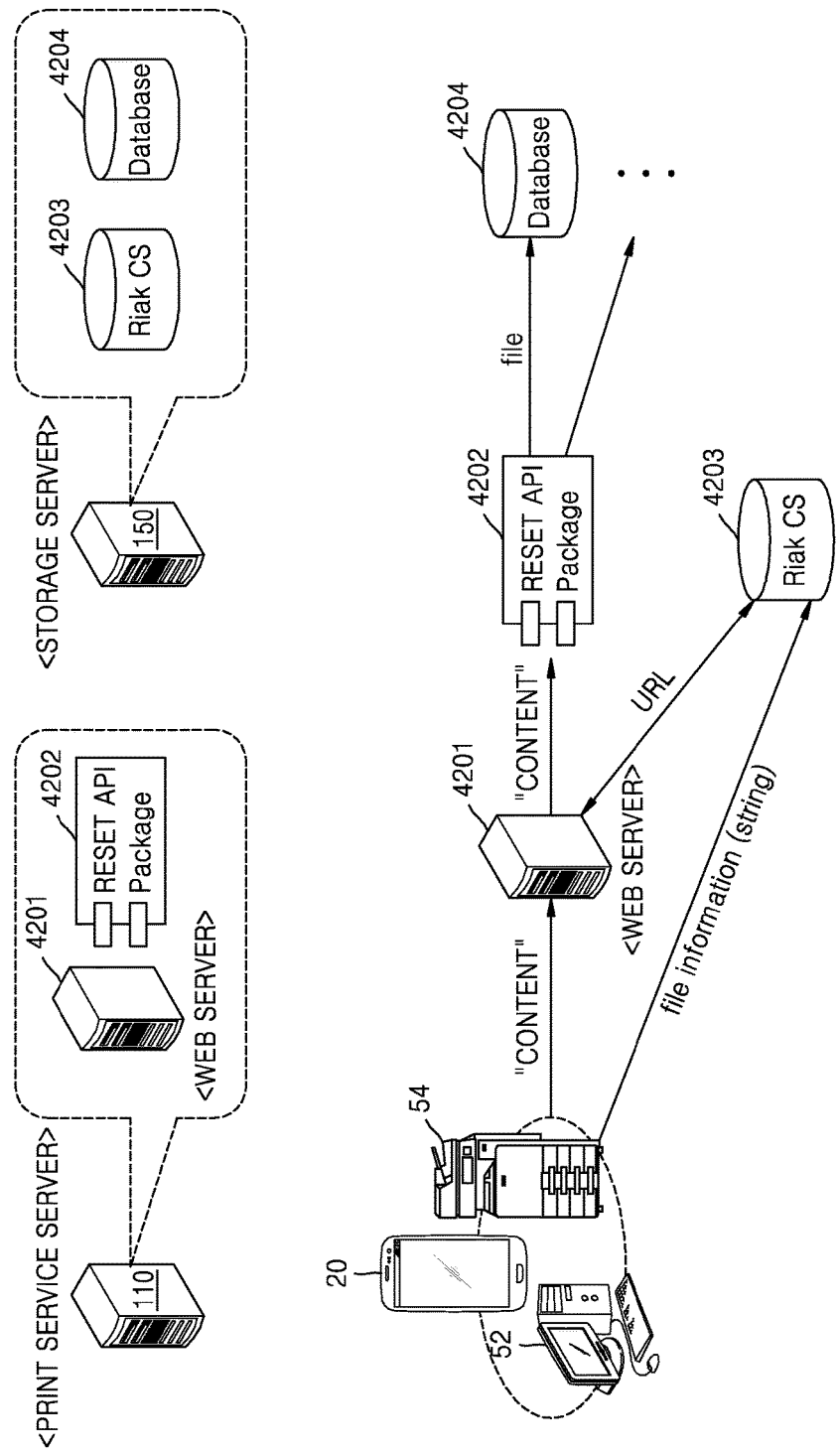
FIG. 43 is a diagram for describing storing, by a cloud, content, according to another exemplary embodiment.

FIG. 43 is a diagram for describing storing, by the cloud 10, content, according to another exemplary embodiment.

Referring to FIG. 43, the print server 110 may include the web server 4201 and the REST API package 4202, and the storage server 150 may include the Riak CS 4203 and the database 4204.

A source device (the electronic device 20, the PC 52, or the image forming apparatus 54) requesting for display copy (or Scan-to-DisplayCopy) transmits content (or scan data) to the web server 4201 of the cloud 10.

The web server 4201 requests the Riak CS 4203 for a URL address of the Riak CS 4203 for storing file information (string). Then, the web server 4201 transmits the URL address of the Riak CS 4203 to the source device.

The source device accesses the URL address and transmits the file information (string) including an extension, a generated date, and capacity of the content, to the Riak CS 4203. The Riak CS 4203 stores the file information (string). Accordingly, the Riak CS 4203 may be related to the message server 120 that receives a sharing request including metadata about content described above.

The REST API package 4202 distributes and stores a file (image data or document data) excluding the file information (string), which is about the content received by the web server 4201, in the database 4204.

Figure 44:
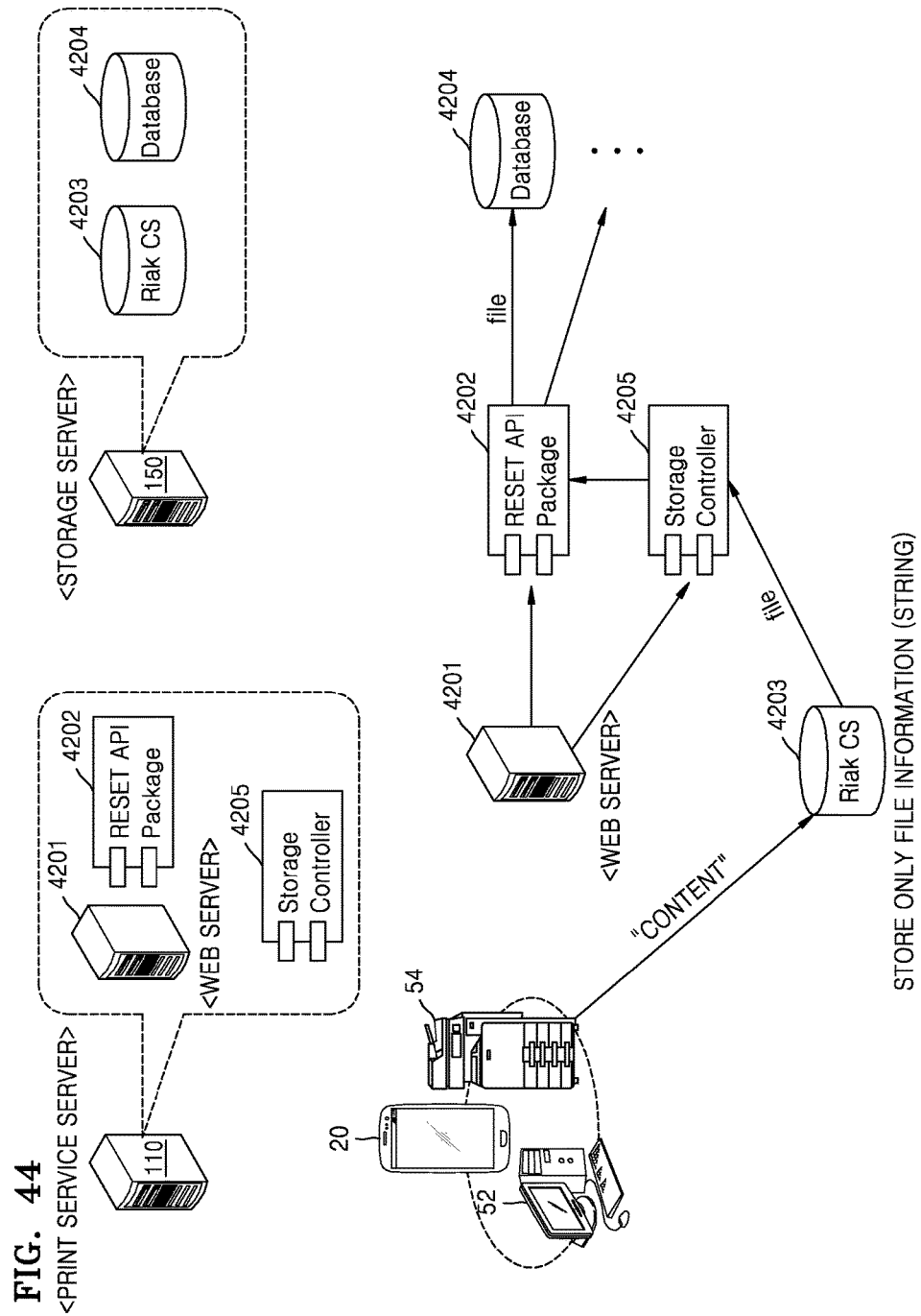
FIG. 44 is a diagram for describing storing, by a cloud, content, according to another exemplary embodiment.

FIG. 44 is a diagram for describing storing, by the cloud 10, content, according to another exemplary embodiment.

Referring to FIG. 44, the print service server 110 may include the web server 4201, the REST API package 4202, and a storage controller 4205, and the storage server 150 may include the Riak CS 4203 and the database 4204.

A source device (the electronic device 20, the PC 52, or the image forming apparatus 54) requesting for display copy (or Scan-to-DisplayCopy) transmits content (or scan data) to the Riak CS 4203 of the cloud 10. Here, the source device may transmit the content by accessing a URL address of the Riak CS 4203, which is pre-provided by the web server 4201.

The Riak CS 4203 stores the content. Then, the storage controller 4205 analyzes the content stored in the Riak CS 4203 to classify the content into file information (string), such as an extension, a generated date, and capacity of the content, and a file (image data or document data).

Then, the storage controller 4205 controls the Riak CS 4203 to store only the file information (string). Then, the storage controller 4205 calls the REST API package 4202 to store the file in the database 4204.

The REST API package 4202 distributes and stores the file (image data or document data) excluding the file information (string), which is about the content received by the web server 4201, in the database 4204.

Figure 45:
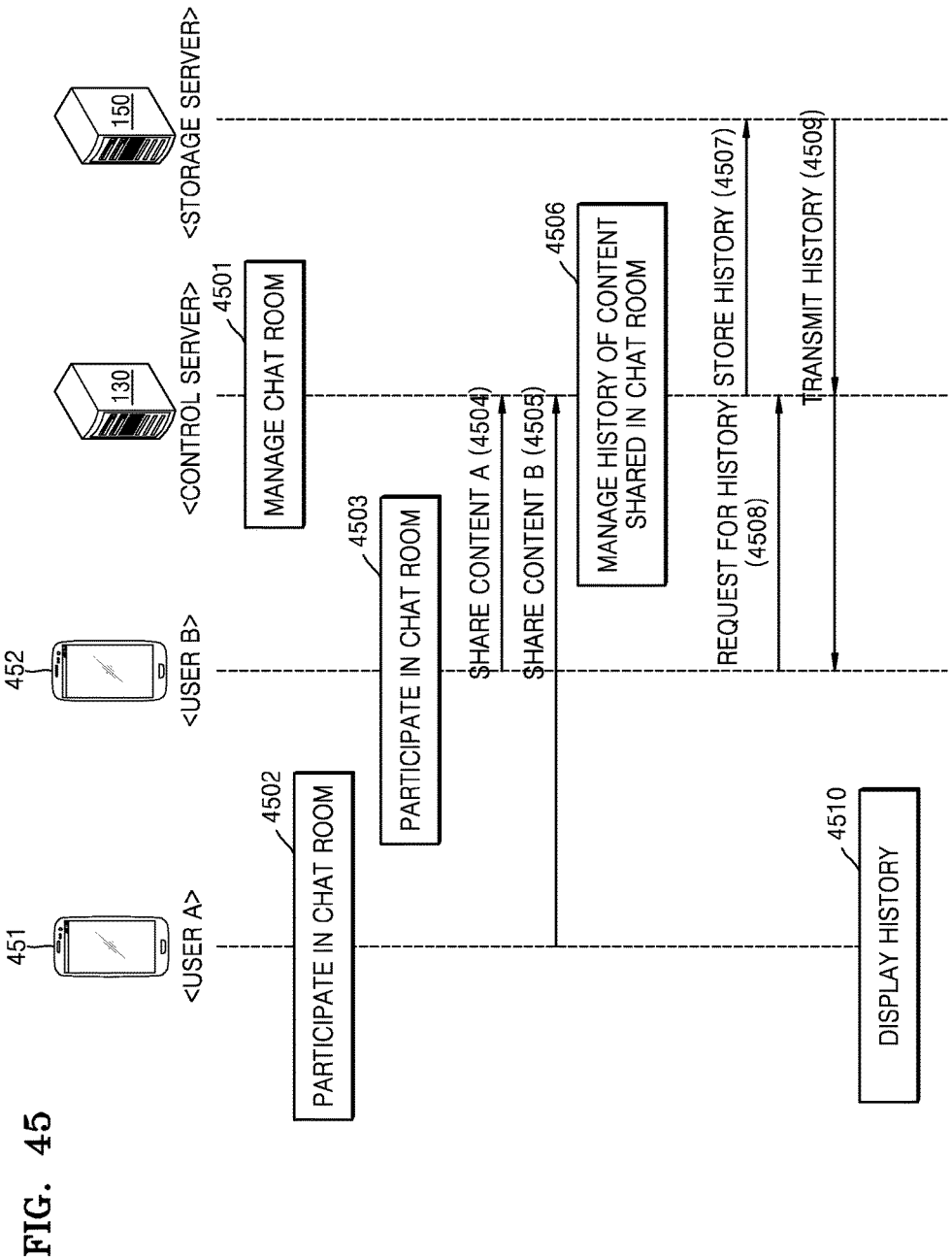
FIG. 45 is a diagram for describing a process of providing a history of content shared in a chat room, according to an exemplary embodiment.

FIG. 45 is a diagram for describing a process of providing a history of content shared in a chat room, according to an exemplary embodiment.

In FIG. 45, an electronic device 451 of a user A and an electronic device 452 of a user B are illustrated, but a number of devices may vary.

In operation 4501, the control server 130 opens a chat room requested by the electronic device 452, the electronic device 452, or another device, and manages the chat room.

In operation 4502, the electronic device 451 participates in the chat room.

In operation 4503, the electronic device 452 participates in the chat room. In other words, the users A and B may chat through the chat room and share content with each other. Although FIG. 45 does not show the display device 30 for performing a display copy, but it is assumed that the display device 30 is already participating in the chat room.

In operation 4504, the electronic device 451 shares content A in the chat room.

In operation 4505, the electronic device 452 shares content B in the chat room.

In operation 4506, the control server 130 manages a history of content (the content A and the content B) shared in the chat room. For example, the control server 130 may manage a file name of the content A, information about the user A who shared the content A, information about a time when the content A is shared, and capacity information of the content A. Also, the history may include list of users and devices participating in the chat room at a point of time when the content A was shared.

In operation 4507, the control server 130 stores the history in the storage server 150.

In operation 4508, if the user B wants to view the history, the electronic device 452 may request the control server 130 for information about the history.

In operation 4509, the storage server 150 and the control server 130 transmits the information about the history to the electronic device 452. Here, the history may include the file name of the content A, the information about the user A who shared the content A, the information about the time when the content A is shared, the capacity information of the content A, a file name of the content B, information about the user B who shared the content B, information about a time when the content B is shared, capacity information of the content B, the lists of users and devices participating in the chat room at the point of time when the content A was shared, and lists of users and devices participating in the chat room at a point of time when the content B was shared.

In operation 4501, the electronic device 452 displays the history.

Figure 46:
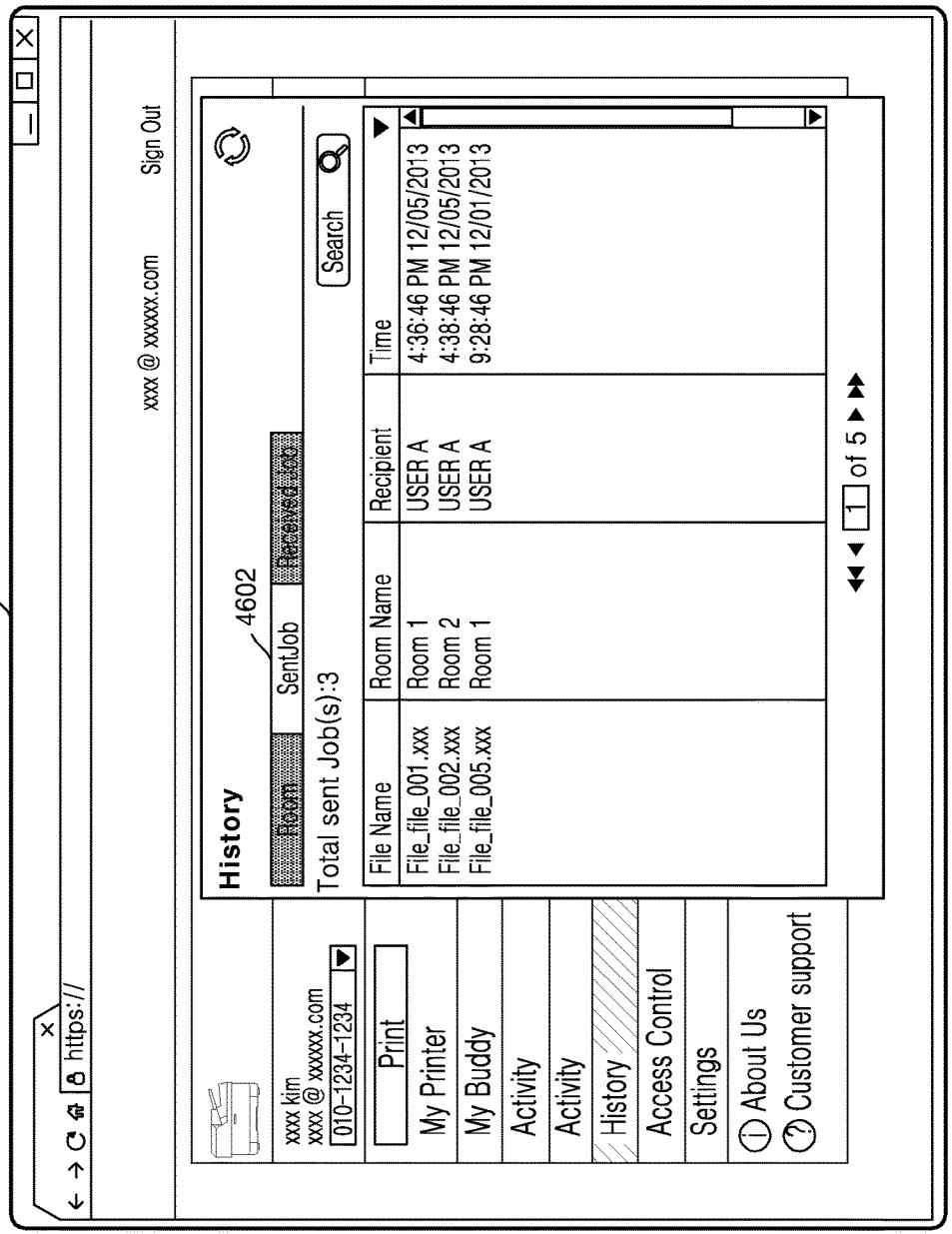
FIG. 46 is a diagram for describing a user interface (UI) displaying a history of content transmitted by a user through a chat room, according to an exemplary embodiment.

FIG. 46 is a diagram for describing a UI 4601 displaying a history 4602 of content transmitted by a user through a chat room, according to an exemplary embodiment.

Referring to FIG. 46, the UI 4601 may display information about the history 4602 of content shared through the chat room. For example, it is assumed that the UI 4601 is displayed on the electronic device 451 of FIG. 45 or on a PC (e.g., the PC 64 of FIG. 3).

The UI 4601 displays the history 4602 of content transmitted by the user A from among content shared through the chat room. For example, the user A transmitted File_file_001.xxx and File_file_005.xxx through a chat room Room1, and transmitted File_file_002.xxx through a chat room Room2. The history 4602 displayed on the UI 4601 may also display information that the user A and other users/devices were participating when the user A transmitted File_file_001.xxx at 4:36:46 PM on 5 Dec. 2013 through the chat room Room1.

Figure 47:
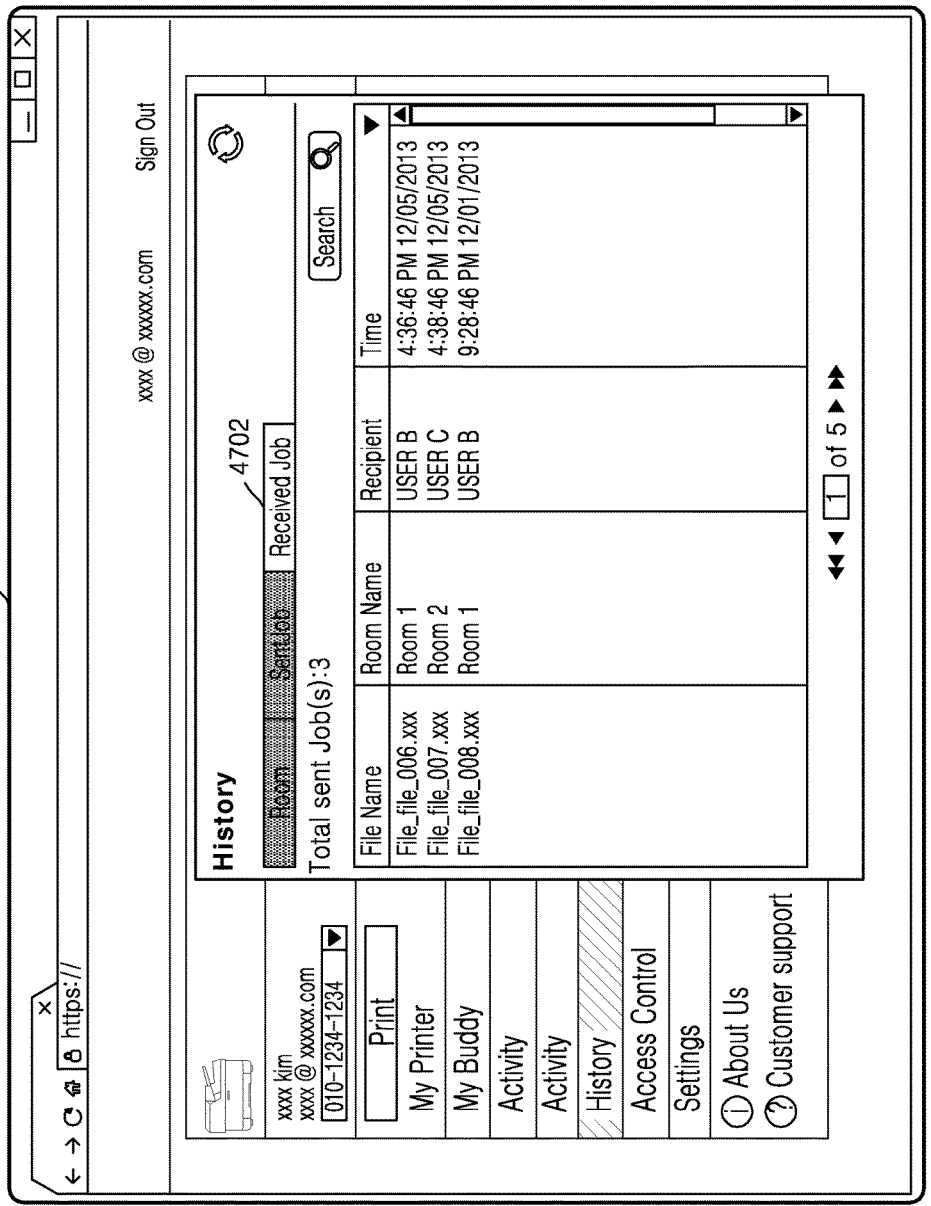
FIG. 47 is a diagram for describing a UI displaying a history of content received by a user through a chat room, according to an exemplary embodiment.

FIG. 47 is a diagram for describing a UI 4701 displaying a history 4702 of content received by a user through a chat room, according to an exemplary embodiment.

Referring to FIG. 47, the UI 4701 may display information about the history 4702 of content shared through the chat room. For example, it is assumed that the UI 4701 is displayed on the electronic device 451 of FIG. 45 or on a PC (e.g., the PC 64 of FIG. 3).

The UI 4701 displays the history 4702 of content received by the user A from among content shared through the chat room. For example, the user A received File_file_006.xxx and File_file_008.xxx through a chat room Room1, and received File_file_007.xxx through a chat room Room2. The history 4702 displayed on the UI 4701 may also display information about a sender and a sent time, together with information about the chat room Room1 or Room2.

The exemplary embodiments may be written as computer programs and may be implemented in general-use digital computers that execute the programs using a computer-readable recording medium. Also, structures of data used in the exemplary embodiments may be recorded on the computer-readable recording medium via various methods. Examples of the computer-readable recording medium include magnetic storage media (e.g., ROM, floppy disks, hard disks, etc.), optical recording media (e.g., CD-ROMs, or DVDs), etc.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A system, comprising:
   an image forming apparatus to:
     display a chat room in which an account corresponding to the image forming apparatus and at least one account corresponding to at least one device are participating, the at least one device participating in the chat room including a display device,
     generate scan data by scanning a document, and
     assign the display device as a destination to which the scan data is to be transmitted through the chat room;
   a cloud to:
     receive the scan data from the image forming apparatus,
     determine, based on a display capability of the display device, whether to convert the scan data to another format that is displayable by the display device according to the display capability of the display device, and
     transmit one of the scan data and converted scan data to the display device based on the determination; and
   the display device to display the one of the scan data and the converted scan data received from the cloud,
   wherein
   the cloud comprises a print service server having a representational state transfer application programming interface (REST API) module for an agent application installed in the display device and operable to communicate with the cloud, wherein the print service server is to receive network address information and nickname information of the display device from the display device and register the network address information and nickname information.

2. A method, comprising:
   generating, via an image forming apparatus having a scanner to scan a document, scan data by a controller of the image forming apparatus controlling the scanner to scan the document;
   generating, by a cloud, a chat room and assigning one of a public attribute and a private attribute for the chat room, such that when the cloud assigns the chat room the public attribute, anonymous participants are allowed to participate in the chat room, and when the cloud assigns the chat room the private attribute, only predetermined participants are allowed to participate in the chat room;
   displaying, via an operation panel of the image forming apparatus, the chat room generated by the cloud using a chat room application executed by the controller, in which an account corresponding to the image forming apparatus and at least one account corresponding to at least one device are participating;
   assigning, via the operation panel of the image forming apparatus, a display device as a destination to which the scan data is to be transmitted through the chat room, wherein the at least one device participating in the chat room comprises the display device;
   receiving, via the cloud, the scan data and information about the display device from the image forming apparatus;

determining, via the cloud, based on a display capability of the display device, whether to convert the scan data to another format that is displayable by the display device according to the display capability of the display device;

transmitting, via the cloud, one of the scan data and converted scan data to the display device based on the determination; and displaying, via the display device, the one of the scan data and the converted scan data received from the cloud.

3. The method of claim 2, further comprising sharing, via the image forming apparatus, the scan data with the at least one device participating in the chat room through the chat room.

4. The method of claim 2, further comprising storing, via the cloud, the scan data in a storage server when the scan data is received, wherein the transmitting comprises transmitting a uniform resource locator (URL) address corresponding to an address of a directory of the storage server in which the scan data is stored, to the display device.

5. The method of claim 4, wherein the storage server comprises Riak cloud storage (CS) and a database.

6. The method of claim 2, comprising, when the display device is not logged in to the chat room, inviting the display device to log in to the chat room.

7. The method of claim 2, wherein the cloud includes a print service server receiving the scan data from the image forming apparatus, a Riak cloud storage (CS), and a database, and the method further comprises:
analyzing, by the print service server, the scan data and controlling metadata of the scan data to be stored in the Riak CS and controlling the scan data to be stored in the database, based on the analyzing.

8. The method of claim 2, further comprising:
storing, in a storage server of the cloud, a history of content shared in the chat room;
providing, by the storage server, the history of content shared in the chat room in response to a request from at least one of the account corresponding to the image forming apparatus or the at least one account corresponding to the at least one device; and
displaying, on at least one of the operation panel of the image forming apparatus or the display device, information about the history of content shared in the chat room, the information about the history of content shared in the chat room including at least one of a file name of the content shared in the chat room, time information about a time when the content was shared in the chat room, capacity information of the content shared in the chat room, or information about participants in the chat room when the content was shared in the chat room.

9. A non-transitory computer-readable recording medium having recorded thereon a program, which when executed by a computer, performs the method of claim 2.

10. A system, comprising:
an image forming apparatus to:
display a chat room in which an account corresponding to the image forming apparatus and at least one account corresponding to at least one device are participating, the at least one device participating in the chat room including a display device,
generate scan data by scanning a document, and
assign the display device as a destination to which the scan data is to be transmitted through the chat room;
a cloud to:
generate the chat room and assign one of a public attribute and a private attribute for the chat room, such that when the cloud assigns the chat room the public attribute, anonymous participants are allowed to participate in the chat room, and when the cloud assigns the chat room the private attribute, only predetermined participants are allowed to participate in the chat room,
receive the scan data from the image forming apparatus,
determine, based on a display capability of the display device, whether to convert the scan data to another format that is displayable by the display device according to the display capability of the display device, and
transmit one of the scan data and converted scan data to the display device based on the determination; and
the display device to display the one of the scan data and the converted scan data received from the cloud.

11. The system of claim 10, wherein
the display capability of the display device includes a screen resolution capability of the display device, and
when the cloud determines the display device cannot display the scan data based on the screen resolution capability of the display device, the cloud is to convert the scan data to another format having a resolution that is displayable by the display device, based on the screen resolution capability of the display device.

12. The system of claim 10, wherein the cloud is to receive, from the image forming apparatus, information for assigning at least one target device for displaying the scan data, wherein the at least one target device comprises the display device.

13. The system of claim 10, wherein the image forming apparatus is to share the scan data with the at least one device participating in the chat room through the chat room.

14. The system of claim 10, wherein the cloud comprises a storage server to store the scan data when the scan data is received.

15. The system of claim 14, wherein the storage server is to provide a uniform resource locator (URL) address corresponding to an address of a directory in which the scan data is stored, to the display device.

16. The system of claim 14, wherein the storage server comprises a Riak cloud storage (CS) and a database.

17. The system of claim 14, wherein the cloud comprises a control server to control the storage of the scan data in the storage server when the scan data is received.

18. The system of claim 10, wherein the display device comprises at least one of a television (TV), a large format display (LFD), a tablet device, or a smart phone.

19. The system of claim 10, wherein the cloud comprises a message server having an extensible messaging and presence protocol server to map network address information of the image forming apparatus and network address information of the display device.

20. The system of claim 10, further comprising a server in the cloud to transmit a command to the display device to commence displaying the scan data received from the cloud.

* * * * *